US012747315B2

(12) United States Patent
Layman, Jr.

(10) Patent No.: US 12,747,315 B2
(45) **Date of Patent: *Sep. 29, 2026**

(54) PROCESS AND CATALYSTS FOR HYDROGEN MEDIATED ANIONIC POLYMERIZATION OF CONJUGATED DIENES AND LIQUID POLYMERS THEREOF

(71) Applicant: ALBEMARLE CORPORATION, Charlotte, NC (US)

(72) Inventor: William J. Layman, Jr., Baton Rouge, LA (US)

(73) Assignee: Albemarle Corporation, Charlotte, NC (US)

( * ) Notice: Subject to any disclaimer, the term of this patent is extended or adjusted under 35 U.S.C. 154(b) by 771 days.

This patent is subject to a terminal disclaimer.

(21) Appl. No.: 18/043,453

(22) PCT Filed: Sep. 1, 2021

(86) PCT No.: PCT/US2021/048684

§ 371 (c)(1),
(2) Date: Feb. 28, 2023

(87) PCT Pub. No.: WO2022/051376

PCT Pub. Date: Mar. 10, 2022

(65) Prior Publication Data

US 2024/0034825 A1 Feb. 1, 2024

Related U.S. Application Data

(60) Provisional application No. 63/073,388, filed on Sep. 1, 2020.

(51) Int. Cl.

*C08F 236/10* (2006.01)
*C08F 2/06* (2006.01)

(Continued)

(52) U.S. Cl.

CPC .............. *C08F 236/10* (2013.01); *C08F 2/06* (2013.01); *C08F 4/482* (2013.01); *C08F 236/06* (2013.01);

(Continued)

(58) Field of Classification Search

CPC .......................... C08F 136/06; C08F 2500/02; C08F 2500/17; C08F 2500/32; C08F 136/08; C08F 236/06

(Continued)

(56) References Cited

U.S. PATENT DOCUMENTS 3,352,934 A * 11/1967 House ....................... C07C 2/02 526/173
3,678,121 A 7/1972 Mcelroy et al.

(Continued)

FOREIGN PATENT DOCUMENTS

CN 109312027 A 2/2019
EP 0331400 B1 1/1992

(Continued)

OTHER PUBLICATIONS

Chemical Book entry for 2-Dimethylaminoethanol (108-01-0), pp. 1/6-6/6, Copyright 2023 (Year: 2023).*

(Continued)

*Primary Examiner* — Fred M Teskin
(74) *Attorney, Agent, or Firm* — KDW Firm PLLC

(57) ABSTRACT

The disclosure relates to hydrogen mediated anionically polymerized conjugated diene compositions, including homopolymers and copolymers of isoprene and/or butadiene, and processes and compositions for preparing them.

29 Claims, 13 Drawing Sheets

For Polybutadiene

*trans*-1,4-BD

*cis*-1,4-BD vinyl-1,2-BD vinycyclopentane (VCP)

For Polyisoprene

*trans*-1,4-IP

*cis* 1,4-IP vinyl-1,2-IP vinylidene-3,4-IP

(51) Int. Cl.
*C08F 4/48* (2006.01)
*C08F 236/06* (2006.01)
*C08F 236/08* (2006.01)

(52) U.S. Cl.
CPC ........ *C08F 236/08* (2013.01); *C08F 2400/02* (2013.01); *C08F 2500/02* (2013.01); *C08F 2500/17* (2013.01); *C08F 2500/27* (2021.01); *C08F 2500/32* (2021.01); *C08F 2800/20* (2013.01)

(58) Field of Classification Search
USPC .......................................................... 526/181
See application file for complete search history.

(56) References Cited

U.S. PATENT DOCUMENTS

| | | | | |
|---|---|---|---|---|
| 3,742,077 | A | 6/1973 | Kamienski et al. | |
| 3,760,025 | A | 9/1973 | Merkley | |
| 4,041,088 | A | 8/1977 | Bach et al. | |
| 4,049,732 | A | 9/1977 | Bach et al. | |
| 5,216,181 | A * | 6/1993 | Hargis | C08F 36/04 564/485 |
| 6,103,842 | A | 8/2000 | Halasa et al. | |
| 2006/0047033 | A1 | 3/2006 | Rachita et al. | |
| 2012/0202910 | A1 | 8/2012 | Shirai et al. | |
| 2019/0161566 | A1 | 5/2019 | Layman, Jr. | |
| 2025/0179233 | A1 * | 6/2025 | Layman | C08F 4/48 |

FOREIGN PATENT DOCUMENTS

| | | | |
|---|---|---|---|
| EP | 2476710 | A1 | 7/2012 |
| JP | S5130287 | A | 3/1976 |
| JP | 2019513862 | A | 5/2019 |
| JP | 2019517613 | A | 6/2019 |
| WO | 2011045918 | A1 | 4/2011 |
| WO | 2017176740 | A1 | 10/2017 |
| WO | 2017184350 | A1 | 10/2017 |
| WO | 2018047008 | A2 | 3/2018 |

OTHER PUBLICATIONS

Kozak, et al., "Influence of Polar Modifiers on Microstructure of Polybutadiene obtained by Anionic Polymerization. Part 5: Comparison of μ, σ, σ+ μ, and σ- μ complexes", International Journal of Polymer Analysis and Characterization, Sep. 16, 2016, pp. 1-5, vol. 22, 2017, Issue 1.

International Search Report and Written Opinion of PCT/US2021/048684, mailed Jan. 3, 2022.

International Preliminary Report on Patentability of PCT/US2021/048684, completed Nov. 25, 2022.

Kozak et al., "Influence of Polar Modifiers on Microstructure of Polybutadiene Obtained by Anionic Polymerization. Part 1: Lewis Base (σ) Amine-Type Polar Modifiers," International Journal of Polymer Analysis and Characterization, vol. 20, Issue 7: 574-588 (2015)—Abstract.

Milner et al., "Anionic telomerization of butadiene with toluene and diphenylmethane: microstructure and molecular weight," Polymer, vol. 26, Issue 8: 1265-1267 (Aug. 1985)—Abstract.

European Office Action in EP Application No. 21789902.0 dated Aug. 13, 2025, 5 pages.

Daasbjerg, K, "Estimation of the pKa for some hydrocarbons and aldehydes and solvation energies of the corresponding anions," Acta Chemica Scandinavica, vol. 49: 878-887 (1995).

Fox et al., "Influence of molecular weight and degree of crosslinking on the specific volume and glass temperature of polymers," Journal of Polymer Science, vol. 15, Issue 80: 371-390 (Feb. 1955)—Abstract.

Hseigh et al., "Anionic Polymerization Principles and Practical Applications," New York, Chapter 5: General Aspects of Anionic Polymerization, Chapter 19: Application of Styrenic Thermoplastic Rubbers in Plastics Modifications, Adhesives, and Footwears: 96-99, 615 (1996)—Abstract.

Luxton, A. R.: "The Preparation. Modification and Applications of Nonfunctional Liquid Polybutadienes", Rubber Chemistry and Technology, vol. 54, Issue 3: 596-626 (Jul. 1981)—Abstract.

Quack et al., "The Nuclear Magnetic Resonance Characterization of a Cyclic Structure in Anionically Prepared Polybutadiene," Macromolecules, vol. 11, Issue 2: 369 (Mar. 1978).

Rudin: "The Elements of Polymer Science and Engineering: An Introductory Text for Engineers and Chemists", Academic Press, Chapter 2: Basic Principles of Polymer Molecular Weights, pp. 41-71 (1982).

Shimba et al., "Characterization of Microstructure in Styrene-Butadiene Rubber by FT-IR Spectroscopy Using Single Reflection ATR," Analytical Sciences, vol. 17: 11503 (2001).

Japanese Office Action in JP Application No. 2023-514387 dated Jul. 30, 2025, 6 pages.

Chinese First Office Action in CN Application No. 202180072720.7 dated Dec. 5, 2025, 6 pages.

* cited by examiner

For Polybutadiene

*trans*-1,4-BD

*cis*-1,4-BD vinyl-1,2-BD vinycyclopentane (VCP)

For Polyisoprene

*trans*-1,4-IP

*cis* 1,4-IP vinyl-1,2-IP vinylidene-3,4-IP

PROCESS AND CATALYSTS FOR HYDROGEN MEDIATED ANIONIC POLYMERIZATION OF CONJUGATED DIENES AND LIQUID POLYMERS THEREOF

CROSS-REFERENCE TO RELATED APPLICATIONS

This application, filed Sep. 1, 2021, under 35 U.S.C. § 119(e), claims the benefit of U.S. Provisional Patent Application Ser. No. 63/073,388, filed Sep. 1, 2020, entitled "PROCESS AND CATALYSTS FOR HYDROGEN MEDIATED ANIONIC POLYMERIZATION OF CONJUGATED DIENES AND LIQUID POLYMERS THEREOF," the entire contents and substance of which are hereby incorporated by reference as if fully set forth below.

TECHNICAL FIELD

The various embodiments of the disclosure relate generally to processes and compositions for hydrogen mediated anionically polymerized conjugated diene (CD) compositions, including homopolymers and copolymers of isoprene and/or butadiene, and processes and compositions for preparing them. It is particularly useful for processes and catalysts compositions that form hydrogen mediated polyisoprene (HMPIP) as well as hydrogen mediated polybutadiene (HMPBD) as liquid polymer distribution compositions. The lithium alkoxide complexed saline hydride (LOXSH) catalyst disclosed herein can provide control of both the regioselectivity and stereoselectivity during the polymerization process to form a variety of hydrogen mediated poly-conjugated diene (HMPCD) product distributions.

BACKGROUND

Conjugated dienes such as butadiene and isoprene represent a class of olefins that have been utilized in numerous polymerization applications, and the polymer products derived from them are extensively used across several categories of products. For example, approximately 70% of polybutadiene production is utilized in the manufacture of tires. Several copolymers and co-resins can include styrene and butadiene as well, such as styrene butadiene rubber (SBR) and acrylonitrile butadiene styrene (ABS). There are also many grades of liquid butadiene rubbers (LBRs) that are manufactured and sold commercially.

Polymerization of dienes generally produces an olefinic bond within each polymerized unit, but the olefinic bond can be one of several microstructural motifs, including microstructures with a cis-1,4- bond, a trans-1,4 bond, or a vinyl-1,2 pendant to the polymer. (See, for example, FIG. 1.) The polymer microstructure and polymer chain length distribution of the polymerized conjugated diene can generate products with a range of characteristics, including glass transition temperature ($T_g$), polymer viscosity, molecular weight, polydispersity, and asymmetry. The ability to selectively prepare low molecular weight poly(conjugated dienes), while controlling viscosity and polymer microstructure, would give access to a new range of poly(conjugated dienes) products and potential co-polymers. A less desirable microstructure motif formed in high vinyl polybutadiene compositions is the vinylcyclopentane (VCP) repeating unit. This microstructure is undesired for three reasons: 1) it reduces the number of double bonds available for derivatization: 2) it increases the glass transition temperature; and 3) it deleteriously increases viscosity—essentially exponentially relative to compositions number average molecular weight or $M_n$. This motif is known to form under anionic polymerizations conditions wherein the penultimate vinyl-1,2 butadiene repeating unit of a living polybutadiene chain undergoes a cyclization reaction with the anionic lithium (polybutadienyl) anion end group. For the purpose of determining total vinyl content one VCP repeating unit is regarded to have arisen from two vinyl-1,2 motifs.

Generally speaking high vinyl-1,2 low molecular weight polybutadiene compositions are formed under chain transfer conditions wherein an aromatic hydrocarbon having one or more methyl groups (e.g. toluene) is the chain transfer agent. Effective chain transfer generally occurs when the chain transfer polymerization is conducted at higher temperatures (>70° C.) and/or higher ratios of a polytertiaryamine promotor (e.g. TMEDA) to lithium (TMEDA:Li is in the range of 1.5:1 to 8:1). Thus in order to achieve the desired level of chain transfer—to make low molecular weight compositions—higher temperatures and higher promotor:Li ratios can be required. However higher temperature and/or higher amine to lithium ratios leads to ever increasing levels of incorporation of the VCP microstructure of the product compositions' polymer chains. Consequently low molecular weight compositions exhibit increased $T_g$ and viscosity at the otherwise desired reduced $M_n$.

LITHENEACTIV™ 50 available from Synthomer is reported to have a vinyl-1,2 content of 70 to 80%, $M_n$=900, non-volatile content of >98% and viscosity @25° C. of 30-65 dPa·s (3000 to 6500 cP). LITHENE™ ULTRA AL is reported to have a high vinyl-1,2 content of 40-55% $M_n$=700, non-volatile content of >95% and viscosity @25° C. of 30-55 dPa·s (3000 to 5500 cP). Synthomer has one more grade of high vinyl grade, LITHENE™ ULTRA PH that is reported to have a vinyl-1,2 content of 35-50% $M_n$=2600, non-volatile content of >99% and viscosity @ 25° C. of 65-90 dPa·s (6500 to 9000 cP). These LITHENE™ compositions are made via organic chain transfer processes with lithium-based chain transfer catalyst systems. The compositions are of high viscosity indicating high levels of the VCP microstructure motif. Ricon® 156 and 157, are among two commercially available high vinyl (1,2-vinyl content of 70%) compositions products available from Cray Valley, a brand of Total. Having been made with sodium-based chain transfer catalyst they are of lower viscosity (low or no VCP microstructure) than that of the LITHENE products but like the LITHENE products have incorporated at least one aralkyl (e.g. a toluene residue) or aryl (e.g. benzene residue) moiety in each polymer chain. The technical data for each report the following values: Ricon 156: $M_n$=1400, viscosity @25° C. of 1600 cP and $T_g$=−56° C.; and Ricon 157 $M_n$=1800, viscosity @25° C. of 6000 cP and $T_g$=−51C respectively. Low viscosity along with low volatile content are highly desired properties, but although viscosity generally decreases with decreasing molecular weight, the volatile content increases. The following excerpt from Anionic Polymerization Principles and Practical Applications (Hseigh, H. L. and Quirk, R. P. Marcel Dekker, Inc. New York, 1996. pg. 615.) makes clear the desirable characteristics of nonfunctional liquid polybutadienes:

> "Nonfunctional liquid polybutadienes contain high levels of unsaturation. The iodine number of these polymers is usually in the range of 400-450. For this reason they can be modified in a variety of ways. In fact, the low-molecular-weight polybutadienes are easier to modify chemically than high-molecular-weight polymers: higher concentrations of reagents can be used with minimum levels of solvent . . . ."

"... three main features of liquid BRs have an important bearing on their application. First, the bulk and solution viscosity are important in relation to designing formulations with the minimum levels of solvent or reactive diluent .... Second, the high level of unsaturation, in addition to facilitating chemical modifications, enables the liquid BRs to be readily cured. Third, the hydrocarbon backbone results in a polymer, which, after cure, is highly resistant to hydrolysis and other chemical attacks."

High vinyl-1,2 compositions can be highly desirable because they are very reactive and are easier to crosslink. However as the review of commercial samples recited above makes clear, such high vinyl-1,2 compositions suffer from relatively high viscosity at low molecular weights and lower molecular weights increase the volatile content. The compositions incorporate at least one organic chain transfer agent per polymer chain of the distribution. Strategies exist that have been employed to form liquid polybutadiene compositions of lower viscosity having: A) high vinyl-1,2 polybutadiene content formed via living anionic butadiene polymerization; B) low vinyl-1,2 polybutadiene with high 1,4-butadiene (mostly trans-1,4 butadiene); as well as C) high cis-1,4-butadiene formed via Ziegler polymerization requiring Nickel catalysts with varying quantities of trialkylaluminum and/or alkylaluminum halides; wherein ethylene, or propylene or butylene is used as a chain growth modifier to achieve low molecular weight compositions. The challenges and limitations of the Ziegler process chemistry is described by Luxton (Luxton, A. R., *Rubber Chem. & Tech.,* 1981, 54, 591). The Nippon Soda Co. offers three commercial grades of liquid polybutadiene (brand name NISSO-PB): B-1000 vinyl-1,2 content of 85% $M_n$=1200, $T_g$=−44° C. and viscosity @ 45° C. of 10 Poise (1000 cP); B-2000 vinyl-1,2 content of 88% $M_n$=2100, $T_g$=−29° C. and viscosity (ii 45° C. of 65 Poise (6,500 cP); and B-3000 vinyl-1,2 content of 90% $M_n$=3200, $T_g$=−21° C. and viscosity @ 45° C. of 210 Poise (21,000 cP). Synthomer provides a low vinyl liquid polybutadiene Lithene Ultra P4-25P reported to have a vinyl-1,2 content of 15-25% $M_n$=2200, non-volatile content of >99.8% and viscosity @ 25° C. of 20-30 dPa·s (2000 to 3000 cP). Evonik provides two high cis-1,4-butadiene commercial compositions: 1) Polyvest® 110 with 1,4-butadiene content 99% cis/trans≈3.13, $M_n$=2600, and viscosity @ 20° C. of 700-800 mPa·s (700 to 800 cP); and 2) Polyvest® 130 with 1,4-butadiene content 99% cis/trans≈3.5, $M_n$=4600, and viscosity @20° C. of 2700-3300 mPa·s (2700 to 3300 cP).

Polybutadiene telomers (telomerization with toluene) can provide low viscosity (Brookfield 25° C. of 300, 700 and 8500 cP) of low molecular weight (900, 1300, and 2600 Daltons respectively) liquid butyl rubbers wherein the vinyl content is less than about 50%. Such compositions are produced at lower temperatures and require the addition of a potassium or sodium metal alkoxide (e.g. potassium or sodium tert-butoxide). It is also understood in the art that telomerization catalyst formed from butyllithium and TMEDA will provide BR telomers having 40-50% vinyl microstructure and 15-20% vinylcyclopentane microstructure. Such a BR telomer distribution having a $M_n$ of 1000 Daltons have a Brookfield viscosity at 25° C. of 4000 cP. Likewise, a BR telomer distribution having a $M_n$ of 1800 Daltons will have a Brookfield viscosity at 35° C. of 45,000 cP (in this connection see Luxton, A. R., *Rubber Chem. & Tech.,* 1981, 54, 591).

High vinyl content can be desired because the vinyl-1,2 motif reacts faster in some chemistries than the 1,4-olefins. Moreover, low viscosity, low $T_g$ and low molecular weights can be desirable physical properties and characteristics. High vinyl, highly reactive compositions of low molecular weight liquid polybutadiene are available, but such compositions are of higher viscosity and higher glass transition temperature and have low vinyl-1,2-BD:vinylcyclopentane ratios—typically <3.33:1. Likewise low vinyl and near vinyl free (however less reactive), low to modestly low molecular weight liquid polybutadiene compositions are also available. But, a need still exists for an industrially efficient and cost-effective process technology that can provide new liquid polybutadiene compositions of modestly high (greater than 55 wt %) to high (as high as about 82 wt %) vinyl-1,2 content (as determined by C-13 NMR analyses) while maintaining a high vinyl-1,2-BD to VCP ratio and thus provide liquid polybutadiene compositions of both increased reactivity and low-viscosity. Moreover, the low molecular chains could be comprised solely of the conjugated diene (i.e. no organic chain transfer agent). The entire span of these properties of liquid polybutadiene compositions can be easily manufactured by this disclosure using chemistry that can be very tunable inexpensive catalyst systems and with chain transfer affected with a very inexpensive chain transfer agent—hydrogen.

BRIEF SUMMARY

The various embodiments of the disclosure relate generally to processes, catalysts, compositions, and polymer products for liquid poly-conjugated diene products.

An embodiment of the disclosure can be a process for polymerizing conjugated dienes in a hydrocarbon reaction medium. The process can include the chemical addition of a lithium alkoxide complexed saline hydride LOXSH reagent to a conjugated diene to form a polymer initiating species and polymerizing at least a portion of the conjugated diene. Another embodiment of the disclosure can be a process for hydrogen mediated polymerization of conjugated dienes in a hydrocarbon reaction medium, where the process can similarly include the chemical addition of a lithium alkoxide complexed saline hydride (LOXSH) reagent to a conjugated diene to form a polymerization initiator and polymerizing the CD in the presence of hydrogen or hydride mediation (e.g. organic silicon hydrides). In each process, the LOXSH reagent comprises one or more σ-μ polar modifiers. The process can also be conducted in the presence of molecular hydrogen, and can include co-feeding at least two gaseous and/or volatile compounds to the reaction medium, wherein the at least two gaseous and/or volatile compounds include the hydrogen and the conjugated diene.

An embodiment of the disclosure can be the processes above where the conjugated diene comprises isoprene and/or butadiene. The process can include butadiene, isoprene, 2-methyl-1,3-pentadienes (E and Z isomers); piperylene; 2,3-dimethylbutadiene; 2-phenyl-1,3-butadiene; cyclohexadiene; β-myrcene; β-farnesene; and hexatriene The process can further include copolymerizing with non-conjugated anionically polymerizable hydrocarbon monomers (e.g. ethylene, styrene, methyl-styrene(s), vinyl-naphthalene, and the like) with the conjugated diene.

In an embodiment of the disclosure, the one or more σ-μ polar modifiers can be selected from one or more of the Structures 1-IX:

$$R—Σ—R^2—OH \qquad \text{I}$$

-continued

II $HO—R^2—\Sigma—R^2—OH$

III

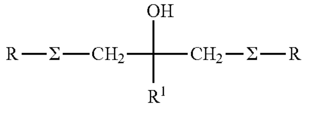

IV

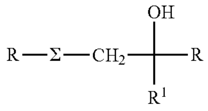

V

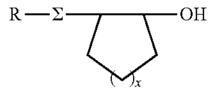

VI

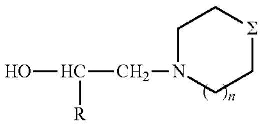

VII

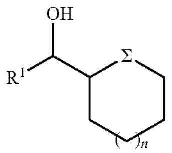

VIII

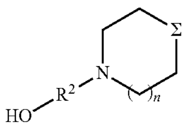

IX

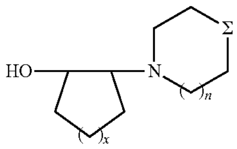

R can be independently an alkyl group which may also be further substituted by other tertiary amines or ethers. $R^1$ can be independently a hydrogen atom or an alkyl group which may also be further substituted by other tertiary amines or ethers. $R^2$ can be $—(CH_2)_y—$, wherein y=2, 3, or 4. Σ can include: i) O or NR for I, II, III, IV, and V; ii) and O or NR or $CH_2$ for VI, VII, VIII and IX. The term n can be independently a whole number equal to or greater than 0, and the term x can be independently a whole number equal to or greater than 1. It is to be understood and appreciated that for structures V-IX above and below, when n is equal to zero that means that the carbon atom does not exist and that a single covalent bond exists between the two adjoining atoms of the structure.

In an embodiment of the disclosure, the reaction medium for the process can be a hydrocarbon solvent with a $pK_a$ greater than that of $H_2$. In an embodiment of the disclosure, the reaction medium can include molecular hydrogen and the partial pressure of molecular hydrogen can be maintained either by a set hydrogen regulator or autogenously by a set relative hydrogen feed rate at partial pressures between about 0.01 Bar to about 19.0 Bar. In an embodiment of the disclosure, the process can include a temperature that can be maintained in the range of about 20° C. to about 130° C. In an embodiment of the disclosure, the process can include a relative feed rate of conjugated diene to hydrogen of from about 5 mole to about 42 mole CD/mole $H_2$. In an embodiment of the disclosure, the molar ratio of the total charge of monomer to soluble saline hydride catalyst can be about 10:1 to about 1000:1. In an embodiment of the disclosure, the saline hydride catalyst can be one or more of 1) LOXLiH reagent; 2) LOXNaH reagent; 3) $LOXMgH_2$; and/or 4) LOXKH reagent.

In an embodiment of the disclosure, the aminoalcohol (AA) σ-μ polar modifier can be one more of N,N-dimethylethanolamine; 1-(dimethylamino)-2-propanol; 1-(dimethylamino)-2-butanol; trans-2-(dimethylamino)cyclohexanol; 2-piperidinoethanol; 1-piperidino-2-propanol; 1-piperidino-2-butanol; trans-2-piperidinocyclohexan-1-ol; 1-pyrrolidinoethanol; pyrrolidinylpropan-2-ol; 1-(1-pyrolidinyl)-2-butanol; 2-pyrolidinocyclohexanol; 4-methyl-1-piperazineethanol; 1-(4-methyl-1-piperazinyl)-2-propanol; 1-(4-methyl-1-piperazinyl)-2-butanol; trans-2-(4-methyl-1-piperazinyl)-cyclohexanol; 1-methyl-2-piperidinemethanol; 1-methyl-2-pyrrolidinemethanol; dimethylaminoethanol; N-methyl-diethanolamine; 3-dimethylamino-1-propanol; 1,3-bis(dimethylamino)-2-propanol; 2-{[2-dimethylamino)ethyl]methylamino}ethanol.

In an embodiment of the disclosure, the tertiary amino-ether-alcohol (AEA) σ-μ polar modifier can be 2-morpholinoethanol; 1-(4-morpholinyl)-2-propanol; 1-(4-morpholinyl)-2-butanol; trans-2-morpholin-4-ylcyclohexanol; 2-[2-(dimethylamino)ethoxy]ethanol; 2-(2-(piperidyl)ethoxy)ethanol; 2-[2-(4-morpholinyl)ethoxy]ethanol; 2-[2-(1-pyrrolidinyl)ethoxy]ethanol; 2-[2-(4-methyl-1-piperazinyl)ethoxy]ethanol.

In an embodiment of the disclosure, the process can include one or more of the σ-μ polar modifiers described above, and can further include one or more of ether-alcohol (EA) σ-μ polar modifier 2-methoxyethanol, 1-methoxypropan-2-ol, 1-methoxybutan-2-ol, 2-methoxycyclohexan-1-ol, tetrahydrofurfuryl alcohol, tetrahydropyran-2-methanol, diethylene glycol monomethyl ether.

In an embodiment of the disclosure, the LOXSH catalyst can include between about 50 mole % to less than 100 mole % of a tertiary amino-alcohol or a tertiary amino-ether-alcohol σ-μ polar modifier and from about 50 mole % to greater than 0 mole % of an ether-alcohol σ-μ polar modifier. The tertiary amino-alcohol σ-μ polar modifier selected from one or more of N,N-dimethylethanolamine; 1-(dimethylamino)-2-propanol; 1-(dimethylamino)-2-butanol; trans-2-(dimethylamino)cyclohexanol; 2-piperidinoethanol; 1-piperidino-2-propanol; 1-piperidino-2-butanol; trans-2-piperidinocyclohexan-1-ol; 1-pyrrolidinoethanol; pyrrolidinylpropan-2-ol; 1-(1-pyrolidinyl)-2-butanol; 2-pyrolidinocyclohexanol; 4-methyl-1-piperazineethanol; 1-(4-methyl-1-piperazinyl)-2-propanol; 1-(4-methyl-1-piperazinyl)-2-butanol; trans-2-(4-methyl-1-piperazinyl)-cyclohexanol; 1-methyl-2-piperidinemethanol; 1-methyl-2-pyrrolidinemethanol; dimethylaminoethanol; N-methyl-diethanolamine; 3-dimethylamino-1-propanol; 1,3-bis(dimethylamino)-2-propanol; 2-{[2-dimethylamino)ethyl]methylamino}ethanol. The tertiary amino-ether-alcohol can include 4-morpholineethanol; 1-(4-morpholinyl)-2-propanol; 1-(4-morpholinyl)-2-butanol; trans-2-morpholin-4-yl-cyclohexanol; 2-[2-(dimethylamino)ethoxy]ethanol; 2-(2-(piperidyl)ethoxy)ethanol; 2-[2-(4-morpholinyl)ethoxy]ethanol; 2-[2-(1-pyrrolidinyl)ethoxy]ethanol; 2-[2-(4-methyl-1-piperazinyl)ethoxy]ethanol. The ether-alcohol σ-μ polar modifier can be selected from one or more of 2-methoxyethanol; 1-methoxy-2-propanol; 1-methoxy-2-butanol; trans-2-methoxycyclohexanol; tetrahydrofurfuryl alcohol; 2-tetrahydropyranyl methanol, and diethylene glycol monomethyl ether.

In an embodiment, the process can further include either or both of a σ type polar modifier (e.g. sodium mentholate and the like) and/or a p type polar modifier (e.g. THF. TMEDA, and the like).

An embodiment of the disclosure can include a LOXSH catalyst or reagent composition, where the composition can be selective for 1,4-CD monomer microstructure enchainment. The composition can comprise 1) at least one tertiary amino alcohol σ-μ polar modifiers having a 2° or a 3° alcohol functional group; 2) an organolithium compound; and 3) optionally elemental hydrogen and/or an organo silicon hydride. The polar modifier can be selected from at least one of the structures:

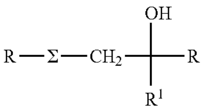

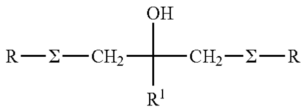

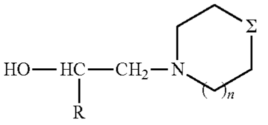

VII

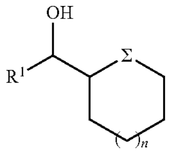

V

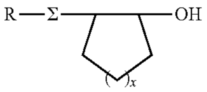

IX

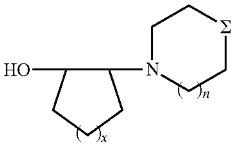

wherein R is independently an alkyl group which may also be further substituted by other tertiary amines or ethers, $R^1$ is independently a hydrogen atom or an alkyl group which may also be further substituted by other tertiary amines or ethers, Σ can include: i) O or NR for III, IV, and V; ii) and for VI, VII, and IX can include O or NR or $CH_2$; n is independently a whole number equal to or greater than 0, and x is independently a whole number equal to or greater than 1. The σ-μ polar modifier can include one or more of 1-dimethylamino-2-propanol, 1-piperidino-2-propanol, 1-pyrrolidinylpropan-2-ol, 1-morpholino-2-propanol, 1-(4-Methyl-1-piperazinyl)-2-propanol, 1-dimethylamino-2-butanol 1-piperidino-2-butanol, 1-pyrrolidinylbutan-2-ol, 1-morpholino-2-butanol, 1-(4-methyl-1-piperazinyl)-2-butanol, 2-dimethylaminocyclohexan-1-ol, 2-piperidinocyclohexan-1-ol, 2-pyrolidinocyclohexanol, 2-(4-methyl-1-piperazinyl)-cyclohexanol, 2-morpholinocyclohexan-1-ol, 1,3-bis(dimethylamino)-2-propanol, with optional addition of one or more of 2-methoxyethanol, 1-methoxypropan-2-ol, 1-methoxybutan-2-ol, 2-methoxycyclohexan-1-ol, tetrahydrofurfuryl alcohol, or tetrahydropyran-2-methanol; or diethylene glycol monomethyl ether.

An embodiment of the disclosure can include a LOXSH catalyst or reagent composition, wherein the composition can be selective for 3,4-CD and/or vinyl 1,2-CD monomer microstructure enchainment. The composition can comprise: a) at least one tertiary amino alcohol or tertiary ether alcohol σ-μ polar modifiers; b) at least one separate ether-alcohol σ-μ polar modifiers; c) an organo lithium compound; and d) optionally elemental hydrogen and/or an organo silicon hydride. The σ-μ polar modifiers can be selected from at least two of the structures:

$$R—\Sigma—R^2—OH \qquad \text{I}$$

$$HO—R^2—\Sigma—R^2—OH \qquad \text{II}$$

III

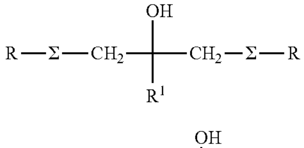

IV

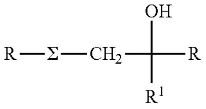

V

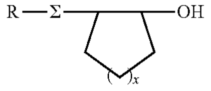

VI

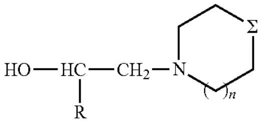

VII

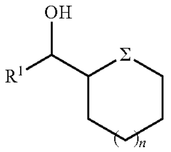

VIII

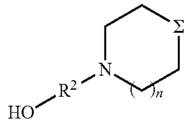

IX

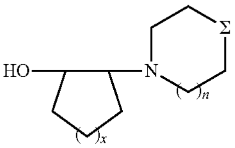

wherein R is independently an alkyl group which may also be further substituted by other tertiary amines or ethers, $R^1$ is independently a hydrogen atom or an alkyl group which may also be further substituted by other tertiary amines or ethers, $R^2$ is $—(CH_2)_y—$, wherein y=2, 3, or 4, Σ can include: i) O or NR for I, II, III, IV, and V; ii) and for VI, VII, VIII and IX can include O or NR or $CH_2$; n is independently a whole number equal to or greater than 0, and x is independently a whole number equal to or greater than 1. The σ-μ polar modifiers of the reagent comprises between about 50 mole % to less than 100 mole % of a tertiary amino-alcohol or a tertiary amino-ether-alcohol σ-μ polar modifier selected from one or more of: N,N-dimethylethanolamine; 1-(dimethylamino)-2-propanol; 1-(dimethylamino)-2-butanol; trans-2-(dimethylamino)cyclohexanol 2-piperidinoethanol; 1-piperidino-2-propanol; 1-piperidino-2-butanol; trans-2-piperidinocyclohexan-1-ol; 1-pyrrolidinoethanol; pyrrolidinylpropan-2-ol; 1-(1-pyrolidinyl)-2-butanol; 2-pyrolidinocyclohexanol; 4-methyl-1-piperazineethanol; (+/−)-1-(4-methyl-1-piperazinyl)-2-propanol; (+/−)-1-(4-methyl-1-piperazinyl)-2-butanol; trans-2-(4-methyl-1-piperazinyl)-cyclohexanol; 1-methyl-2-piperidinemethanol; 1-methyl-2-pyrrolidinemethanol. diethylaminoethanol, N-methyl-diethanolamine, and 3-dimethylamino-1-propanol; 1,3-bis(dimethylamino)-2-propanol; 2-{[2-dimethylamino)ethyl]methylamino}-ethanol. The tertiary amino-ether-alcohol can include 2-morpholinoethanol; 1-(4-morpholinyl)-2-propanol; 1-(4-morpholinyl)-2-butanol; trans-2-morpholin-4-ylcyclohexanol; 2-[2-(dimethylamino) ethoxy]ethanol; 2-(2-(piperidyl)ethoxy)ethanol; 2-[2-(4-morpholinyl)ethoxy]ethanol; 2-[2-(1-pyrrolidinyl)ethoxy] ethanol; 2-[2-(4-methyl-1-piperazinyl)ethoxy]ethanol. The ether-alcohol σ-μ polar modifier can be selected from one or more of 2-methoxyethanol; 1-methoxy-2-propanol; 1-methoxy-2-butanol; trans-2-methoxycyclohexanol; tetrahydrofurfuryl alcohol; 2-tetrahydropyranyl methanol, and diethylene glycol monomethyl ether. In an embodiment, the ratio of. total amino-alcohol (AA) and/or amino-ether-alcohol (AEA) to the total separate ether-alcohol (EE) σ-μ polar modifier ([AA+AEA]:EA) is in the range of about 9:1 to 1:1 and preferably in the range of about 4:1 to about 2:1

An embodiment of the disclosure can include hydrogen mediated anionic poly(conjugated diene) distribution composition, that can be characterized as having: 1) number average molecular weight distribution $M_n$ in the range of about 500 to about 2600 Daltons; 2) a Brookfield viscosity (25° C.) in the range of about 20 to about 200,000 cP; 3) 1,4-CD microstructure content in the range of 20% to about 85%; and 4) glass transition temperature $T_g$ in the range of about −120° C. to about −20° C.

DETAILED DESCRIPTION

Figure 1:
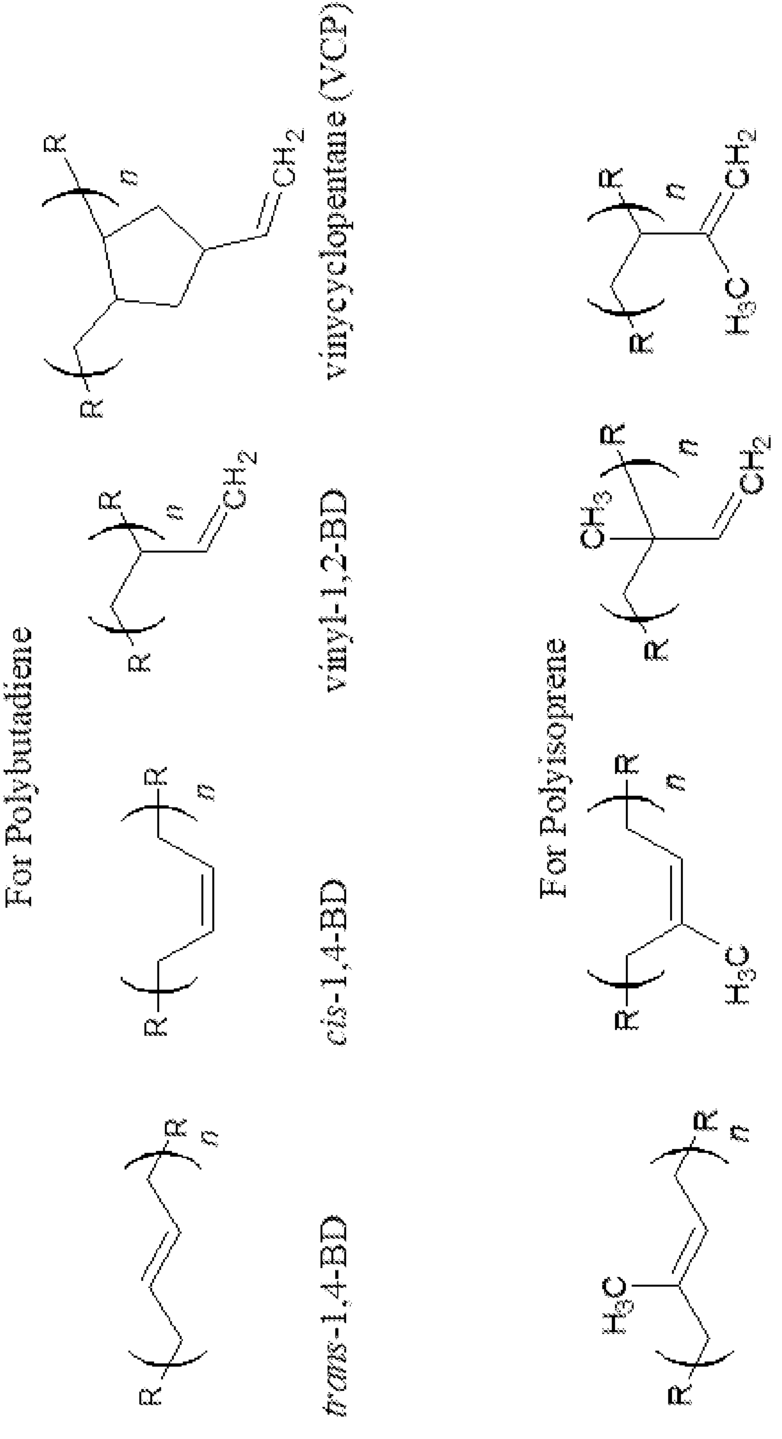
FIG. 1 illustrates standard polymer microstructural units for poly-conjugated dienes, including microstructures of compositions in accordance with exemplary embodiments of the disclosure.
Figure 2:
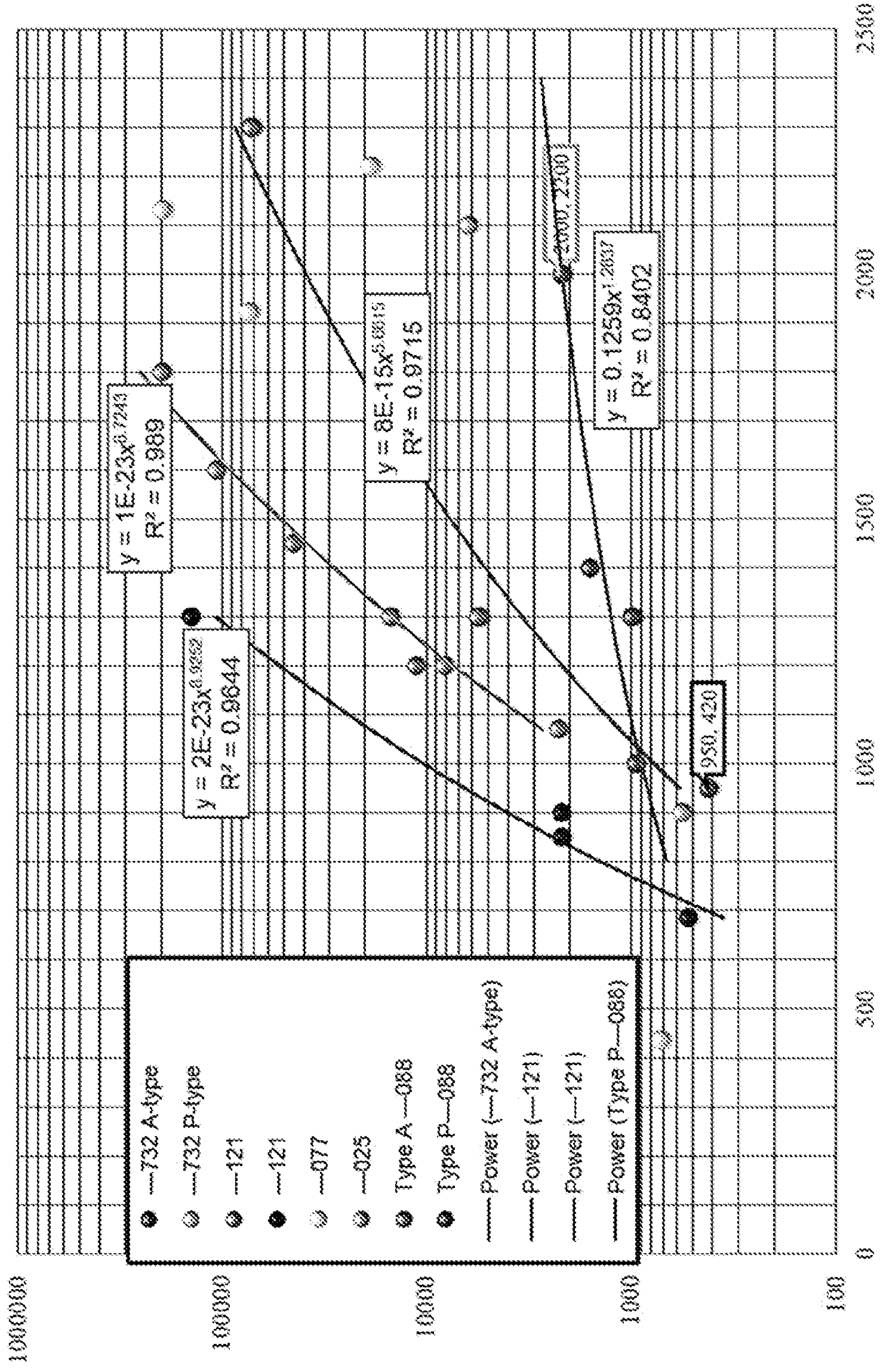
FIG. 2 illustrates an XY-Scatter Data of Viscosity (Y-axis cP) vs. $M_n$ (X-axis, Daltons) for toluene butadiene chain transfer telomer distributions, made in the Prior Art. A-Type TMEDA complexed lithium catalyst (high vinyl high viscosity). P-Type TMEDA complexed potassium catalyst (low vinyl, reduced viscosity) U.S. Pat. Nos. 3,678,121; 3,760,025; 3,742,077; 4,049,732; 4,041,088.
Figure 3:
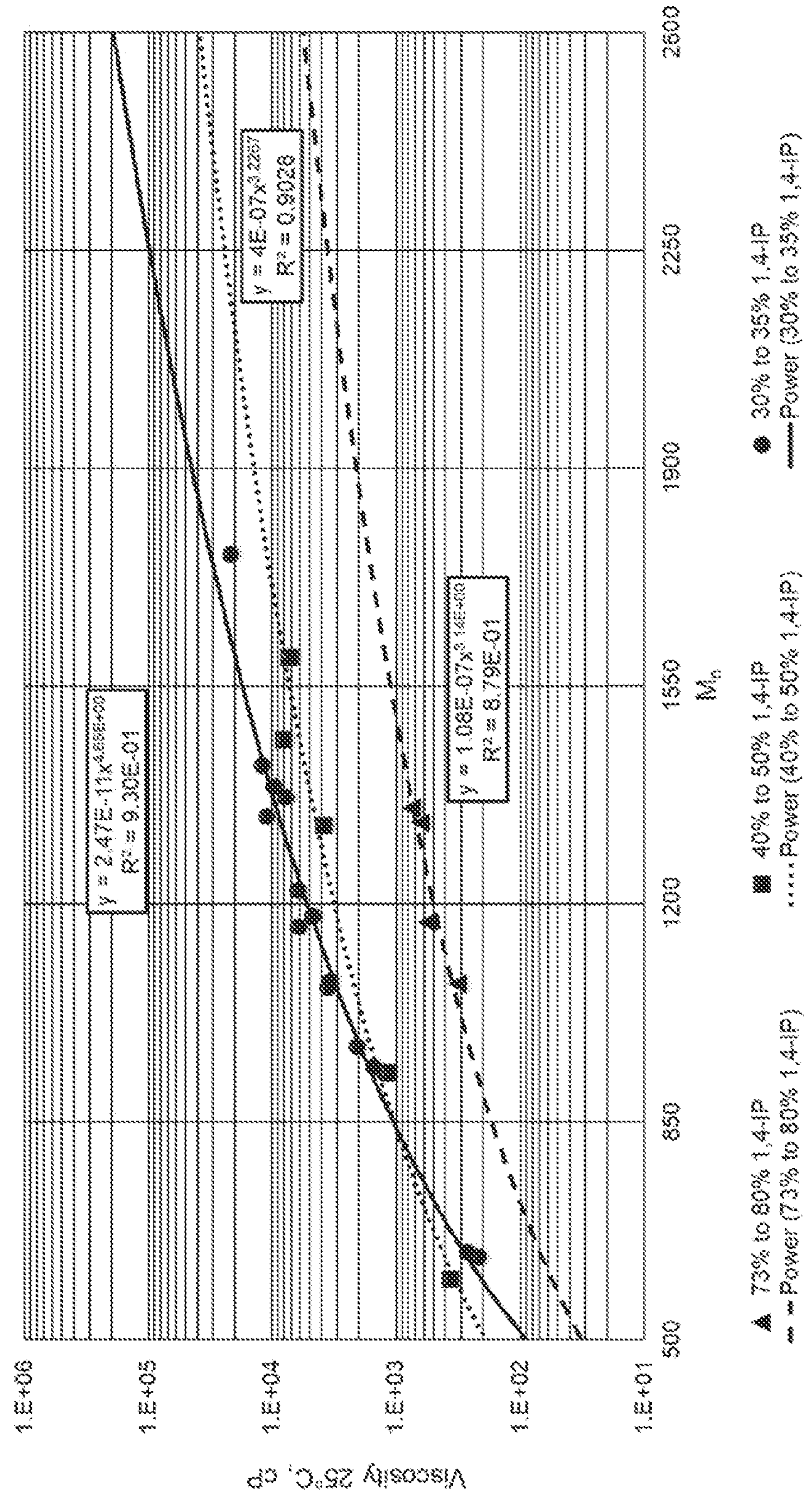
FIG. 3 illustrates XY-Scatter Data of Viscosity (Y-axis, Brookfield, 25° C., cP) vs. $M_n$(X-axis, Daltons) for hydrogen mediated polyisoprene (HMPIP) compositions having between 30% and 80% 1,4-IP contents in accordance with exemplary embodiments of the disclosure.
Figure 4:
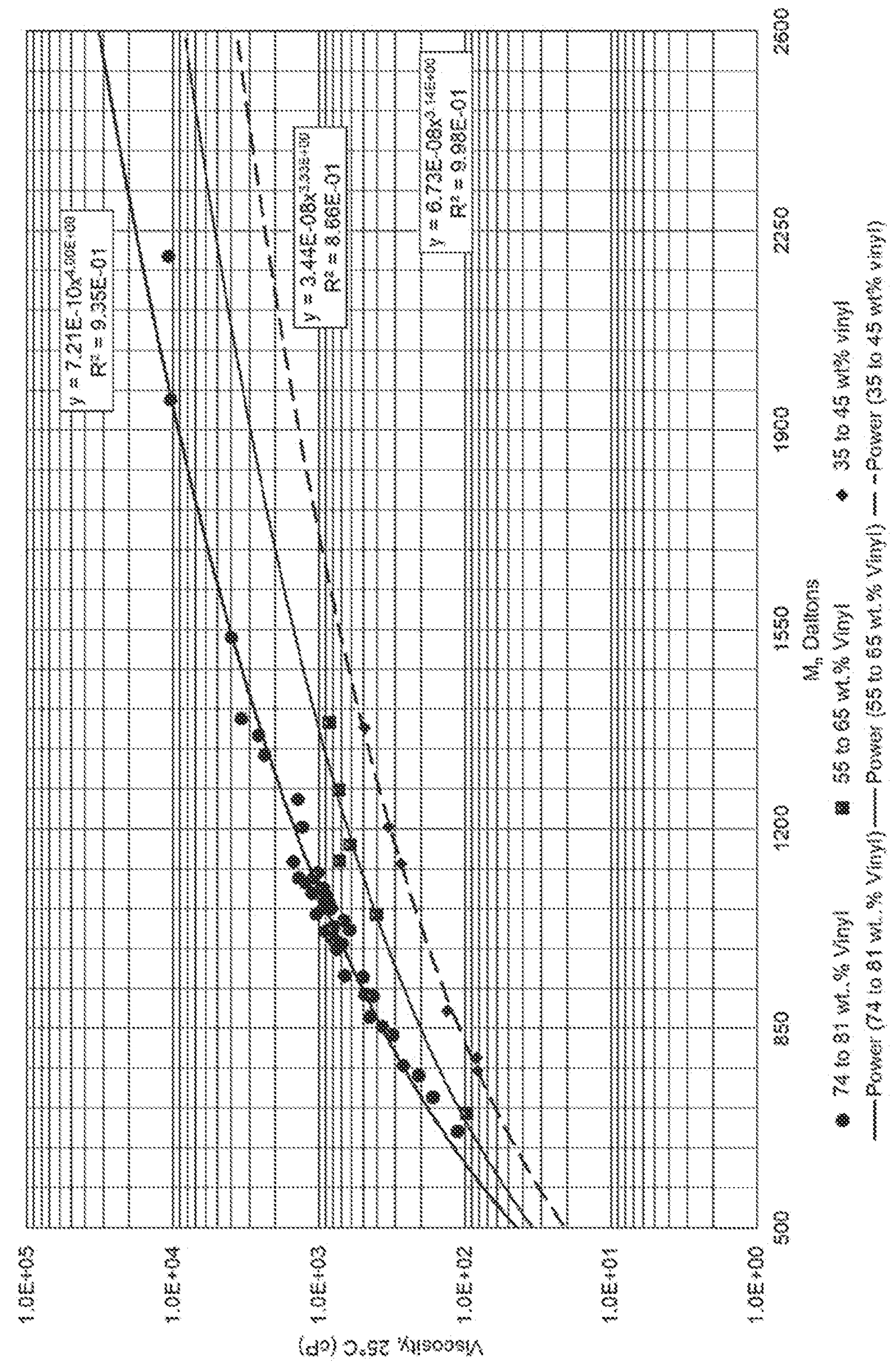
FIG. 4 illustrates XY-Scatter Data of Viscosity (Y-axis, Brookfield, 25° C., cP) vs. $M_n$ (X-axis, Daltons) for hydrogen mediated polybutadiene (HMPBD) compositions having 35 wt. % and 81 wt. % total vinyl contents in accordance with exemplary embodiments of the disclosure.
Figure 5:
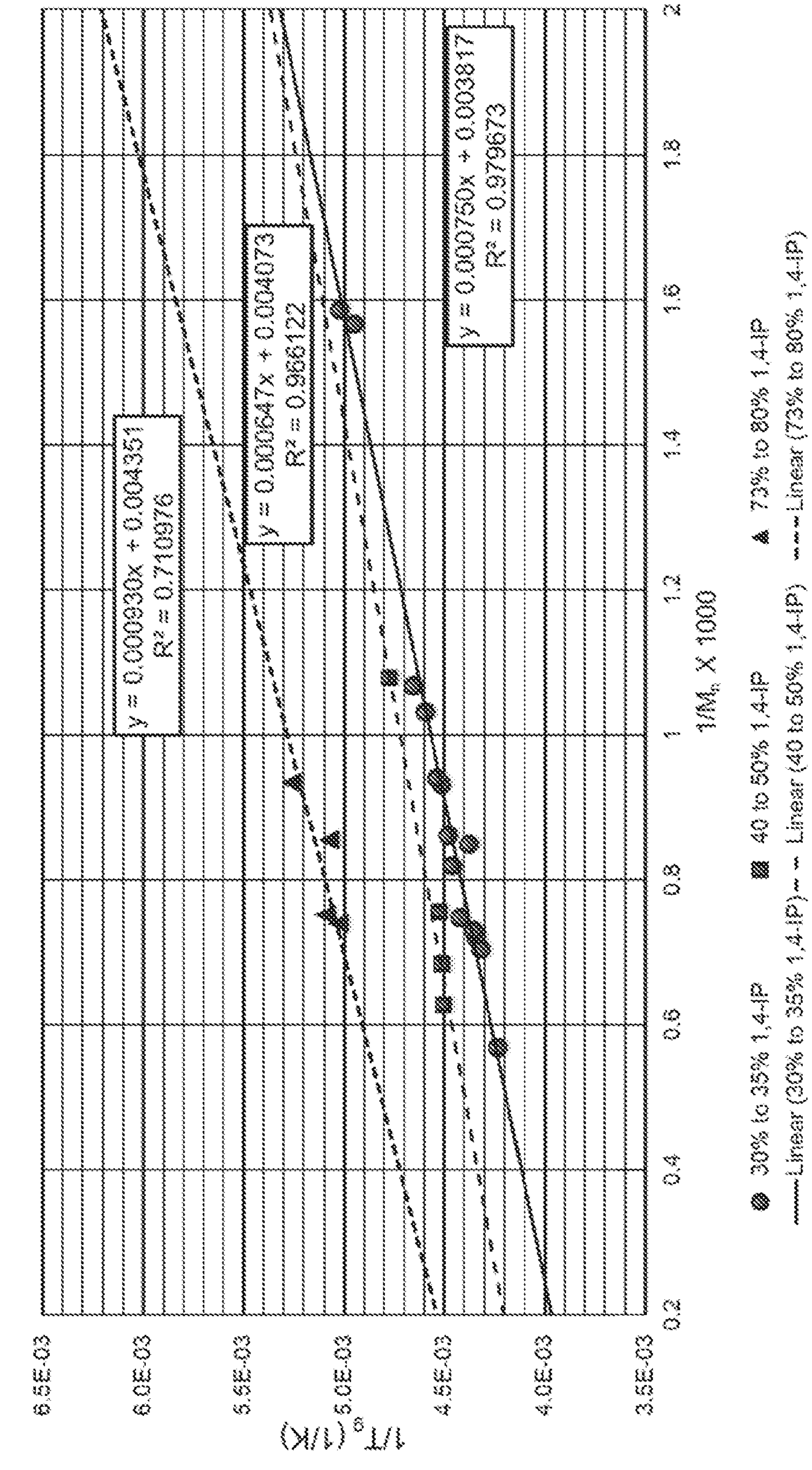
FIG. 5 illustrates XY-Scatter Data of 1/Tg (y axis $K^{-1}$) vs. $1/M_n$ (X-axis, $Daltons^{-1}$) for hydrogen mediated polybutadiene (HMPBD) compositions having between 30% and 80% 1,4-IP contents in accordance with exemplary embodiments of the disclosure.
Figure 6:
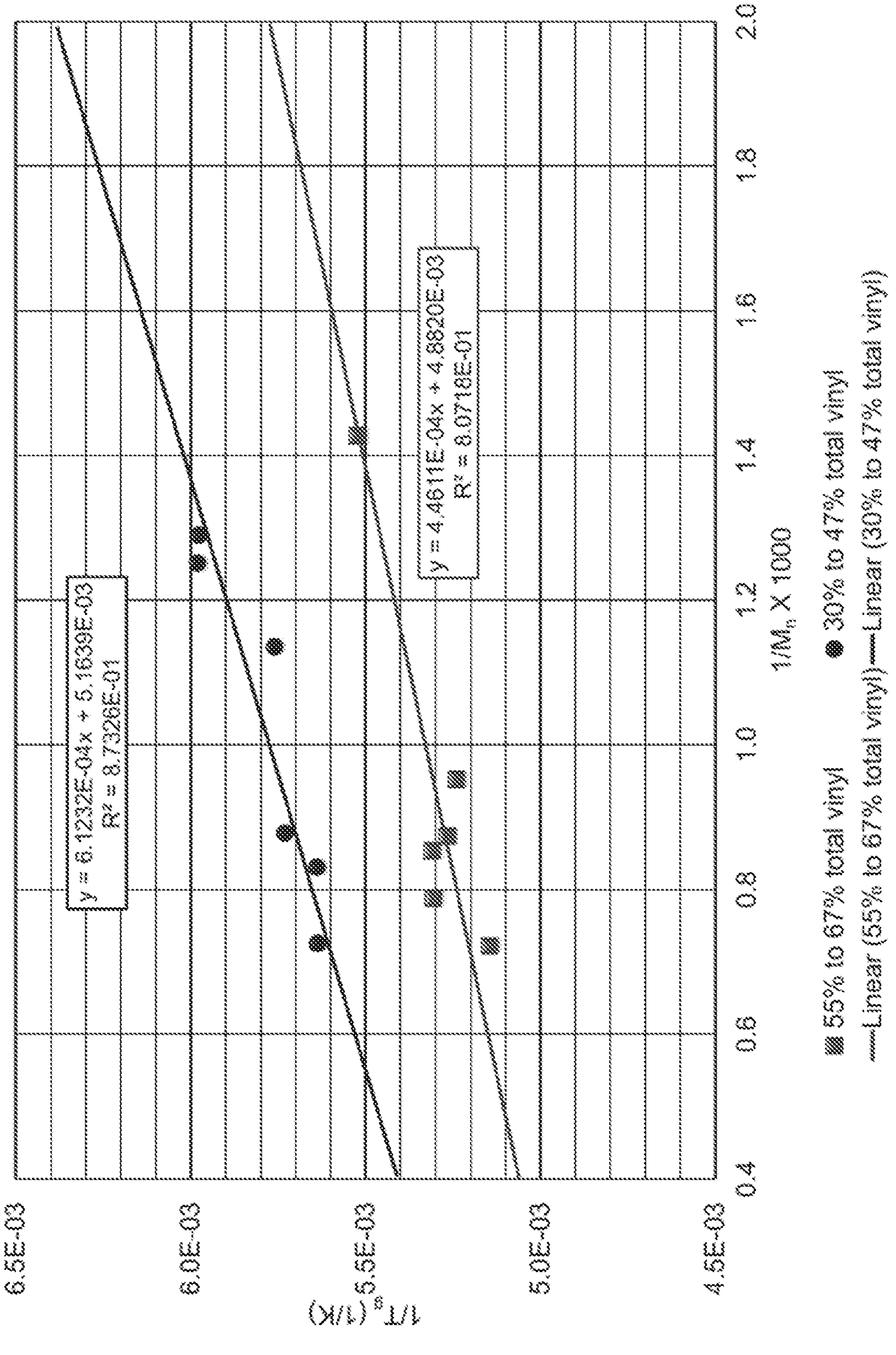
FIG. 6 illustrates XY-Scatter Data of 1/Tg (y axis $K^{-1}$) vs. $1/M_n$ (X-axis, $Daltons^{-1}$) for hydrogen mediated polybutadiene (HMPBD) compositions having between 30% and 67% total vinyl contents in accordance with exemplary embodiments of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

The term "and/or" means singular or a combination. For Example, "A and/or B" means "A" alone, "B" alone, or a combination of A and B.

The term "with or without" means singular or in combination. For Example, A with or without B means "A" alone or a combination of A and B.

It is also to be understood that the mention of one or more method or process steps does not preclude the presence of additional method steps or intervening method steps between those steps expressly identified. Similarly, it is also to be understood that the mention of one or more components in a device or system does not preclude the presence of additional components or intervening components between those components expressly identified.

The term "alkyl", as used herein, unless otherwise indicated, includes saturated monovalent hydrocarbon radicals having straight or branched moieties. Examples of alkyl groups include, but are not limited to, methyl, ethyl, propyl, isopropyl, butyl, isobutyl, t-butyl, pentyl and hexyl.

The term "aryl", as used herein, unless otherwise indicated, includes an organic radical derived from an aromatic hydrocarbon by removal of one hydrogen, such as phenyl, naphthyl, indenyl, and fluorenyl. "Aryl" encompasses fused ring groups wherein at least one ring is aromatic.

The term "aralkyl" as used herein indicates an "aryl-alkyl-" group. Non-limiting example of an aralkyl group is benzyl ($C_6H_5CH_2$—) and methylbenzyl ($CH_3C_6H_4CH_2$—).

The term "alkaryl" as used herein indicates an "alkyl-aryl-" group. Non-limiting examples of alkaryl are methylphenyl-, dimethylphenyl-, ethylphenyl-propylphenyl-, isopropylphenyl-, butylphenyl-, isobutylphenyl- and t-butylphenyl-.

The term "cycloalkyl", as used herein, unless otherwise indicated, includes non-aromatic saturated cyclic alkyl moieties wherein alkyl is as defined above. Examples of cycloalkyl include, but are not limited to, cyclopropyl, cyclobutyl, cyclopentyl, cyclohexyl, and cycloheptyl.

The term "polymer", as used herein, unless otherwise indicated, refers to the term "polymer" as defined in the context of the OECD definition of "polymer", which is as follows:

> "A chemical substance consisting of molecules characterized by the sequence of one or more types of monomer units and comprising a simple weight majority of molecules containing at least three monomer units which are covalently bound to at least one other monomer unit or other reactant and which consists of less than a simple weight majority of molecules of the same molecular weight. Such molecules must be distributed over a range of molecular weights wherein differences in the molecular weight are primarily attributable to differences in the number of monomer units."

Saline Hydrides (meaning ionic hydrides), as used herein, unless otherwise indicated, is defined by the presence of hydrogen as a negatively charged ion, $H^-$, in combination with an alkali metal or alkaline earth metal said alkali metals include lithium, sodium, potassium, rubidium, and cesium; and said alkaline earth metals include magnesium and calcium.

Polymer Microstructure and Molecular Architectures: Polymer microstructure as used here refers to a discrete polymer chain's (or chain length distribution of such chains) configuration in terms of its composition, sequence distribution, steric configuration, geometric and substitutional isomerism. An important microstructural feature of a polymer can be its architecture and shape, which relates to the way branch points lead to a deviation from a simple linear chain. For anionically polymerized polybutadiene and polyisoprene it is well understood that several constitutional microstructures can be formed (see FIG. 1).

Polar modifiers, as used herein, unless otherwise indicated, generally includes four different cases based on how they interact, moreover, complex with the cationic counterion(s) of the polymerization catalyst and/or initiator. The designations are σ, μ, σ+μ and σ-μ. A "a complex" denotes a polar modifier that is a Lewis base, e.g. THF TMEDA. A "p complex" denotes a polar modifier that is a Lewis acid e.g. sodium mentholate (SMT). A "σ+μ complex" denotes a mixture of polar modifiers contain both a Lewis base and an acid. A "σ-μ complex" denotes a polar modifier wherein both the Lewis base and acid are on the same ligand e.g. DMEA (DMAE). A comparison of the differing effects of 20 separate polar modifiers or combinations of polar modifiers (i.e. σ+μ) initiators on the vinyl content (ranging from 10% to 90% vinyl-1,2) of anionically polymerized butadiene is provided by Kozak and Matlengiewicz (Kozak, R., Matlengiewicz, M., "Influence of Polar Modifiers on Microstructure of Polybutadiene Obtained by Anionic Polymerization. Part 5: Comparison of μ, σ σ+μ and σ-μ Complexes" *Int. J. Polym. Anal. Charact.* 2017, 22, 51-61).

LOXSH, as used herein, unless otherwise indicated, can include a lithium amino-alkoxide complexed saline hydride, a lithium amine-ether-alkoxide complexed saline hydride, or a lithium ether-alkoxide complexed saline hydride formed from: (i) molecular hydrogen; (ii) an organolithium compound with or without an organomagnesium compound; (iii) optionally a polytertiaryamine compound (a type polar modifier); (iv) a tertiary amino alcohol and/or a tertiary amino ether-alcohol and/or a ether-alcohol (σ-μ polar modifiers); (v) an optional solid alkali or alkaline earth metal hydride or an alkali metal or alkali metal alloy (vi) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; and (vii) a hydrocarbon solvent with a $pK_a$ greater than $H_2$; wherein the aromatic hydrocarbon and hydrocarbon solvent may be the same or different (see: Daasbjerg, K. *Acta Chemica Scandnavica,* 1995, 49, 878: "Estimation of the $pK_a$ for some Hydrocarbons and Aldehydes and Solvation Energies of the Corresponding Anions").

LOXLiH is a term denoting the monometallic form of LOXSH where the catalyst/reagent is formed with lithium reagents as the only metal reagents. LOXKH is term denoting a bimetallic catalyst comprised of lithium and potassium wherein a portion of the active saline hydride is potassium hydride. $LOXMgH_2$ is a term denoting a bimetallic catalyst comprised of lithium and magnesium wherein a portion of the active saline hydride is a magnesium hydride.

A brief summary of parameters used to describe molecular weight distributions and the equations that define them are presented in Table I below. (A. Rudin, *The Elements of*

*Polymer Science and Engineering*, Academic Press, Orlando, 1982, pp. 54-58). Molecular weight data are determined via GPC using polystyrene (HMAPS) standards, or polyisoprene standards or polybutadiene standards as appropriate.

TABLE I

| Parameter | Equation |
|---|---|
| $DP_n$, Number average degree of polymerization | $DP_n = (Mn - 2)/MW$ (wherein MW denotes the molecular weight of the monomer repeating unit) |
| $M_n$, Number average molecular weight | $M_n = (\Sigma M_i n_i)$ |
| $M_w$, Weight average molecular weight | $M_w = [(\Sigma M_i^2 n_i)/M_n]$ |
| $M_z$, z-Average molecular weight | $M_z = (\Sigma M_i^3 n_i)/\Sigma M_i^2 n_i$ |
| PD, Polydispersity Index (also PDI) | $PD = (\Sigma M_i n_i)/[(\Sigma M_i^2 n_i)/M_n]$ |
| Variance | $V = (M_w M_n - M_n^2)$ |
| Standard Deviation, $\sigma_n$ | $\sigma_n = \sqrt{(M_w M_n - M_n^2)}$ |
| Skewness, $_nU_3$ | $_nU_3 = M_z M_w M_n - 3M_n^2 M_w + 2M_n^3$ |
| Asymmetry, $_n\alpha_3$ | $_n\alpha_3 = (M_z M_w M_n - 3M_n^2 M_w + 2M_n^3)/\sigma_n^3$ |

The term "molecular hydrogen," also referred to as "elemental hydrogen," means $H_2$. $H_2$ typically means the common isotope $^1H_2$ but can also include the isotopes of hydrogen $^2H_2$ or $^3H_2$ either as mixtures of the isotopes or enriched in a particular isotope whether in the gas state in the vapor space or dissolved in the condensed phase.

The term "polarizing complexing agent" ([PCA] in a chemical formula) is a general term for the neutral alcohol σ-μ polar modifiers (PM) used in forming the catalyst of this disclosure such as a tertiary amino alcohol, a tertiary amino ether-alcohol or an ether-alcohol.

The disclosure entails a process for polymerizing conjugated dienes. Polymerization processes can be described in several different steps, including but not limited to initiation, polymerization, chain transfer, and termination. While it is convenient to refer to these steps as sequential and individual, a reaction mixture can be undergoing one or more of each of these steps at any point in time. However, in general, and without wishing to be bound by theory, a first step in a process can be an initiation step, where a catalyst composition, a polymerization reagent, a reactive initiator, or other species can be formed in a solution and then subsequently can react with the monomer. In describing an "initiating solution" or "initiation reagent" or other initiating specie, one of ordinary skill can recognize that the actual specie in solution may or may not be stoichiometrically the same as the components used to form it, but the reaction can still be described based on the components used to make that specie.

In this disclosure, an initiation step can entail the chemical addition of a saline hydride of a lithium alkoxide complexed saline hydride (LOXSH) reagent to the conjugated diene (hydrometalation reaction) and wherein the LOXSH reagent comprises one or more σ-μ polar modifiers. The disclosure can further include a process for hydrogen mediated polymerization of conjugated dienes wherein an initiation step can entail the chemical addition of a saline hydride of a lithium alkoxide complexed saline hydride (LOXSH) reagent to the conjugated diene and wherein: 1) the LOXSH reagent comprises one or more σ-μ polar modifiers; and 2) the process can be conducted in the presence of elemental hydrogen. The initiation step can also include the chemical addition of the LOXSH reagent to ethylene, styrene or any other anionically polymerizable hydrocarbon monomer (Hsieh and Quirk pp 96-99 inclusive of only hydrocarbon monomers).

The hydrogen mediated polymerization of conjugated dienes of this disclosure can utilize σ-μ polar modifiers. These σ-μ polar modifiers can be selected from at least one of the structures:

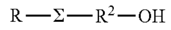

I

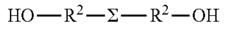

II

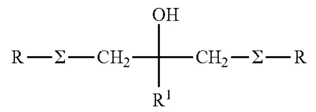

III

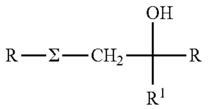

IV

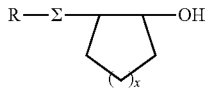

V

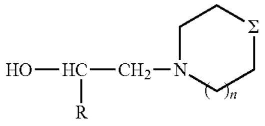

VI

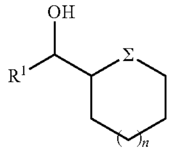

VII

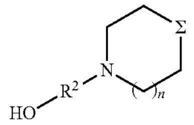

VIII

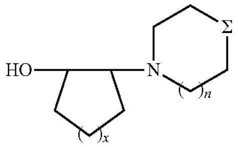

IX wherein R is independently an organic group which may also be further substituted by other tertiary amines or ethers. $R^1$ is independently a hydrogen atom or an organic group which may also be further substituted by other tertiary amines or ethers. $R^2$ is a $—(CH_2)_2—$group wherein y=2, 3, or 4, Σ can include: i) O or NR for I, II, III, IV, and V: ii) and for VI, VII, VIII and IX can include O or NR or $CH_2$; the index value n is independently a whole number equal to or greater than 0, the index value x is independently a whole number equal to or greater than 1. Preferably, R can be an alkyl or cycloalkyl group, more preferably an alkyl group, which can also be further substituted by other tertiary amines or ether. Similarly, $R_1$ can preferably be an alkyl or cycloalkyl group, more preferably an alkyl group, which can also be further substituted by other tertiary amines or ether.

The LOXSH catalysts, also referred to as LOXSH reagent, LOXSH reagent catalyst or LOXSH reagent composition, can be prepared as described in the commonly-owned WO2017176740, "Process and Hydrocarbon Soluble Saline Hydride Catalyst for Hydrogen Mediated Saline Hydride Initiated Anionic Chain Transfer Polymerization and Polymer Distribution Compositions Produced Therefrom," the contents of which are incorporated by reference into this disclosure, as if fully set forth herein.

The processes of the disclosure can include co-feeding at least two gaseous and/or volatile compounds to the reaction medium, wherein the at least two gaseous and/or volatile compounds comprise hydrogen and the low boiling conjugated diene. Low boiling conjugated dienes include conjugated dienes with a low vapor pressure, which can cause difficulties in maintaining a standard solution phase. A low boiling conjugated diene can have a boiling point of less than 200° C., or preferably less than 100° C., less than 80° C. or less than 70° C.

Preferred conjugated dienes include isoprene (IP and PIP for the polymer) and/or butadiene (BD or PBD for the polymer). The process can also further include styrene, which may be optionally co-polymerized with the conjugated diene. Other anionically polymerizable conjugated diene monomers which can be used in this disclosure include 2-methyl-1,3-pentadienes (E and Z isomers); piperylene; 2,3-dimethylbutadiene; 2-phenyl-1,3-butadiene; cyclohexadiene; β-myrcene; and β-farnesene; or 2-methyl-1,3-pentadienes (E and Z isomers); piperylene; 2,3-dimethylbutadiene; 2-phenyl-1,3-butadiene; cyclohexadiene; or; piperylene and 2,3-dimethylbutadiene. It should be noted that (Z)-1,3,5-hexatriene and hexatriene though not conjugated dienes—but conjugated trienes—may also be used in the present disclosure.

The processes of this disclosure can be conducted in reaction medium comprising a hydrocarbon solvent with a $pK_a$ greater than that of $H_2$. The process can be further characterized by a partial pressure of molecular hydrogen, where the partial pressure can be maintained at pressures between about 0.01 Bar to about 19.0 Bar. The temperature of the process can be maintained in the range of about 20° C. to about 130° C., about 30° C. to about 120° C., or about 40° C. to about 100° C. In the process, molar ratio of the total charge of monomer to soluble saline hydride catalyst initially formed can be about 10:1 to about 2000:1 and the saline hydride catalyst can be a one or more of: 1) LOXLiH reagent; 2) LOXNaH reagent; 3) $LOXMgH_2$ reagent; and/or 4) LOXKH reagent.

Figure 12:
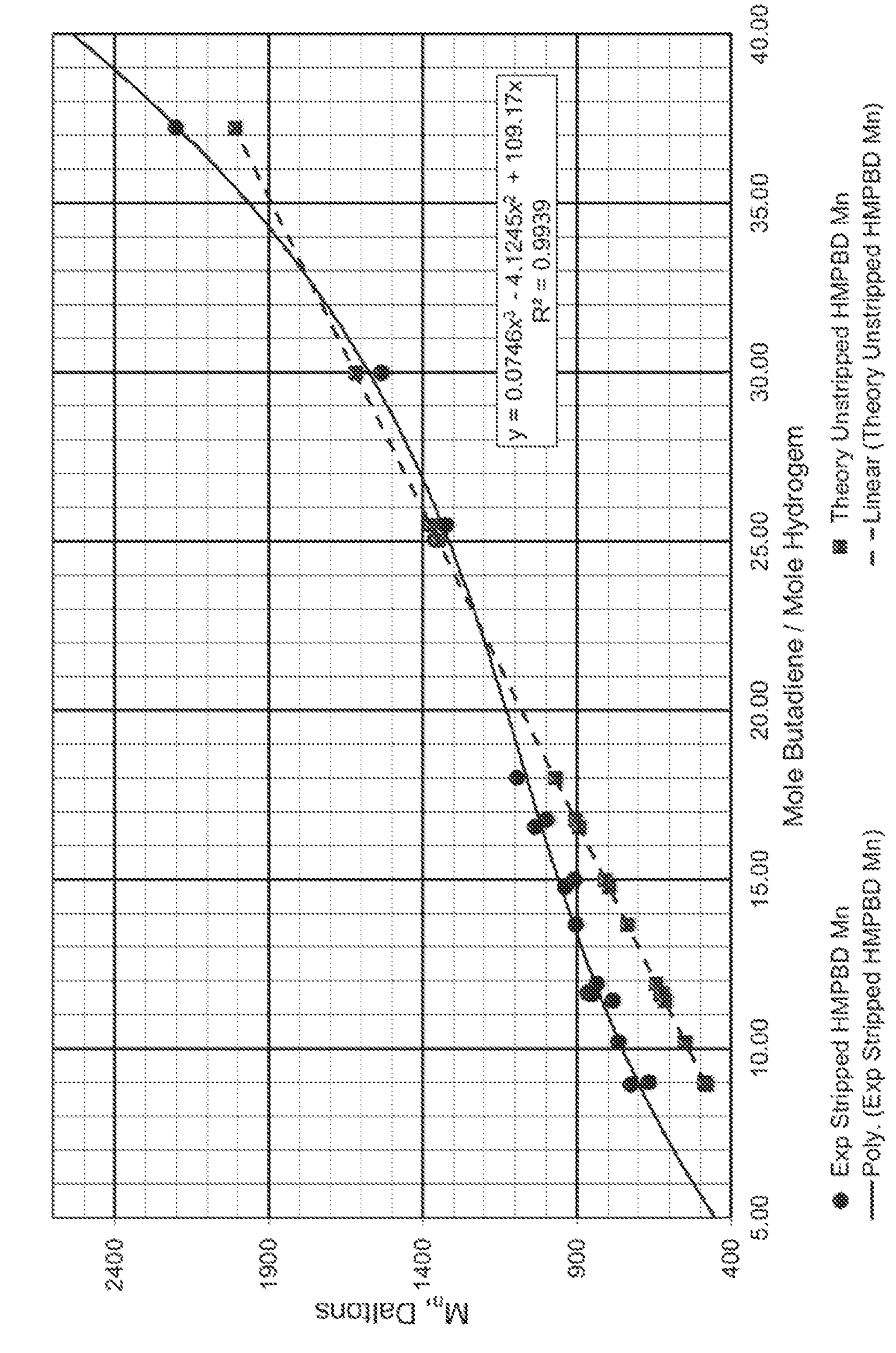
FIG. 12 illustrates a calibration relating the $M_n$ of the HMPBD composition (after stripping solvent and the low molecular weight butadiene oligomers) as a function of the ratio of total butadiene to total hydrogen, demonstrating that any $M_n$ over the range of about 500 to about 2600 Daltons can be produced by design, in accordance with exemplary embodiments of the disclosure.

The processes of this disclosure can entail feeding a low boiling conjugated diene, including gaseous conjugated dienes such as 1,3-butadiene, isoprene, w/BP<50° C., and hydrogen in a set molar ratio over the course of the entire feed—leaving the reactor pressure which can be a function of the partial pressure of any solvent vapor pressure, hydrogen and of the volatile conjugated diene—to adjust autogenously to achieve whatever activity of hydrogen and of conjugated diene in the condensed phase that is required to run the process efficiently and at a relative steady state pressure and temperature. This mode of operation can be demonstrated by the drawings of FIGS. 8-11. The process comprises co-feeding low boiling conjugated dienes, (e.g. 1,3-butadiene) with hydrogen in a pre-set molar ratio(s) to the polymerization reaction mixture over the course of the co-feed wherein the reactor pressure adjusts autogenously to the consequent condensed phase activity of hydrogen and of the conjugated diene at a relative steady state pressure and temperature. The pre-set molar ratio can be varied as desired over the course of the process. Such a process provides precise and reproducible product distribution compositions wherein the number average molecular weight $M_n$ can be proportional to the total butadiene fed divided by the moles of hydrogen consumed, which is demonstrated by the graph in FIG. 12 of the data of the Examples. A $M_n$ molecular weight can be selected by adjusting the instantaneous relative feed ratio of monomer to hydrogen to the reaction medium. The exact feed rate does not matter for the $M_n$; instead the relative feed rates matter when determining the initial $M_n$. The exact feed rate (in terms of monomer per unit time relative to catalyst charge) can help shape the distribution (broaden or make less broad) as well as have an effect on the product microstructure particularly for liquid polybutadiene compositions. Accordingly, the processes of this disclosure can provide relatively narrow molecular weight distributions, MWD, with polydispersity in the range of about 1.29 to about 2.02 preferably in the range of 1.29 to about 1.90 and of low asymmetry in the range of 1.65 to about 2.40 preferably in the range of 1.65 to 2.00. The autogenously generated reaction pressure can be the result or the product of some combination of the following: a) the relative feed rate of hydrogen to monomer; b) the feed rate of reactants relative to catalyst concentration; c) the reaction temperature; d) the activity of a particular LOXSH catalyst; and e) the vapor pressure of the reaction medium or solvent (s). Generally speaking catalyst that tend to form high vinyl-1,2 content compositions tend to also be the most active catalyst and provide processes that run at lower pressures and/or at lower temperatures for a set relative feed and relative feed rate. The reactor temperature and pressure profiles presented in FIGS. 8 through 11 demonstrate how the reactor pressure can be set autogenously, or in other words is "generated from within" the reaction and reactor process.

In the practice of this disclosure, the crude reaction mixture can be formed by co-feeding the CD monomer(s) with hydrogen to a reaction medium comprising the LOXSH catalyst. The relative feed of the CD monomer to hydrogen can be in the range of about 5 mole to about 42 mole CD/mole $H_2$. Relative feed rates of the CD monomer (e.g. butadiene) to hydrogen can be in the range of about 8 to about 40 mole CD/mole $H_2$. Relative feed rates can be in the range of about 15 to about 30 mole CD/mole $H_2$. At the range of about 15 to about 30 mole CD/mole $H_2$, the $M_n$ of the solvent and oligomer stripped product distribution approaches the theoretical $M_n$=(mole CD/moles $H_2$)*[$FW_{CD}$] (as demonstrated in FIG. 12), wherein $FW_{CD}$ is the formula weight of the conjugated diene monomer. In the processes of this disclosure the co-feed of CD monomer with $H_2$ can be conducted over a period of about 20 minutes, about 40 minutes, or about 60 minutes or more. The processes of the disclosure can be conducted up to about 480 minutes in batch, or can be longer for a continuous operation. For batch or semi-batch mode of operation the total co-feed times can be in the range of about 60 minutes to about 240 minutes. For example, for a hydrogen mediated polybutadiene (HMPBD) composition having $M_n$ of 900 over 120 minutes, 15 moles of butadiene could be (in accord with FIG. 12) co-fed to the LOXSH catalyst containing reaction medium at a rate of [15 mole BD/mole $H_2$]J/120 min=0.125 mole BD/mole $H_2$/min.] Likewise for a HMPBD distribution having $M_n$ of about 1400 over 90 minutes, 25 moles of butadiene could be co-fed to the LOXSH catalyst containing reaction medium at a rate of [25 mole BD/mole $H_2$]/90 min=0.2778 mole BD/mole $H_2$/min.

In the disclosure, relative feed rate of CD/$H_2$/unit time can vary over the range of 0.0333 mole CD/mole $H_2$/min for lowest molecular weight compositions to 0.6667 mole CD/mole $H_2$/min for highest molecular weight compositions. Accordingly relative feed rate of CD/$H_2$/unit time can vary over the range of A) from about [8 mole BD/mole $H_2$]/240 min=0.0333 mole BD/mole $H_2$/min to about [8 mole BD/mole $H_2$]/60 min=0.1333 mole BD/mole H/min. for the lowest molecular weights; to about B) 140 mole BD/mole $H_2$/240 min=0.1667 mole BD/mole $H_2$/min to about [40 mole BD/mole $H_2$]/60 min=0.6667 mole BD/mole $H_2$/min. for the highest molecular weights. The monomer to hydrogen co-feed time can be in the range of from about 90 minutes to 180 minutes. The relative feed rate of CD/$H_2$/unit time can vary over the range of 0.0833 mole CD/mole $H_2$/min for lowest molecular weight compositions: to 0.3333 mole CD/mole $H_2$/min for the highest molecular weight compositions. Accordingly the relative feed rate of CD/$H_2$/unit time can vary over the range of A) from about [15 mole BD/mole $H_2$]/180 min=0.0833 mole BD/mole H/min to about [15 mole BD/mole $H_2$]/90 min=0.1667 mole BD/mole $H_2$/min. for the lowest molecular weights; to about B) [30 mole BD/mole $H_2$]/180 min=0.1667 mole BD/mole $H_2$/min to about [30 mole BD/mole $H_2$]/90 min=0.3333 mole BD/mole $H_2$/min. for the highest molecular weights of the range. The process can be conducted at temperatures in the range of 30° C. and 130° C. with sufficient agitation to assure efficient mass transfer of hydrogen to the condensed phase. Relative feed rates of mole CD monomer to mole of contained saline hydride can be from about 70 to about 1000 mole CD per mole SH in the LOXSH catalyst composition; wherein the saline hydride, SH, can be one or more of LiH, and/or NaH, and/or KH, and/or $MgH_2$ and/or CsH.

The LOXSH catalyst utilized in the processes of this disclosure includes a σ-μ polar modifier which can be one or more of: N,N-dimethylethanolamine; 1-(dimethylamino)-2-propanol; 1-(dimethylamino)-2-butanol; trans-2-(dimethylamino)cyclohexanol 2-piperidinoethanol; 1-piperidino-2-propanol; 1-piperidino-2-butanol; trans-2-piperidinocyclohexan-1-ol; 1-pyrrolidinoethanol; pyrrolidinylpropan-2-ol; 1-(1-pyrolidinyl)-2-butanol; 2-pyrolidinocyclohexanol; 4-methyl-1-piperazineethanol; 1-(4-methyl-1-piperazinyl)-2-propanol; 1-(4-methyl-1-piperazinyl)-2-butanol; trans-2-(4-methyl-1-piperazinyl)-cyclohexanol; 2-morpholinoethanol; 1-(4-morpholinyl)-2-propanol; 1-(4-morpholinyl)-2-butanol; trans-2-morpholin-4-ylcyclohexanol; 1-methyl-2-piperidinemethanol; 1-methyl-2-pyrrolidinemethanol. diethylaminoethanol, N-methyl-diethanolamine, and 3-dimethylamino-1-propanol, 2-[2-(dimethylamino)ethoxy]ethanol, 1,3-bis(dimethylamino)-2-propanol; 2-{[2-dimethylamino)ethyl] methylamino}ethanol; 2-[2-(dimethylamino)ethoxy] ethanol; 2-(2-(piperidyl)ethoxy)ethanol; 2-[2-(4-morpholinyl)ethoxy]ethanol; 2-[2-(1-yrrolidinyl)ethoxy] ethanol; 2-[2-(4-methyl-1-piperazinyl)ethoxy]ethanol with optional addition of one or more of 2-methoxyethanol; 1-methoxy-2-propanol; 1-methoxy-2-butanol; trans-2-methoxycyclohexanol: tetrahydrofurfuryl alcohol; 2-tetrahydropyranyl methanol, and diethylene glycol monomethyl ether.

The LOXSH catalyst utilized can also include a σ-μ polar modifier that can be composed of between about 50 mole % to less than 100 mole % of an tertiary amino-alcohol or tertiary amino-ether-alcohol σ-μ polar modifier and from about 50 mole % to greater than 0 mole % of an ether-alcohol σ-μ polar modifier. The tertiary amino-alcohol σ-μ polar modifier can be selected from one or more of: N,N-dimethylethanolamine; 1-(dimethylamino)-2-propanol; 1-(dimethylamino)-2-butanol; trans-2-(dimethylamino)cyclohexanol 2-piperidinoethanol; 1-piperidino-2-propanol; 1-piperidino-2-butanol; trans-2-piperidinocyclohexan-1-ol; 1-pyrrolidinoethanol; pyrrolidinylpropan-2-ol; 1-(1-pyrolidinyl)-2-butanol; 2-pyrolidinocyclohexanol; 4-methyl-1-piperazineethanol; 1-(4-methyl-1-piperazinyl)-2-propanol; 1-(4-methyl-1-piperazinyl)-2-butanol; trans-2-(4-methyl-1-piperazinyl)-cyclohexanol; 1-methyl-2-piperidinemethanol; 1-methyl-2-pyrrolidinemethanol; diethylaminoethanol, N-methyl-diethanolamine, and 3-dimethylamino-1-propanol; 1,3-bis(dimethylamino)-2-propanol; 2-{[2-dimethylamino)ethyl]methylamino}-ethanol. The tertiary amino-ether-alcohol can be 2-morpholinoethanol; 1-(4-morpholinyl)-2-propanol; 1-(4-morpholinyl)-2-butanol; trans-2-morpholin-4-ylcyclohexanol; 2-[2-(dimethylamino) ethoxy]ethanol; 2-[2-(dimethylamino)ethoxy]ethanol; 2-(2-(piperidyl)ethoxy)ethanol; 2-[2-(4-morpholinyl)ethoxy] ethanol; 2-[2-(1-pyrrolidinyl)ethoxy]ethanol; 2-[2-(4-methyl-1-piperazinyl)ethoxy]ethanol. The ether-alcohol σ-μ polar modifier can be selected from one or more of 2-methoxyethanol; 1-methoxy-2-propanol; 1-methoxy-2-butanol; trans-2-methoxycyclohexanol; tetrahydrofurfuryl alcohol; 2-tetrahydropyranyl methanol, and diethylene glycol monomethyl ether.

Figure 13:
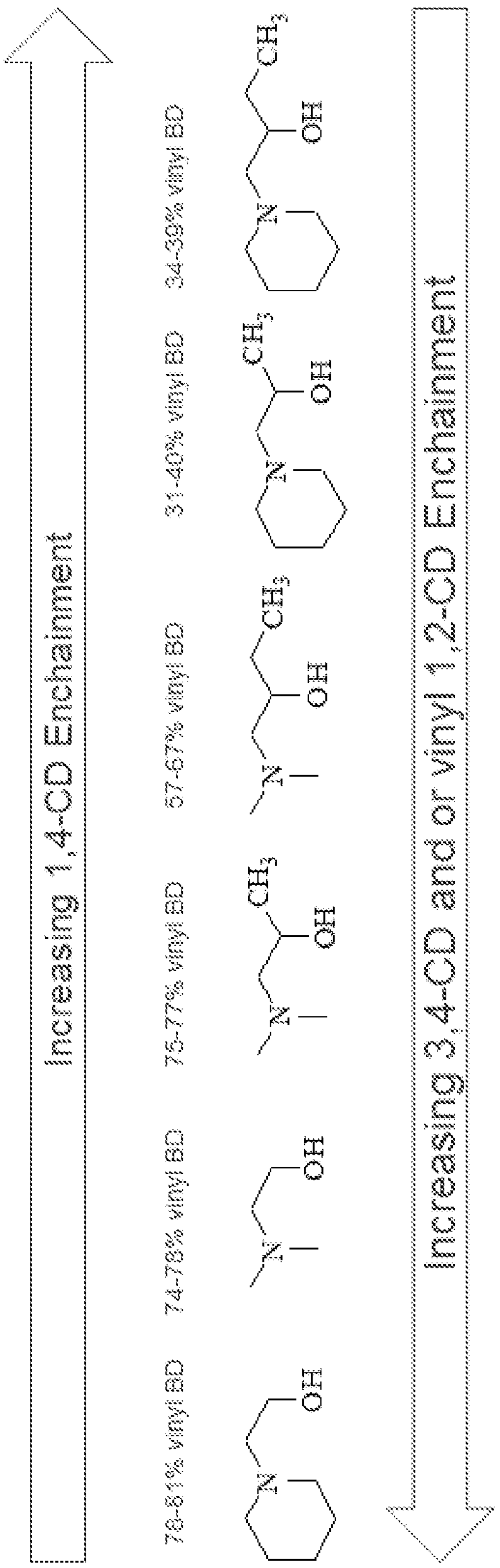
FIG. 13 illustrates structure activity relationship of preferred tertiary amino alcohol σ-μ polar modifiers used in forming the catalyst, in accordance with exemplary embodiments of the disclosure.

Generally speaking, catalyst activity for a given alcohol functional group of the aminoalcohol ligand (i.e. 1-aminoethanol, 1-amino-2-propanol, 1-amino-2-butanol, trans-2-amino-cyclohexanol) can increase from piperidyl- to dimethyl- to pyrrolyl,- while selectivity can generally decrease in that order. Surprisingly, LOXSH catalyst formed from tertiary amino alcohols processive of secondary alcohols (i.e. 1-amino-2-propanol, 1-amino-2-butanol, trans-2-amino-cyclohexanol), 1-dimethylamino-2-propanol notwithstanding, can be generally more selective towards formation of the 1,4-CD microstructure. In contrast amino alcohols possessive of primary alcohols (2-aminoethanols) can be very selective towards vinyl addition (1,2-BD and 1,2-IP with 3,4-IP). In general the piperidyl amino functional group can be more selective than the dimethylamino. Accordingly selectivity toward the vinyl microstructure decreases and selectivity for 1,4-CD microstructure can decrease in the order: 2-piperidinoethanol; N,N-dimethylethanolamine; 1-(dimethylamino)-2-propanol; 1-(dimethylamino)-2-butanol; 1-piperidino-2-propanol; 1-piperidino-2-butanol (see FIG. 13). Formation of the LOXLiH catalyst with some portion of an ether alcohol generally accelerates the process (the hydrogen mediated polymerization runs at lower temperatures and/or pressures) and yield catalyst compositions that generally favor vinyl addition even when a tertiary amino-alcohol ligand having a 2° alcohol functional group can be employed. Formation of LOXKH catalysts with some portion of an ether alcohol can however impede catalyst activity and require increased temperature. Generally speaking catalyst formed with some portion of the ligands as ether alcohols provide compositions that are easier to acid wash forming less of an emulsion than those compositions formed using LOXSH catalyst formed exclusively from aminoalcohol(s) ligands. The same is true for amino alcohols formed from piperidine as compared to dimethylamine or pyrrolidine. The addition of other polar modifiers (μ type) such as TMEDA and THF can provide some added selectivity towards vinyl addition but generally retard catalyst activity (require slightly higher temperatures and pressures). Potassium based catalyst systems are much more active (run at very low pressures and temperatures) and are generally less selective towards vinyl addition. This disclosure provides several avenues to achieve specific microstructures and molecular weight desired to produce liquid HMPCD compositions with tailor made viscosity and glass transition temperature as well as specified molecular weight distributions.

An embodiment of this disclosure can be the anionic polymerization reagent compositions formed for (1) an initiation, and/or 2) hydrogen mediation LOXSH catalyst; and/or 3) organic chain transfer LOXSH catalyst that can be selective for 1,4-CD monomer microstructure enchainment. The 1.4 CD microstructure can be achieved with the reagent that can be formed from 1) at least one tertiary amino alcohol σ-μ polar modifiers having a 2° or a 3° alcohol functional group; 2) an organolithium compound; and 3) optionally elemental hydrogen and/or an organo silicon hydride. Said LOXSH catalyst composition can be further characterized wherein the polar modifiers can be selected from at least one of the structures:

IV

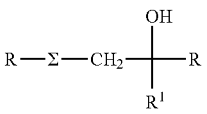

III

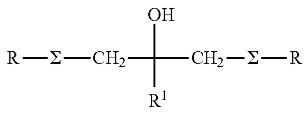

VI

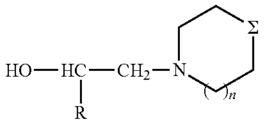

VII

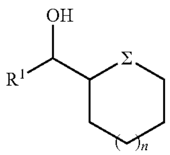

V

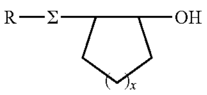

IX

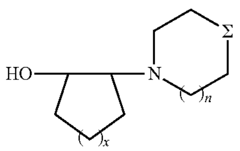

wherein R is independently an organic group which may also be further substituted by other tertiary amines or ethers, $R^1$ is independently a hydrogen atom or an organic group which may also be further substituted by other tertiary amines or ethers, Σ can include: i) O or NR for III, IV, and V; ii) and for VI, VII, and IX can include O or NR or $CH_2$; the index value n is independently a whole number equal to or greater than O, the index value x is independently a whole number equal to or greater than 1.

Preferred LOXSH catalyst composition of the present disclosure include catalyst compositions wherein the σ-μ polar modifier have a secondary alcohol functional group and include one or more of: 1-dimethylamino-2-propanol, 1-piperidino-2-propanol, 1-pyrrolidinylpropan-2-ol, 1-morpholino-2-propanol, 1-(4-Methyl-1-piperazinyl)-2-propanol, 1-dimethylamino-2-butanol 1-piperidino-2-butanol, 1-pyrrolidinylbutan-2-ol, 1-morpholino-2-butanol, 1-(4-methyl-1-piperazinyl)-2-butanol, 2-dimethylaminocyclohexan-1-ol, 2-piperidinocyclohexan-1-ol, 2-pyrolidinocyclohexanol, 2-(4-methyl-1-piperazinyl)-cyclohexanol, 2-morpholinocyclohexan-1-ol with optional addition of one or more of 2-methoxyethanol, 1-methoxypropan-2-ol, 1-methoxybutan-2-ol, 2-methoxycyclohexan-1-ol, 1,3-bis (dimethylamino)-2-propanol.

If aralkyl organic chain transfer agents are applied, the organic chain transfer can be designed to compete with hydrogen mediation using a LOXKH catalyst as reagents for aralkyl organic chain transfer agents (e.g. toluene, xylenes, ethylbenzene, propylbenzene, mesitylene and the like). Alternatively, a LOXLiH reagent can be used as an organic chain transfer catalyst when the organic chain transfer agent is substituted with a methyl group (e.g. one or more of toluene, o-, m-, p-xylenes, mesitylene, durene and the like)—under such conditions organic chain transfer can compete to some extent with hydrogen mediation.

Another embodiment of this disclosure can be the anionic polymerization reagent compositions formed for (1) an initiation; and/or 2) hydrogen mediation LOXSH catalyst; and/or 3) organic chain transfer LOXSH catalyst that is selective for 3,4-CD and/or 1,2-CD-vinyl monomer microstructure enchainment. This reagent can be formed from: a) at least one tertiary amino alcohol σ-μ polar modifiers; b) at least one separate ether-alcohol σ-μ polar modifiers; c) an organo lithium compound; and d) optionally elemental hydrogen and/or an organo silicon hydride.

The LOXSH catalyst of this disclosure can be further characterized wherein the σ-μ polar modifiers can be selected from at least two of the structures:

$$R—\Sigma—R^2—OH \quad \text{I}$$

$$HO—R^2—\Sigma—R^2—OH \quad \text{II}$$

III

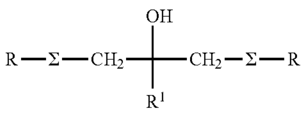

IV

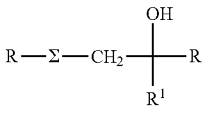

V

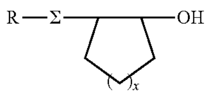

VI

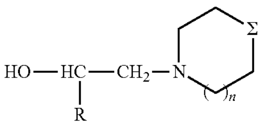

VII

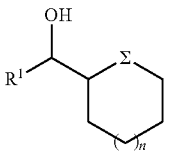

-continued

VIII

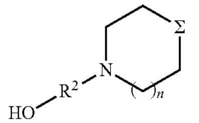

IX

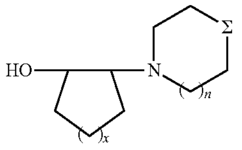

Preferred LOXSH catalyst of this disclosure can be characterized wherein the σ-μ polar modifiers of the reagent comprises between about 50 mole % to less than 100 mole % of a tertiary amino-alcohol σ-μ polar modifier and/or tertiary amino-ether-alcohol σ-μ polar modifier selected from one or more of: 1.) N,N-dimethylethanolamine; 1-(dimethylamino)-2-propanol; 1-(dimethylamino)-2-butanol, trans-2-(dimethylamino)cyclohexanol, 2-piperidinoethanol, 1-piperidino-2-propanol, 1-piperidino-2-butanol, trans-2-piperidinocyclohexan-1-ol, 1-pyrrolidinoethanol, pyrrolidinylpropan-2-ol, 1-(1-pyrolidinyl)-2-butanol, 2-pyrolidinocyclohexanol, 4-methyl-1-piperazineethanol, 1-(4-methyl-1-piperazinyl)-2-propanol, 1-(4-methyl-1-piperazinyl)-2-butanol, trans-2-(4-methyl-1-piperazinyl)-cyclohexanol, 2-morpholinoethanol, I-(4-morpholinyl)-2-propanol 1-(4-morpholinyl)-2-butanol; trans-2-morpholin-4-ylcyclohexanol; 1-methyl-2-piperidinemethanol; 1-methyl-2-pyrrolidinemethanol, diethylaminoethanol, N-methyldiethanolamine, 3-dimethylamino-1-propanol, 1,3-bis (dimethylamino)-2-propanol, 2-{[2-dimethylamino)ethyl] methylamino}-ethanol, 2-[2-(dimethylamino)ethoxy] ethanol; 2-(2-(piperidyl)ethoxy)ethanol; 2-[2-(4-morpholinyl)ethoxy]ethanol; 2-[2-(1-pyrrolidinyl)ethoxy] ethanol; 2-[2-(4-methyl-1-piperazinyl)ethoxy]ethanol; and II.) from about 50 mole % to greater than 0 mole % of an ether-alcohol σ-μ polar modifier selected from one or more of 2-methoxyethanol; 1-methoxy-2-propanol; 1-methoxy-2-butanol; trans-2-methoxycyclohexanol; tetrahydrofurfuryl alcohol; 2-tetrahydropyranyl methanol, and diethylene glycol monomethyl ether.

Preferred embodiment of the LOXSH catalyst composition of this disclosure can be further characterized wherein the ratio of total amino-alcohol (AA) and or amino-ether-alcohol (AEA) to the total separate ether-alcohol (EE) σ-μ polar modifier ([AA:EAE]:EA) can be in the range of about 9:1 to 1:1 and preferably in the range of about 4:1 to about 2:1.

The hydrogen mediated poly(conjugated diene) compositions of the disclosure comprise a polymer of hydrogen and the conjugated diene monomer, without incorporation of either an alkyl anion or solvent anion such as toluene that plagues the current products. Thus, another feature of this disclosure can be hydrogen mediated anionic poly(conjugated diene) compositions (comprising polymers of hydrogen and conjugated diene) that can be characterized as having: 1) number average molecular weight distribution $M_n$ in the range of about 500 to about 2600 Daltons; 2) a Brookfield viscosity (25° C.) in the range of about 20 to about 200,000 cP; 3) 1,4-CD microstructure content in the range of 20% to about 85%; and 4) glass transition temperature $T_g$ in the range of about −116° C. to about −20° C.

Some hydrogen mediated polyisoprene (HMPIP) distribution compositions can be those having a number average ($M_n$,) molecular weight in the range of from about 500 to about 2600 Daltons and having one of the following: 1) from about 73 wt. % to about 80 wt. % 1,4-IP contents with a Brookfield viscosity (@ 25° C.) that varies as a function of $M_n$ over the range of about 30 cP at about 500 Daltons to about 5000 cP at about 2600 Daltons; or 2) from about 40 wt. % to about 73 wt. % 1,4-IP contents content with a Brookfield viscosity (@25° C.) that varies as a function of $M_n$ over the range of about 200 cP at about 500 Daltons to about 40,000 cP at about 2600 Daltons; or 3) from about 30 wt. % to about 54 wt. % 1,4-IP contents and a Brookfield viscosity (@ 25° C.) that varies as a function of $M_n$ over the range of about 100 cP at about 500 Daltons to about 200,000 cP at about 2600 Daltons; wherein the 1,4-IP contents is determined by $^1$HNMR analyses. These HMPIP compositions can be further characterized as having glass transition temperatures that varies as one of the following: 1) from about 73 wt. % to about 80 wt. % 1,4-IP contents having a $T_g$ that varies as a function of $M_n$ over the range of about −112° C. at about 500 Daltons to about −50° at about 2600 Daltons; or 2) from about 40 wt. % to about 73 wt. % 1,4-IP contents having a $T_g$ that varies as a function of $M_n$ over the range of about −88° C. at about 500 Daltons to about −35° at about 2600 Daltons; or 3) from about 30 wt. % to about 54 wt. % 1,4-IP having a $T_g$ that varies as a function of $M_n$ over the range of about −85° C. at about 500 Daltons to about −20° at about 2600 Daltons wherein the 1,4-IP contents is determined by $^1$HNMR analyses.

Some hydrogen mediated polybutadiene (HMPBD) distribution compositions can be those having a number average ($M_n$,) molecular weight in the range of from about 500 to about 2600 Daltons and having one of the following: 1) from about 74 wt. % to about 84 wt. % total vinyl content with a Brookfield viscosity (@ 25° C.) that varies as a function of $M_n$ over the range of about 45 cP at about 500 Daltons to about 30,000 cP at about 2600 Daltons; or 2) from about 55 wt. % to about 73 wt. % total vinyl content with a Brookfield viscosity (@ 25° C.) that varies as a function of $M_n$ over the range of about 50 cP at about 500 Daltons to about 8000 cP at about 2600 Daltons; or 3) from about 30 wt. % to about 54 wt. % total vinyl content and a Brookfield viscosity (@ 25° C.) that varies as a function of $M_n$ over the range of about 20 cP at about 500 Daltons to about 3000 cP at about 2600 Daltons; wherein the total vinyl content is determined by C-13 NMR analyses. These compositions have glass transition temperatures in the range of from less than −120° to about −45° C. over the range of $M_n$=500 to $M_n$=2600 wherein the $T_g$ increases as a function of molecular weight as well as total vinyl content. Such compositions also have ratios of vinyl-1,2-BD:VCP can be in the range of about 3:1 to about 15:1 (based on $^1$HNMR analysis).

Figure 7:
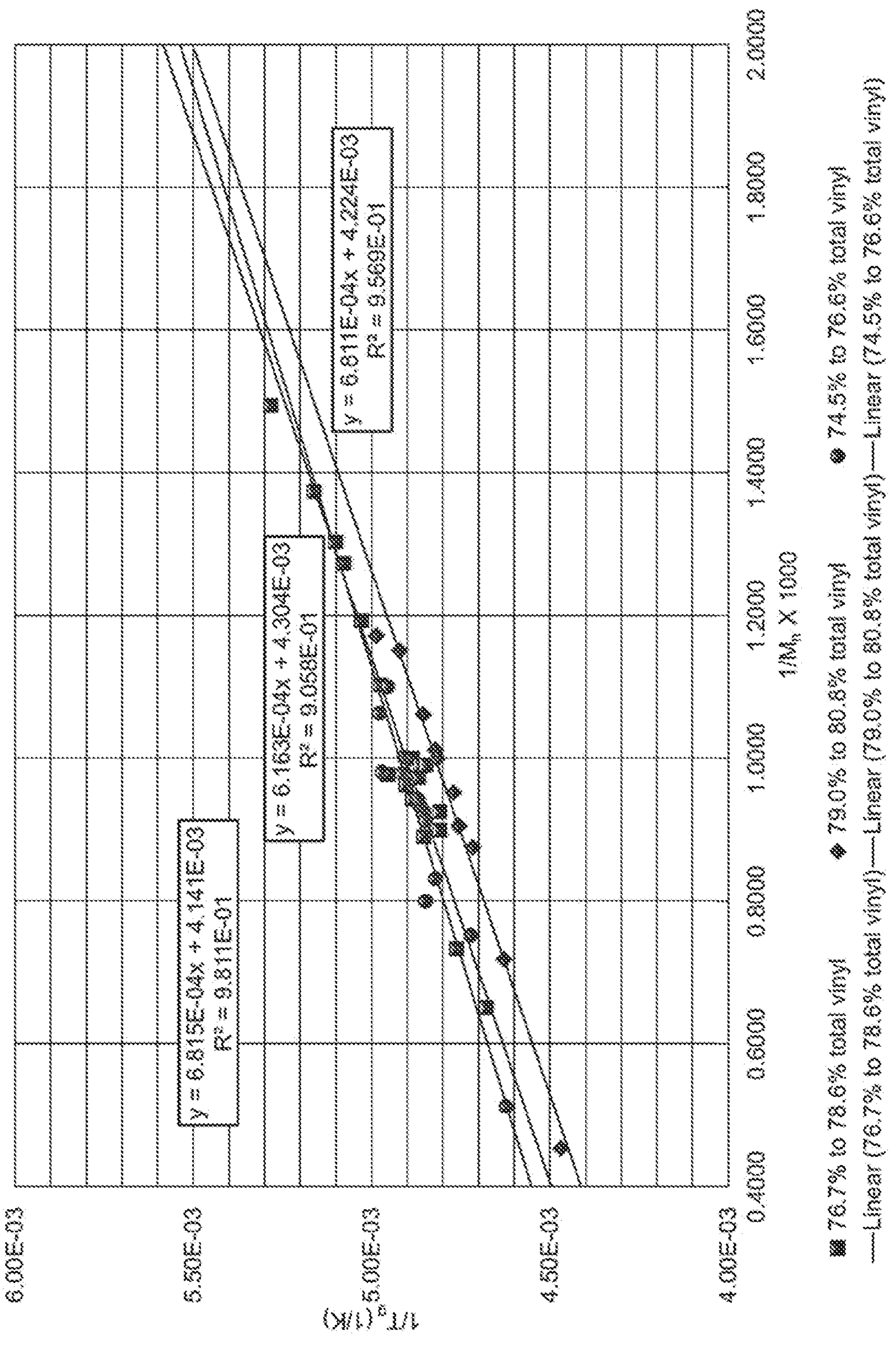
FIG. 7 illustrates XY-Scatter Data of 1/Tg (y axis $K^{-1}$) vs. $1/M_n$(X-axis, $Daltons^{-1}$) for hydrogen mediated polybutadiene (HMPBD) compositions having between 74% and 81% total vinyl contents in accordance with exemplary embodiments of the disclosure.
Figure 8:
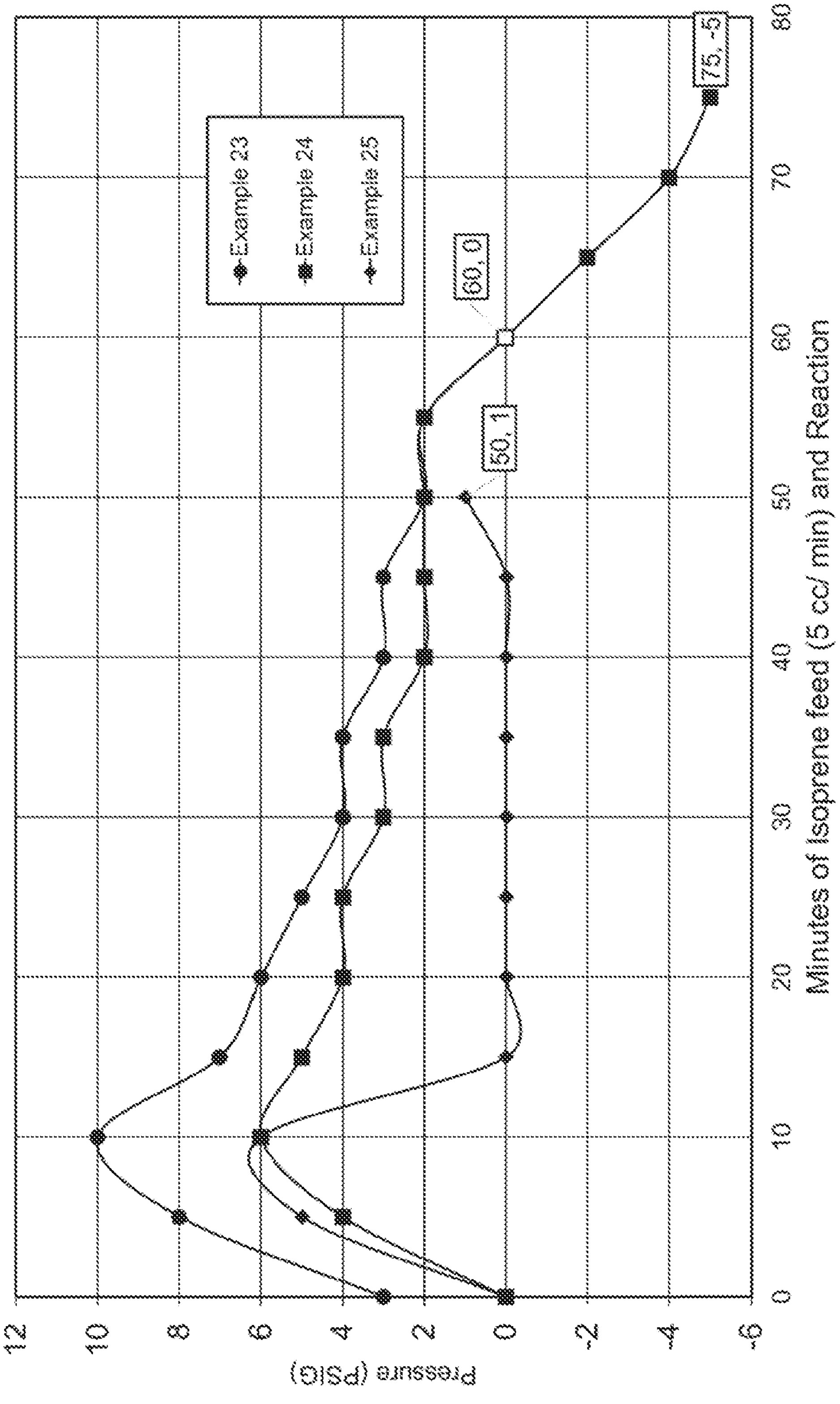
FIG. 8 illustrates the reaction pressure profiles for Examples 23-25 demonstrating that the high activity of the LOXKH catalyst resulting in reactor pressures at steady state from as low as 4 PSIG down to 0 PSIG in accordance with exemplary embodiments of the disclosure.
Figure 9:
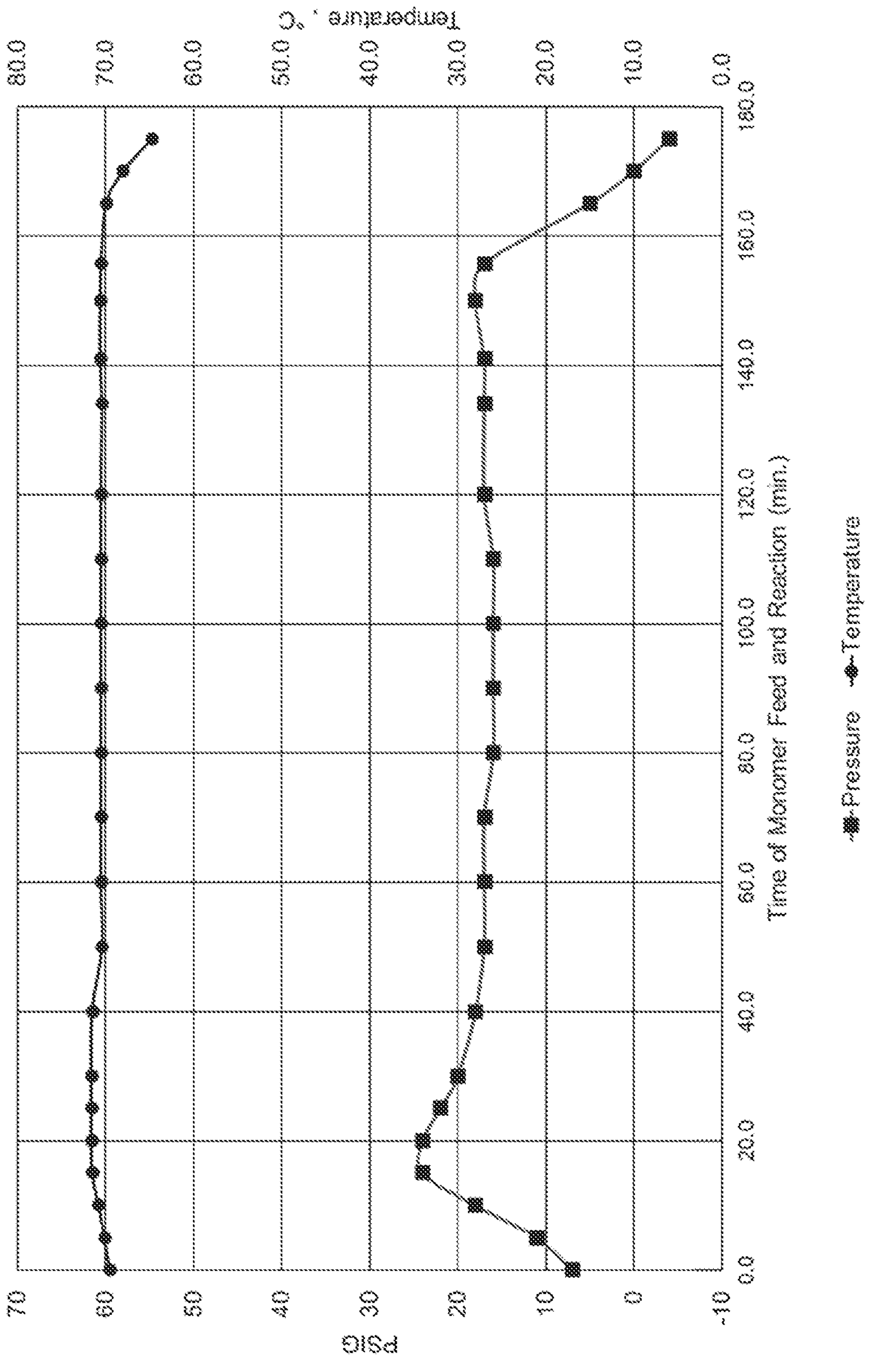
FIG. 9 illustrates the reaction pressure and temperature profiles for Example 46 demonstrating that the steady state autogenous pressure was between 16 and 18 PSIG with a steady state temperature of 71° C. in accordance with exemplary embodiments of the disclosure.
Figure 10:
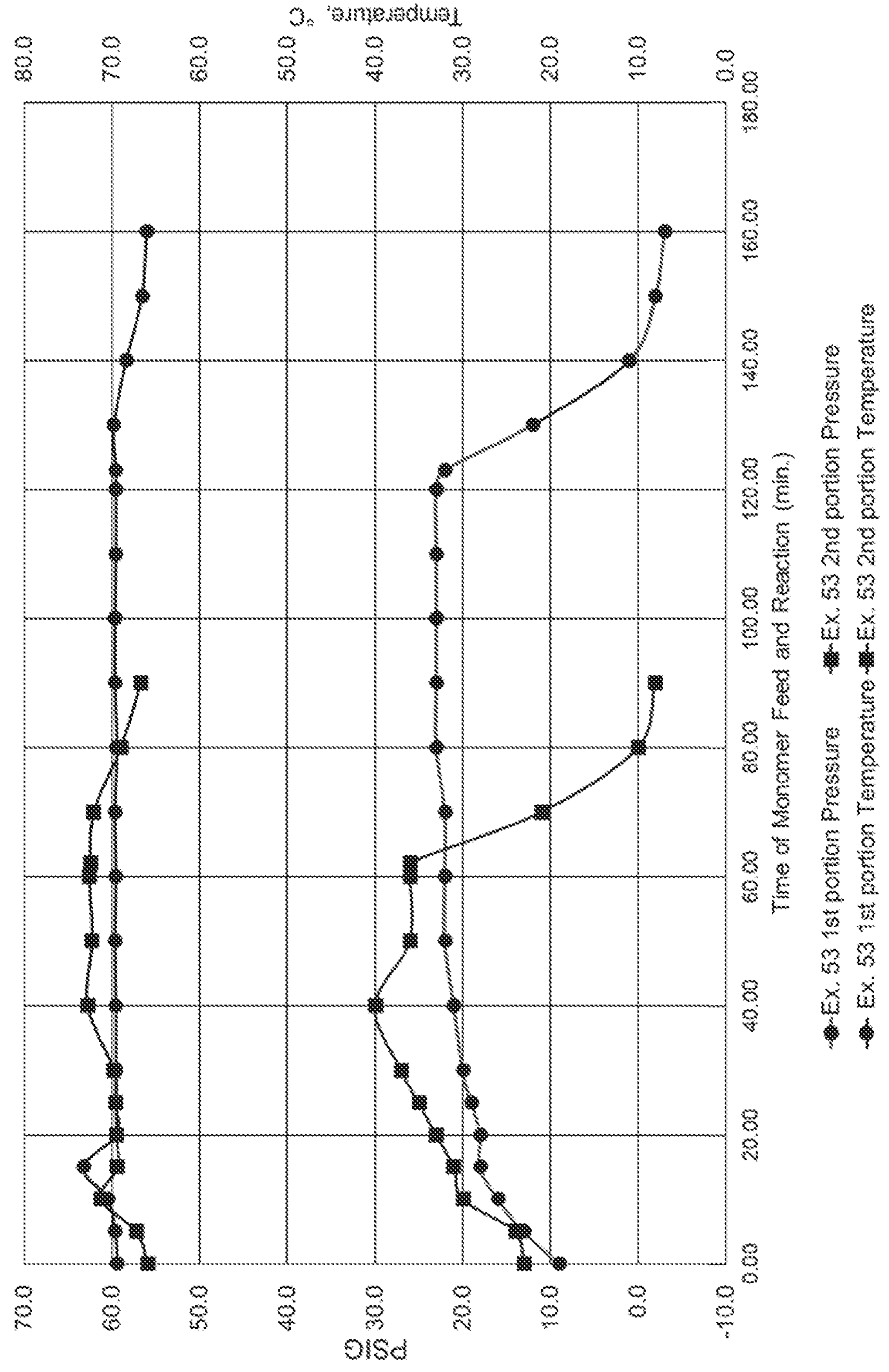
FIG. 10 illustrates the reaction pressure and temperature profiles for Example 53 wherein two separate portions of butadiene monomer were fed to the reaction medium demonstrating the high efficiency and robust nature of the LOXLiH catalyst of that Example in accordance with exemplary embodiments of the disclosure.
Figure 11:
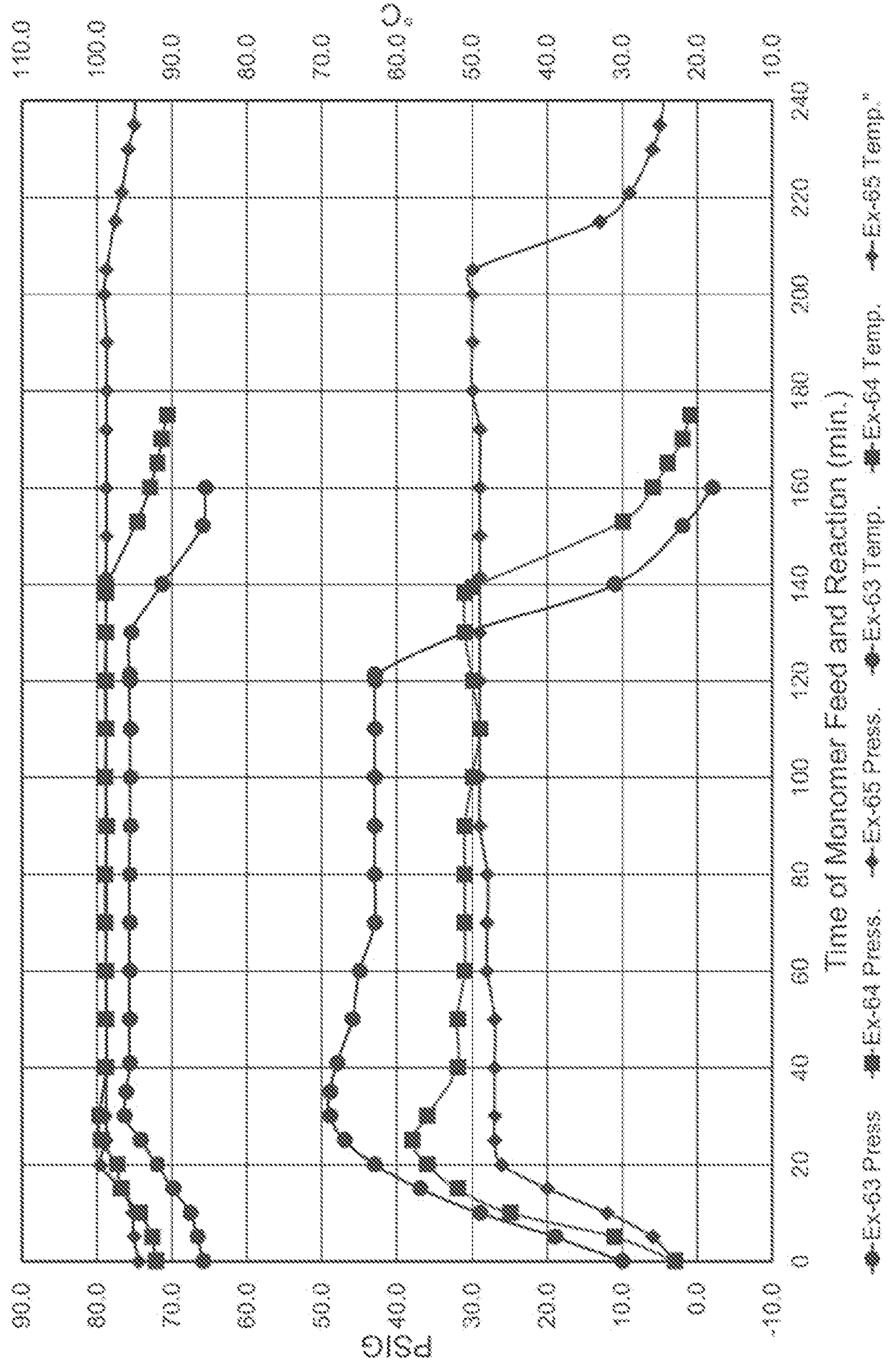
FIG. 11 illustrates the reaction pressure and temperature profiles for Examples 63-65 wherein the 1,4-BD selective LOXLiH catalyst formed from 1-piperidino-2-butanol as the σ-μ polar modifier where low vinyl HMPBD distribution compositions having $M_n$ of 701, 1139 and 1378 Daltons were formed respectively, in accordance with exemplary embodiments of the disclosure.

Some distributions of this disclosure can be liquid HMPBD compositions of high total vinyl content in the range of about 74 wt. % to about 82 wt. % (as determined by C-13 NMR analyses) which also exhibit high vinyl-1,2-BD to vinylcyclopentane (VCP) ratios and can be inherently of high reactivity and of low viscosity wherein the: 1) number average molecular weight distribution ($M_n$) can be in the range of about 500 to about 2600 Daltons; 2) Brookfield viscosity (@ 25° C.) can be in the range of about 50 to about 32,000 cP; 3) glass transition temperature $T_g$ in the range of less of about −95° C. to about −45° C.; and 4) molar ratio of vinyl-1,2-BD:VCP can be in the range of about 7:1 to about 15:1 (based on $^1$HNMR analysis). The range of $T_g$ data is derived from FIG. 7 based on exemplary embodiments of the disclosure. (In this connection see Fox and Loshaek *J. Polymer Science* 1955, 15, 371.)

Some liquid HMPBD distribution compositions can be liquid HMPBD compositions of high vinyl content in the range of about 75 wt. % to about 82 wt. % (total vinyl content as determined by C-13 NMR analyses) wherein the: 1) number average molecular weight distribution ($M_n$) can be in the range of about 650 to about 2200 Daltons; 2) Brookfield viscosity (@& 25° C.) can be in the range of about 300 to about 11,000 cP; 3) glass transition temperature $T_g$ in the range of about −84° C. to about −50° C.; and 4) molar ratio of vinyl-1,2-BD:VCP can be in the range of about 6.5:1 to about 14.5:1 (based on $^1$HNMR analysis).

Some liquid HMPBD distribution compositions can be liquid HMPBD compositions of intermediate vinyl content in the range of about 55 wt. % to about 70 wt. % (total vinyl content as determined by C-13 NMR analyses) wherein the: 1) number average molecular weight distribution (M) can be in the range of about 700 to about 1600 Daltons; 2) Brookfield viscosity (@q, 25° C.) can be in the range of about 95 to about 2000 cP; 3) glass transition temperature $T_g$ in the range of about −92° C. to about −75° C.; and 4) molar ratio of vinyl-1,2-BD:VCP can be in the range of about 4.5:1 to about 12:1 (based on $^1$HNMR analysis).

Some polymer distribution compositions of this disclosure can be liquid HMPBD compositions of reduced vinyl content in the range of about 30 wt. % to about 54 wt. % (total vinyl content as determined by C-13 NMR analyses) wherein the: 1) number average molecular weight distribution ($M_n$) can be in the range of about 750 to about 1600 Daltons; 2) Brookfield viscosity (@ 25° C.) can be in the range of about 80 to about 1000 cP; 3) glass transition temperature $T_g$ in the range of about −106° C. to about −70° C.; and 4) molar ratio of vinyl-1,2-BD:VCP can be in the range of about 3.3:1 to about 7:1 (based on $^1$HNMR analysis).

In "The Preparation, Modification and Applications of Nonfunctional Liquid Polybutadienes" (Luxton, A. R., *Rubber Chem. & Tech.,* 1981, 54, 591) in Table II of that report, Luxton provides viscosity vs. $M_n$ data for compositions having 40-50 microstructure percent of vinyl-1,2-BD with: a) 0% VCP; or b) 15-20% VCP linkages for liquid butadiene telomers formed with toluene as the chain transfer agent (each and every chain comprising at least one toluene monomer). The VCP free prior art BR telomers having $M_n$ of 900, 1300 and 2600 had Brookfield Viscosity (25° C.) of 300, 700 and 8500 cP respectively. The prior art compositions having 15-20% VCP (vinyl-1,2/VCP of 2.0 to 3.33) are reported to have $M_n$ of 1000 and of 1800 with Brookfield Viscosity of 4,000 cP (@25° C.) and of 45,000 cP (@35° C.) respectively. Comparison of those five prior art compositions of Luxton's Table II, to Examples 30, 31, 63 and 64 of this disclosure demonstrate the advantages and the advancement that the process technology of this disclosure provides. Examples 30, 31, 63 and 64 have (Ex.-30) $M_n$=1204, vinyl-1,2% 34.9%, and VCP 5.1% (C-13 NMR); (Ex.-31) $M_n$=881, vinyl-1,2% 38.7%, and VCP 7.3% (C-13 NMR); (Ex.-63) $M_n$=1139, vinyl-1,2% 34.1%, and VCP 4.7% (C-13 NMR); and (Ex.64) $M_n$=1378, vinyl-1,2% 34.1%, and VCP 3.3% (C-13 NMR) with Brookfield Viscosity (25° C.) of 333, 133, 274 and 488 respectively. Similarly comparison of the prior art compositions should be made to Examples 65 and 66 (Ex.-65) $M_n$=799, vinyl-1,2% 26.7%, and VCP 7.8% (C-13 NMR); and (Ex.66) $M_n$=749, vinyl-1,2% 25.2%, and VCP 6.6% (C-13 NMR) with Brookfield Viscosity (25° C.) of 84.1 and 81.9 respectively. Accordingly the present disclosure provides, among other things, for the first-time liquid BR compositions of having a total vinyl-1,2-BD content (vinyl-1,2 and VCP combined weight percent) of about 40 to 50% lower viscosity for a given $M_n$ value.

Another significant feature of this disclosure can be the seemingly subtle change in the structure or organic framework of the amino-alcohol and/or any ether-alcohol ligand(s) used in forming the LOXSH catalyst composition achieving a dramatic effect on the selectivity as well as the activity of a particular LOXSH catalyst composition. Replacing a simple proton on the organic framework with an alkyl group (e.g. methyl, ethyl, propyl, etc. group(s)) can change the selectivity from greater than 81% vinyl 1,2-BD to as low as 32 wt % total vinyl 1,2-BD- and thereby change the reactivity, viscosity and $T_g$ of the resulting HMPBD composition.

Analytical Methods:

Molecular weight determinations were made via gel permeation chromatography. Examples 1-3, hydrogen mediated anionically randomly polymerized polystyrene co-polyisoprene samples were analyzed using OligoPore columns and are based on PS standards internally calibrated (see Application No. WO2017176740A1 for detailed description of method) using a refractive index detector. For Examples 4-81 molecular weight distributions in terms of $M_n$, $M_w$, $M_z$, and PD were obtained by GPC using a Viscotek TDA modular system equipped with a RI detector, autosampler, pump, and temperature-controlled column compartment. The columns used were Agilent ResiPore columns, 300 mm by 7.5 mm, part number 1113-6300. The solvent used was tetrahydrofuran, HPLC grade. The test procedure used entailed dissolving approximately 0.06-0.1 g of sample in 10 mL of THF. An aliquot of this solution is filtered and 200 μl is injected on the columns. Examples 4-25 molecular weight determinations were based on polyisoprene standards having 50% 1,4-PI microstructure. Examples 26-81 molecular weight determinations were based on polybutadiene standards having 50% 1,4-BD microstructure. Microstructure analyses for polybutadiene microstructure characterization was based on C13-NMR and $^1$HNMR peak assignments in accord with the following reports: Matlengiewcz, M., Kozak, R. *International Journal of Polymer Anal. Charact.* 2015, 20, 574; Fetters, L., Quack, G. *Macromolecules,* 1978, 11, 369. Total vinyl wt. % content is based on the cyclic structure comprising only vinylcyclopentane and arises from two vinyl motifs (Fetters). Total vinyl content or equivalents is additionally determined in accord with Luxton, A. R., Milner, R., and Young, R. N. *Polymer,* 1985, 26, 11265. Polybutadiene FT-IR microstructure analyses was in accord with: Morero, D; et. al. *Chem E Ind.* 1959, 41 758.; Shimba, A. et. al. *Analytical Sciences* 2001, 17, i 1503.

EXAMPLES

The following Examples illustrate methods of in situ production of the LOXSH catalyst as well as producing the hydrogen mediated conjugated polymer and co-polymer distributions pursuant to this disclosure. These Examples are not intended to limit the disclosure to only the procedures described therein.

The apparatus used for this work is as follows: 316 stainless steel 2-liter Parr autoclave having thermal couple, bottom drain valve, cooling coils, hot oil jacket, four pitched blade turbine impellers with the first 4.0", the second 6.0", the third 8" and the fourth 10" from the top of the reactor. The reactor was further equipped with a piston pump, nitrogen purged 250 ml stainless charge vessel, a well calibrated high-pressure metering pump and a 1/16th inch OD subsurface monomer feed line having either a 0.007" ID terminal section (as noted in the Examples and/or Tables below). The magnetic drive on the agitator is connected to a high-speed air driven motor and generally operated at a near constant 1000 RPMs (adjusting the air flow and pressure as needed as the reaction mixture viscosity changes). Two one-liter gas cylinders outfitted with a digital pressure gauge (readability of 0.01 PSIG) provide a wide spot in the line between the reactor and the hydrogen gas supply. Prior to the start of a run the cylinders are pressured to 435450 PSIG hydrogen and then isolated from the hydrogen supply. Hydrogen is fed via digital hydrogen mass flow meter with a totalizer. For styrene polymerizations hydrogen was fed subsurface through a 0.007" I.D. feed tip, for diene polymerizations hydrogen was fed to the headspace.

The autoclave is vented to an oil bubbler and/or to a 6-liter oil jacketed creased wash vessel having a bottom drain and outfitted for overhead stirring and distillation. The bottom drain valve and the dip-leg sampling port of the autoclave are both plumbed to the wash vessel for direct transfer of the unquenched reaction mixture. Bulk solvent (e.g., cyclohexane (CH) or methylcyclohexane (MCH) or ethylbenzene (EB) or mixtures thereof recovered from a previous run) is charged to the reactor via piston pump through the charge vessel. The catalyst components (e.g., polar modifiers and n-butyllithium) are charged separately after dilution with solvent to the reactor through the charging vessels with the flow rate controlled with a fine metering Vernier handle needle valve. The metering valve is coupled to the inlet valve on the reactor's dip-leg by means of a short port connect fitting and further connected to the charge vessel via an 8-inch length of thick walled ⅛" PTFE tubing. The translucent tubing acts as a sight glass such that the operator can monitor the transfer of the dissolved catalyst components to the reactor and thereby eliminate the introduction of nitrogen by closing a block valve once nitrogen is seen in the line.

The contents of the charge vessel are pressure transferred with a minimum of nitrogen back-pressure to the autoclave having a hydrogen atmosphere. Monomer (or an admixture of monomers) is fed at predetermined constant rates via high pressure metering pump through either or both of: 1) a column containing 22 grams of activated 4A molecular sieves; and/or 2) basic alumina column (1 0.5" O.D columns w/11.0 g to 14.5 g of 60-325 mesh $Al_2O_3$); to remove water and to remove the inhibitor. The autoclave reactor is heated with oil having a temperature set point at or generally just around ±1° C. to ±3° C. of the desired reaction temperature (depending on the feed rate) and the reaction temperature was tightly maintained at the predetermined set point once the reactor controller lined out (generally no longer than the first 20 minutes of the monomer feed). The reaction temperature might have brief excursion in temperature generally no more than 5° C. above the desired set-point temperature.

Several acronyms for compounds classes: I) amino-alcohols (AA); II) ether-alcohols (EA) and III) amino-ether-alcohols (AEA), either used in these Examples or could be used in processes analogous to these Examples are presented below:

AA-1. DMEA is an acronym for N,N-dimethylethanolamine (Synonym: N,N-Dimethyl-2-hydroxyethylamine, N,N-Dimethylaminoethanol DMAE) as the neutral aminoalcohol. The usage herein in a chemical formula of [DMEA] represents N,N-dimethylethanolamine as an alkoxide having given up one proton to a more basic species.

AA-2. DMAP is an acronym for 1-(dimethylamino)-2-propanol (CAS 108-16-7), syn (±)-1-(N,N-dimethylamino)-2-propanol, dimepranol. N,N-dimethylisopropanolamine.

AA-3. DMAB is an acronym for 1-(dimethylamino)-2-butanol (CAS 3760-96-1) syn. 1-(dimethylamino)butan-2-ol.

AA-4. DMACH is an acronym for trans-2-(dimethylamino)cyclohexanol (CAS 20431-82-7) syn. 2-dimethylaminocyclohexan-1-ol, 2-Dimethylamino-cyclohexanol.

AA-5. PipE and 2-Pip-ethanol are an acronyms for 2-piperidinoethanol (CAS 3040-44-6; synonyms 1-(2-hydroxyethyl piperidine; 1-Piperidineethanol).

AA-6. Pip-2-propanol is an acronym for 1-piperidino-2-propanol (CAS 934-90-7; syn. a-methylpiperidine-1-ethanol).

AA-7. Pip-2-butanol is an acronym for 1-piperidino-2-butanol (CAS 3140-33-8), syn. 1-(Piperidin-1-yl)butan-2-ol.

AA-8. 2-Pip-cyclohexanol is an acronym for trans-2-piperidinocyclohexan-1-ol (CAS 7581-94-4; syn. 2-(piperidin-1-yl)cyclohexan-1-ol; trans-2-piperidinylcyclohexanol).

AA-9. 2-Pyr-ethanol is an acronym for 1-pyrrolidinoethanol (CAS 2955-88-6; N-(2-Hydroxyethyl)pyrrolidine; 1-Pyrrolidineethanol; Epolamine; 1-(2-hydroxyethyl) pyrrolidine).

AA-10. Pyr-2-propanol is an acronym for 1-pyrrolidinylpropan-2-ol (CAS 42122-41-8; 1-(pyrrolidin-1-yl)propan-2-ol; alpha-methylpyrrolidine-1-ethanol).

AA-11. 2-Pyr-2-butanol is an acronym for 1-(1-pyrolidinyl)-2-butanol (CAS 55307-73-8) syn 1-Pyrrolidineethanol, α-ethyl-.

AA-12. 2-Pyr-cyclohexanol is an acronym for 2-pyrolidinocyclohexanol (CAS 14909-81-0; trans-2-pyrrolidinocyclohexanol trans-2-(pyrrolidin-1-yl)cyclohexan-1-ol; (+/−)-trans-2-(pyrrolidin-1-yl)cyclohexanol).

AA-13. 2-Piz-ethanol is an acronym for 4-methyl-1-piperazineethanol (CAS 5464-12-0) syn. (1-(2-Hydroxyethyl)-4-methylpiperazine; 2-(4-methylpiperazin-1-yl)ethanol; 2-(4-Methyl-1-piperazinyl)ethanol).

AA-14. 4-Me-Piz-2-propanol is a synonym for 1-(4-Methyl-1-piperazinyl)-2-propanol (CAS 4223-94-3) syn. 1-(4-methylpiperazin-1-yl)propan-2-ol AA-15. 4-Me-Piz-2-butanol is a synonym for 1-(4-Methyl-1-piperazinyl)-2-btanol (CAS 56323-03-6) syn 4-(4-methylpiperazin-1-yl)butan-1-ol 1-(4-Hydroxybutyl)-4-methyl-piperazine; 1-Piperazinebutanol, 4-methyl-; 4-(4-methyl-1-piperazinyl)-1-butanol AA-16. 2-[4-Me-Piz]-cyclohexanol is an acronym for trans-2-(4-methyl-1-piperazinyl)-cyclohexanol (CAS 100696-05-7, syn. trans-2-(4-methylpiperazin-1-yl)cyclohexanol; (+-)-trans-2-(4-methyl-piperazino)-cyclohexanol).

AA-17. MorE is an acronym for 2-morpholinoethanol (CAS 622-40-2); syn. 4-(2-hydroxyethyl)morpholine; 2-(morpholin-4-yl)ethanol; 2-(4-Morpholinyl)ethanol.

AA-18. Mor-2-Propanol is an acronym for 1-(4-Morpholinyl)-2-propanol (CAS 2109-66-2) syn. N-(2-Hydroxypropyl)morpholine; 1-(morpholin-4-yl)propan-2-ol; 2-morpholinoethanol, a-methyl-.

AA-19. Mor-2-butanol is an acronym for 1-(4-Morpholinyl)-2-butanol (CAS 3140-35-0) syn. 1-(morpholin-4-yl)butan-2-ol; 2-morpholinoethanol, a-ethyl-.

AA-20. 2-Mor-cyclohexanol is an acronym for trans-2-morpholin-4-ylcyclohexanol (CAS 14909-79-6) syn. 2-(4-Morpholinyl)cyclohexanol; 2-morpholin-4-ylcyclohexanol AA-21. N-Me-Pip-2-MeOH is an acronym for N-methylpiperidine-2-methanol (CAS 20845-34-5. 1-Methyl-2-piperidinemethanol; (1-methylpiperidin-2-yl)methanol; 1-methylpiperidine-2-methanol).

AA-22. N-Me-Pry-2-MeOH is an acronym for the chiral and/or the racemic molecule (1-Methyl-2-pyrrolidinyl) methanol (CAS 30727-24-3; 34381-71-0); syn. N-methylprolinol); 1-Methyl-2-pyrrolidinemethanol.

EA-1. MeOE is an acronym for 2-methoxyethanol as the neutral ether-alcohol. The usage herein in a chemical formula of [MeOE] represents 2-methoxyethanol as an alkoxide having given up one proton to a more basic species.

EA-2. 1-MeO-2-Propanol is an acronym for 1-methoxy-2-propanol (CAS 107-98-2) syn. 1-Methoxy-2-hydroxypropane; Methoxyisopropanol; 1-methoxypropan-2-ol; Dowanol® PM.

EA-3. 1-MeO-2-Butanol is an acronym for 1-methoxy-2-butanol (CAS 53778-73-7) syn. 1-Methoxybutan-2-ol.

EA-4. 2-MeO-cyclohexanol is an acronym for trans-2-Methoxycyclohexanol (CAS 134108-68-2).

EA-5. THFA is an acronym for tetrahydrofurfuryl alcohol (CAS 97-99-4; syn. (Tetrahydrofuran-2-yl)methanol; Tetrahydro-2-furanmethanol; THFA).

AEA-1. DMAEOE is an acronym for 2-N,N-dimethylaminoethoxyethanol ($N(CH_3)_2CH_2CH_2O—CH_2CH_2OH$) as the neutral amino ether-alcohol. The usage herein in a chemical formula of [DMAEOE] represents N,N-dimethylaminoethoxyethanol as an alkoxide having given up one proton to a more basic species.

The polar modifiers utilized in forming the catalyst(s) of an Example are designated in the data tables as: I) AA-#; II) EA-#; or III) AEA-#. Accordingly if a Table identifies AA-5 as the AA or polar modifier then that indicates that 2-piperidinoethanol was used in the Example. Likewise if a Table indicates the use of AA-1 and EA-5, then the catalyst of that Example comprises N,N-dimethylethanolamine and tetrahydrofurfuryl alcohol. Additional polar modifiers (μ-type) utilized in forming the catalyst are designated as THF (tetrahydrofuran) and as TMEDA (N,N,N'N'-tetramethylethylenediamie).

General Procedure Followed in Forming Catalyst

Application No. WO2017176740A1 provides many procedures in which the catalyst useful in the practice of this disclosure can be prepared. The general procedure (with some run-to-run variation as is indicated) followed in this Report is described below:

Forming a Standard HMAPS $[DMEA]_2Li_3H$ Catalyst:

Anhydrous cyclohexane, 225 ml of 370 ml total, was charged to the reactor at 37.7° C. under a dry hydrogen (22 PSIG $H_2$) atmosphere. To the stirred solvent (≈750 RPM) was charged through the charge vessel via positive nitrogen pressure, a solution previously formed from 3.908 g (0.0438 mol.) N,N-dimethylethanolamine and 35 g of cyclohexane further combined with 50 ml of the anhydrous solvent from the total above. Next, 33.19 ml (0.0664 mole) 2.0 M n-butyllithium dissolved in 23 g of anhydrous ethylbenzene and 57 g of anhydrous cyclohexane was transferred to the charge vessel and further combined with 50 ml of the anhydrous solvent from the total above. This alkyl lithium solution was then pressure transferred over a period of 9 to 15 minutes to the stirred (≈750 RPM) reaction mixture under hydrogen. After 3 minutes of the transfer the temperature had risen to 38.4° C. and the pressure to 23 PSIG; after 6 minutes of the transfer the temperature had raised to 42.0° C. and the pressure to 25 PSIG. At that point agitation was increased to 1040 RPM; and the transfer was complete in 9 minutes. At the end of the transfer the reactor temperature was 40.8° C. and the pressure had dropped to 22 PSIG. At the end of the organolithium charge the transfer line was flushed with 45 ml of anhydrous solvent from the total above. The reactor was then pressured to 50 to 60 PSIG hydrogen and heated to the desired temperature (68-75° C. typically) and held at that temperature for 100-120 minutes at a pressure of (65-80 PSIG). At the start of the feed the reactor is first vented to 7-15 PSIG prior to feeding monomer.

Hydrogen Mediated Co-polymerizations and Polymerization with standard HMAPS Catalyst Examples 1-4 with Results Reported in Table II In these Examples it was found that hydrogen mediated anionic polymerization of isoprene as well as co-polymerization of isoprene with styrene can be accomplished using the standard preferred HMAPS catalyst $[DMEA]_4Li_6H_2$ formed from 4 equivalents DMEA, 6 equivalents n-butyllithium and two equivalents of elemental hydrogen. However, the polymerization reaction is hampered by a relatively slow rate of initiation and of propagation relative to a fast rate of hydrogen mediation or chain transfer.

Competition Examples which entail the hydrogen mediated co-polymerization of styrene with isoprene were very revealing. First, at low isoprene loadings 20 mole % isoprene and 80 mole % styrene, essentially all the isoprene is incorporated into the hydrogen mediated co-polymer which is produced in a total mass yield of 93.0% (mass of polymer/mass of monomer charged). The resulting hydrogen mediated polystyrene co-polyisoprene composition is comprised of 23.8% isoprene repeating units 91% having the cis-1,4-IP microstructure relative to all PIP microstructural units. The increased molar content—23.8% vs. 20.0% charged—of isoprene in the polymer reflects the amount of styrene that is converted to ethylbenzene and not incorporated in the co-polymer during the hydrogen mediated process. Second, at high isoprene loadings 80 mole % isoprene and 20 mole % styrene, styrene reacts into the polymer chains at a faster rate than isoprene indicating that isoprene is: a) slower to undergo initiation by the LOXLiH catalyst; and/or b) slower to homopolymerize; and/or c) faster to undergo reduction by hydrogen; than styrene. Under this set of conditions a hydrogen mediated anionic polystyrene co-polyisoprene composition was obtained in 83% yield having an isoprene content of 76.5 mole %. The resulting composition having 41% 1,4-IP microstructure relative to all PIP microstructural units. Third at very high isoprene loadings 87 mole % isoprene and 13 mole % total styrene, feeding half of the styrene as an admixture with isoprene and feeding the other half afterwards increases isoprene incorporation into the co-polymer. Under this set of conditions a 90% yield of a hydrogen mediated polystyrene co-polyisoprene composition comprising 86.8 mole % isoprene monomer units was formed. The resulting copolymer composition having 35.22% 1,4-IP microstructure relative to all PIP microstructural units. And Fourth, homopolymerization of isoprene under a constant hydrogen atmosphere under essentially batch conditions requires a minimum temperature of about 57° C. but can run at a reasonably fast rate at temperatures above 65° C. (no controlled hydrogen co-feed). Under such conditions wherein the reaction atmosphere is not controlled (pressures from 37 to 60 PSIG during the run and from 60 down to 3 PSIG at the completion) a relatively low molecular weight HMPIP composition ($M_n$=826) is obtained in 82.4% yield. The resulting homo-polymer composition having 35.42% 1,4-IP microstructure relative to all PIP microstructural units.

Example 1: Representative of a LOXLiH Catalyzed Hydrogen Mediated Anionic Chain Transfer Styrene Isoprene Copolymerization Employing a well-Controlled Limiting Hydrogen Co-feed.

The procedure for forming the $[DMEA]_2Li_3H$ presented above was followed except that the catalyst was formed from: 4.008 g (0.0455 mole) DMEA; and 34.17 ml (26.530 g, 0.0683 mole) 2 M n-butyllithium. At the end of the catalyst forming step the $H_2$ pressure was increased from 23 PSIG to 60 PSIG (39.6° C. in the reactor) and the oil jacket temperature was set to 78° C. controlling at 80° C. The catalyst was aged at 71° C. and 80 PSIG for 120 minutes before venting to 10 PSIG. The hydrogen feed rate was set to 250 SCCM and the totalizer was set to 17489.5 standard $cm^3$(250 standard $cm^3$/minute*59 minutes for a 1-hour monomer feed with a 10-minute flush of the monomer feed line). The styrene-isoprene monomer feed (formed from 416 g, 4.0 mole styrene and 68.1 g, 1.0 mole isoprene) was initiated, feeding 484 g (5.0 mole) of monomer at a rate of 8.68 g/minute. Thus, the molar feed ratio of monomer to hydrogen=8.11. Monomer was fed through a subsurface feed line (0.007" I.D. tip, 10.30 ft/s) against the initial hydrogen head pressure initially of 12 PSIG for the first 5 minutes with a pressure increase to 13 PSIG over next 15-minute period—at 10 minutes the valve from the hydrogen mass flow meter to the reactor was opened. The liquid volume of the feed line including the void volumes of the molecular sieve and alumina bed is about 23.4 ml. The reactor pressure lined out at 1 PSIG after 50 minutes of feeding.

At the end of the monomer feed, the monomer feed line to the reactor, including the drying columns, were flushed with 50 ml of anhydrous ethylbenzene in 10 ml increments. At the end of the flush, the monomer feed line to the reactor, including the drying columns, were flushed with a second 50 ml of anhydrous ethylbenzene. The monomer feed and flush to the reactor was deemed complete when no further heat of reaction was observed generally signified by the permanent closing of the automated control valve on the cooling coils. The unquenched polymerization reaction mixture was transferred with positive $H_2$ pressure to the wash vessel previously heated ($N_2$ atmosphere) and previously charged with 500 ml of deoxygenated water.

Standard Work-up and Product Isolation

The two-phase product mixture was heated to 65° C. in the wash reactor for at least 20 minutes with sufficient mixing to assure good washing of the organic phase by the aqueous and then the phases were separated. Phase cuts were easily made at 65° C. and were rapid requiring little settling time. Water and any rag or emulsion was removed through the bottom drain valve. The reaction mixture is washed twice more: 1) 500 ml dilute sulfuric acid and 2) 500 ml dilute sodium bicarbonate. The neutralized washed product mixture was stripped in the wash reactor of cyclohexane and ethylbenzene by normal distillation while gradually heating the wash reactor's jacket temperature to 155° C. The distillation was deemed complete when the pot temperature reached a temperature above 135° C. The solution was allowed to cool before collecting the entire organic phase. The solution was then further stripped of ethylbenzene with the use of a wiped film evaporator (WFE, 2" glass Pope Still, operated at 50.0 mmHg vacuum, 142° C., wiper speed 65% of full rate, feeding at 1.0 liters/hr). This WFE operation produced 450 g 93% mass yield of a hydrogen mediated anionic copolymer formed from styrene and isoprene. Said copolymer having $M_n$: 853, $M_w$: 1403, $M_z$: 2071, PD: 1.645, $\sigma_n$=685, $n\alpha_3$=2.045 vs. HMAPS oligomer standards (refractive index detector). Further analytical details in terms of microstructure and composition are provided in the Table I below.

Examples 5-16, Tables III-IV: These Examples entail the application of DMEA and of 2-Pip-ethanol based LOXLiH catalysts and of MeOE or of THFA modified LOXLiH catalysts to the hydrogen mediated anionic polymerization of isoprene.

The process conditions and the physical properties of the resulting hydrogen mediated polyisoprene compositions are reported in Tables III-IV. Table III provides the process data. Tables IV provides yield and physical property data. All Examples in these Tables except Example 16 utilized a LOXLiH catalyst wherein the total amount of PM was about 0.0588 moles and the ratio of Li:PM was about 1.5. Example 16 utilized one third less catalyst (0.0393 mole total PM) with the same 1.5 molar ratio of Li to σ-μ polar modifier. Examples 15 utilized a 5 ml/min feed rate (≈60-minute monomer feed) of isoprene wherein the balance of the Examples utilized a 10 ml/min feed rate (≈30-minute monomer feed). In each of the Examples, isoprene was initially fed at a temperature deemed to be below the minimum to achieve an efficient rate of hydrogen mediated anionic polymerization. In general, during the first 15 to 20 minutes of feed, the reactor was gradually warmed until strong evidence was observed that all of the three desired chemical processes (i.e. polymer chain initiation, polymer chain propagation and hydrogen chain transfer) were underway. Such evidence includes a reduction in reactor pressure due to consumption of monomer and hydrogen as well as an exothermic reaction causing the reaction temperature to increase to or above the reactor's oil jacket temperature. This approximated minimum reaction temperature is recorded in Table III. All of the runs were conducted in a reaction medium comprising 74-78 wt. % ethylbenzene. Examples 5-10 utilized fresh cyclohexane and fresh ethylbenzene in forming the reaction mixtures.

Examples 11-16 utilized recycled solvent comprising EB (96-98 wt. %); CH (0-2.7 wt. %) and polyisoprene oligomers (mostly trimers, 2.2-2.7 wt. %) as well as fresh cyclohexane. Lower EB concentrations (aromatics are deemed to have an accelerating effect on the process) can be used but it was desired for this first series of Examples to keep the amount of cyclohexane in the vapor space to a minimum. The immediately following discussion is limited to the process conditions and product yield. The surprising relationship of product composition and physical properties of the resulting HMPIP and HMPBD product distributions to the LOXSH catalysts compositions is presented above and in FIG. 13.

Examples 6, 10 and 16 involve the application of LOXLiH catalysts formed from σ-μ polar modifier: 1) DMEA; 2) 2-Pip-ethanol; or 3) DMEA (75 mole %) w/2-Pip-ethanol (25 mole %) respectively. These three runs as well as Example 4 serve as baseline Examples to which all other subsequent Examples should be compared. In terms of the process chemistry as well as the product HMPIP microstructure there is little differences observed. Accordingly, the processes are characterized by sluggish reactions, long reaction times which provide generally (Examples 4, 6 and 10) reduced yields though the process conditions—especially reaction temperature and hydrogen relative feed rate throughout the course of the process—have not been at all optimized. It was clear from these three Examples that 100% conversion of isoprene required as much as 3 to 4 hours and it was likely that as the isoprene monomer concentration dropped much of the isoprene was simply being converted to very volatile dimers and trimers and/or hydrogenated to form reduced monomer. In Example 15 a longer feed time (feeding at half the rate 5 ml/min. vs. 10 ml/min.) improved the HMPIP yield from as low as 80% to as high as 89%. It is pointed out that the process that utilized the standard LOXLiH catalyst formed from DMEA (AA-1) would run efficiently at a minimum temperature of 61.5° C. In contrast the process that utilized a catalyst formed from 2-Pip-ethanol (AA-5) required at least 69.5° C. to run efficiently. The process that utilized catalyst(s) formed from a mixture of DMEA and 2-Pip-ethanol required at least 64.5° C. to run efficiently in the process equipment employed. As a whole, 2-Pip-ethanol provides a catalyst that requires higher temperatures and longer reaction times to produce a high yield of HMPIP as compared to catalysts formed from DMEA. As will be discussed in more detail further below 2-Pip-ethanol has a slight bias over DMEA in forming catalyst that favor formation of the 1,4-IP microstructure. In contrast DMEA has a slight bias over 2-Pip-ethanol in forming the vinyl-1,2 IP microstructure. As will be seen these biases are further enhanced by altering the LOXLiH catalyst with ether-alcohol σ-μ polar modifier.

A key observation from these Examples was that conversion of isoprene to polymer after the feed or after about 80% conversion, further conversion became very slow while hydrogen uptake remained relatively steady and fast. Based on this observation it was decided that it would be beneficial to stop feeding hydrogen towards the end of the run to retard the rate of reduction of monomer and thereby increase the amount of monomer converted to polymer.

Examples 5, 7-9, 11-14 and 16 entail the application of σ-μ polar modifier ether-alcohol ligand altered or modified LOXLiH catalyst. The intent of the application of these altered catalysts was to attenuate the ability of the resulting LOXLiH catalyst(s) to provide for hydrogen chain transfer and thereby allow polymer chain initiation and polymer chain propagation to compete with monomer reduction more successfully. However, it was surprisingly and inadvertently discovered that the incorporation of an ether-alcohol (EA) σ-μ polar modifier (e.g. MeOE, THFA and by extension tetrahydropyranyl-2-methanol THP-2-MeOH, ethylene glycol monomethyl ether) greatly enhanced the rates of both polymer chain initiation and of polymer chain propagation. The preferential rate enhancements were so efficient that total polymerization reaction times could be reduced from the range of about 180 minutes to about 240 minutes down to range of about 125 minutes to as low as about 75 minutes while producing HMPIP product distributions in 87% to 94% yield.

Examples 5 and 9 entail the use of 5.741 g (0.0444 mole) of 2-Pip-ethanol with: (a) 1.560 g (0.0153 mole) THFA: or (b) 1.119 (0.0147 mole) MeOE for a total portion of polar modifier as 0.059 moles having a Li to PM ratio of 1.5 to 1.0. The LOXLiH catalysts thus formed contained about 75 mole % 2-Pip-ethanol as σ-μ polar modifier and were utilized in hydrogen mediated anionic isoprene polymerizations that ran well at 61.5° C. and 64.5° C. For comparison, Example 10 which was formed from 0.059 moles of 2-Pip-ethanol, this resulted in a process that required 69.5° C. to run efficiently. All three Examples produced HMPIP compositions having very similar molecular weight distributions and yields. It should be noted that all three of the processes could have benefited from longer reaction times and/or a reduced or eliminated hydrogen feed during the last ½ to ¼ of the reaction time to improve the yields. All three of these runs employing some portion of 2-Pip-ethanol a σ-μ polar modifier exhibited an exotherm at the end of the run when pressured from the ending pressure of 2 to 0 PSIG to 27 PSIG hydrogen. The exotherm was accompanied by a relatively rapid drop in pressure over the next 5 to 15 minutes as monomer was apparently reduced without incorporation into the polymer distribution.

Examples 7, 8, 11-14 and 16 entail the use of DMEA as a σ-μ polar modifier along with some portion of MeOE. Comparison of these Examples can be made to Example 6 wherein the standard LOXLiH catalyst for HMAPS was formed from 0.0588 moles of DMEA, 0.0883 moles of n-butyllithium and 0.0294 moles of hydrogen. The amount of DMEA in the altered LOXLiH catalyst was varied from 80% to 65%. These altered catalysts all ran very efficiently at 61.5° C., so well that higher than expected molecular weight distributions were formed in yields of 89% to 94%. Reaction times were reduced from 165 min in Example 6 to 125 min. for Example 1 Ito as short as 75 min. for Example 13. Beginning with Example 11 a strong indication of a reaction endpoint was observed when at the end instead of a constant feed of hydrogen and production of a heat of reaction, an increase in pressure was observed which coincided with a more apparent drop in heat formation—much more like an HMAPS process wherein the rates of initiation, propagation and chain transfer are more balanced. The comparisons of: i) Example 8 with Example 11; ii) Example 13 with Example 14; and iii) Example 12 with Example 16 are all noteworthy. For Examples 8 and 11 the catalyst was formed from 75% DMEA and 25% MeOE, all the reaction conditions were essentially identical except for the relative co-feed of hydrogen (30 vs. 40 SCCM respectively) and the total amount of hydrogen fed (2081 vs. 3870 std. $cm^3$ respectively). Both Examples 8 and 11 produced HMPIP compositions in 90% yield but of different $M_n$ ($M_n$=1339 vs. $M_n$=1162 respectively). Similarly, in Examples 13 and 14 the catalyst was formed from 65% DMEA and 35% MeOE, all the reaction conditions were essentially identical except for the relative co-feed of hydrogen (50 vs. 60 SCCM respectively) and the total amount of hydrogen fed (3084 vs. 4047 std. $cm^3$ respectively). Both Examples 13 and 14 produced HMPIP compositions in about 93% yield but of different $M_n$($M_n$=1761 vs. $M_n$=1370 respectively). Lastly, comparison of Examples 12 and 16 demonstrates the robustness of the process. In Example 12 isoprene was fed at the normal rate of 10.0 ml/min (normal for this series of runs and for the experimental set up employed) to a reaction medium comprising an altered LOXLiH catalyst formed from 70% DMEA and 30% MeOE (0.0587 moles of PM, 0.08805 moles Li, 0.02935 moles hydride) at a reaction temperature of 61.5° C. In contrast, for Example 16 isoprene was fed at the ½ the normal rate, utilizing a 5.0 ml/min. monomer feed to a reaction medium comprising ⅔ the normal amount of LOXLiH catalyst which was formed from 70% DMEA and 30% MeOE (0.0391 moles of PM, 0.0587 moles Li, 0.0196 moles hydride) at a reaction temperature of 64.7° C. Example 12 provided an HMPIP composition having an $M_n$ of 1421 Daltons in a 91% yield and Example 16 provided an HMPIP composition having an $M_n$ of 1179 Daltons. In both Examples a hydrogen feed rate of 30 SCCM was utilized during the course of the run. For Example 12 the total hydrogen charged (initial charge and fed) was 3350 std.

$cm^3$, for Example 16 the total hydrogen charged was 4789 std. $cm^3$ (both Examples ended with a 10 PSIG hydrogen pressure).

Example 13: Representative of a Mixed LOXLiH Catalyzed Hydrogen Mediated Anionic Chain Transfer Isoprene Polymerization Employing a Hydrogen Co-feed.

The procedure for forming the $[DMEA]_2Li_3H$ presented above was followed to form the catalyst composition(s) having the stoichiometry of $[DMEA]_4[MeOE]_2Li_8H_2$ except that the catalyst was formed at 19-24° C. and from: 3.397 g (0.0381 mole) DMEA and 1.561 g (0.02052 mole) 2-Methoxylethanol (MeOE); and 44.51 ml (34.559 g, 0.0890 mole) 2 M n-butyllithium. At the end of the catalyst forming step the $H_2$ pressure was increased from 21 PSIG to 46 PSIG (23.7° C. in the reactor) and the oil jacket temperature was set to 78° C. controlling at 80° C. The catalyst was aged at 72.9° C. and 61 PSIG for 90 minutes before cooling to 56° C. and then venting to 0 PSIG. The reactor was then recharged with 1200 standard $cm^3$ of Hydrogen (350 SCCM) to a pressure of 16 PSIG. The hydrogen feed rate was set to 50 SCCM and the totalizer was set to a value much greater than would be fed such that the $H_2$ feed would not be interrupted. The isoprene-feed 186 g, (2.73 mole) was initiated, feeding at a rate of 5.00 ml/min through a subsurface feed line (0.007" I.D. tip) against the initial hydrogen head pressure at first at 16 PSIG for the initial 15 minutes. The pressure increased to 19 PSIG while the temperature increased from 57.8° C. to 61.1° C. during that first 15-minute period. At the 15 minutes feed time the valve from the hydrogen mass flow meter to the reactor was opened causing the pressure to build to 21 PSIG maintaining that pressure until the end of the monomer feed at 30 minutes. At the end of the monomer feed, the monomer feed line to the reactor, including the drying columns, were flushed with 50 ml of anhydrous ethylbenzene in 10 ml consecutive aliquots. At the end of the flush, the monomer feed line to the reactor, including the drying columns, were flushed with a second 50 ml of anhydrous ethylbenzene. During the course of the monomer feedline flush hydrogen feeding was continued. During this period and for some time after the pressure gradually dropped from 21 PSIG to 15 PSIG and the temperature maintained a steady 61.7° C. to 62.0° C. After 65 minutes from the start of the feed the temperature finally began to drop (60.9° C.) and the pressure began to increase. At 75.0 minutes the temperature reached 60.1° C. and the pressure had built to 17 PSIG and the reaction was deemed complete.

The unquenched polymerization reaction mixture was transferred with positive $H_2$ pressure to the wash vessel previously heated ($N_2$ atmosphere) and previously charged with 500 ml of deoxygenated water.

After the standard work-up and solvent strip the solution was then further stripped of ethylbenzene with the use of a wiped film evaporator (WFE, 2" glass Pope Still, operated at 50.0 mmHg vacuum, 142° C., wiper speed 65% of full rate, feeding at 1.0 liters/hr). This WFE operation produced 174.5 g 93.8% yield of a liquid hydrogen mediated anionic polyisoprene composition. Said liquid HMPIP composition distribution having $M_n$: 1761, $M_w$: 3930, $M_z$: 6460, PD: 2.087, $\sigma_n$=1428, $n\alpha_3$=2.580 (refractive index detector). Further analytical details in terms of microstructure and composition are provided in the Table IV below.

Examples 17-21, Table V: In this series of 5 Examples the bases of a structure activity relationship for the σ-μ polar modifier of the LOXLiH, moreover any LOXSH, catalyst has been made. These five new polar modifiers feature steric crowding around the alcohol of the ligand. Four of the ligands are secondary alcohols. All five of these ligands much like 2-Pip-ethanol above required higher temperatures and longer reaction times to conduct an efficient process. The four ligands having secondary alcohols generally resulted in reduced yields (77-89%). Of the five ligands only N-methyl-Pip-2-methanol (AA-21) was purchased (used as received), the other four ligands were prepared in house (>99% purity) by reacting a 10% solution of the cyclic amine with the corresponding epoxide (cyclohexene oxide or propylene oxide) in water with about 10-30 wt. % THF at 25-35° C. The purchased ligand when dissolved in hydrocarbon solvent left insoluble material (apparently wet) on the walls of the flask. Thus a 10% excess of n-butyllithium (over the standard relative charge) was used in forming the catalyst. (Example 19).

Examples 17-18 entail the polymerization of 500 ml of isoprene whereas only 250 ml was polymerized in Examples 20 and 21; all runs utilized a 5.0 ml/min feed rate.

Example 17: Representative of an amino-cyclohexanol based LOXLiH Catalyst Preparation with Subsequent Hydrogen Mediated Anionic Chain Transfer Isoprene Polymerization Employing a well-Controlled Constant Hydrogen Co-feed.

The procedure for forming the $[DMEA]_2Li_3H$ presented above was followed to form the catalyst composition(s) having the stoichiometry of $[PCA]_2Li_3H$ (wherein the PCA is 2-(2-piperidino)-cyclohexanol, 2-Pip-cyclohexanol). Thus, the catalyst was formed from: 10.770 g (0.0588 mole) 2-Pip-cyclohexanol; and 44.07 ml (34.219 g, 0.0881 mole) 2 M n-butyllithium. At the end of the initial catalyst forming step the $H_2$ pressure did not decrease but had increased to 28 PSIG while the temperature increased from 28.9° C. to 31.5° C. (15 minutes since starting the butyllithium charge). The pressure was increased to 40 PSIG with a temperature of 30.6° C., within 6 minutes the pressure dropped to 37 PSIG while the temperature only dropped to 30.2° C. giving the first indication of lithium hydride formation. The reaction mixture was gradually heated to 40.2° C. with pressure gradually returning to 39 PSIG. The $H_2$ pressure was increased to 59 PSIG and the oil jacket temperature was set to 78° C. controlling at 80° C. At 52 minutes after the first amount of n-butyllithium was charged the temperature had reached 71.1° C. with a pressure of 68 PSIG.

The catalyst was aged at 72.9° C. and 68 PSIG for 40 more minutes before cooling to 61.7° C. and then venting to 0 PSIG. The reactor was then recharged with 900 standard $cm^3$ of Hydrogen (350 SCCM) to a pressure of 12 PSIG. The hydrogen feed rate was set to 37.5 SCCM and the totalizer was set to a value much greater than would be fed such that the $H_2$ feed would not be interrupted. The isoprene-feed 350 g, (5.14 mole) was initiated, feeding at a rate of 5.00 ml/min through a subsurface feed line (0.007" I.D. tip) against the initial hydrogen head pressure initially of 12 PSIG for the first 20 minutes. The pressure increased to 14 PSIG while the temperature increased from 61.7° C. to 62.9° C. during that first 20-minute period. At that 20 minutes feed time, the valve from the hydrogen mass flow meter to the reactor was opened causing the pressure to build to 20 PSIG over the next 25 minutes (45 minutes of feeding). During that time the temperature was increased from 62.9° C. to 70.4° C. by increasing the oil jacket temperature from 65° to 75° C. After 50 minutes of feeding it was finally readily apparent that hydrogen and isoprene consumption had reached a point wherein, they were consumed at rates faster than they were being fed—the reactor pressure dropped to 18 PSIG and the temperature held firm at 70.8° C. The reaction temperature was then controlled at 70.7° C. to 72.6° C. with 72.5° C.

silicone oil on the reactor jacket. The feed was complete after 120 minutes of feeding during the last 75 minutes of feeding the pressure had lined out at 11 PSIG and the temperature at 72.5° C. The hydrogen feed was continued until the reactor pressure had dropped to 1 PSIG (210 min.)—a total of 7950 standard $cm^3$ of hydrogen (including the 900-standard $cm^3$ initial charge) had been fed. The reactor was charged with hydrogen to a pressure of 28 PSIG which caused a mild exotherm (1/10$^{ths}$ of a degree C.) as the pressure dropped to 12 PSIG over the next 5 minutes. The reactor was again charged with hydrogen this time to 30 PSIG and required 20 minutes to reach a steady pressure of −2 PSIG.

The unquenched polymerization reaction mixture was transferred with positive $H_2$ pressure to the wash vessel previously heated ($N_2$ atmosphere) and previously charged with 500 ml of deoxygenated water.

After the standard work-up and solvent strip the solution was then further stripped of ethylbenzene with the use of a wiped film evaporator (WFE, 2" glass Pope Still, operated at 50.0 mmHg vacuum, 142° C., wiper speed 65% of full rate, feeding at 1.0 liters/hr). This WFE operation produced 289 g 82.5% yield of a hydrogen mediated anionic polyisoprene composition having $M_n$: 1353, $M_w$: 3244, $M_z$: 5415, PD: 2.398, $\sigma_n$=1600, $n\alpha_3$=2.665 (refractive index detector).

Examples 22-25, Table VI: In this series of Examples the LOXSH catalyst generically referred to as LOXKH was investigated in the hydrogen mediated anionic polymerization of isoprene. Prior to this work three LOXKH·TMEDA (see WO2017176740A1, Examples 25-27 of that application) had been prepared and utilized as HMAPS catalyst. In those examples the ratio of lithium to potassium was varied as Li:K of 3:1, 7:1 and 15:1 respectively and the ratio of DMEA to TMEDA was 1:1. In those examples the ratio of the catalyst composition DMEA:alkali metal:hydride: TMEDA was 1:2:1:1. In this series of Examples, TMEDA (a μ polar modifier) was eliminated such that its effect if any on microstructure would also be eliminated. It is pointed out that elimination of TMEDA from the process did provide some minor solubility issue such that the exact Li:K ratio in the catalyst formulation is not precisely known. Nonetheless the catalyst formulation is estimated at approximately $[\sigma\text{-}\mu\ PM]_4Li_5KH_2$; wherein the σ-μ polar modifier (PM) was DMEA or 1-Pip-2-propanol (77.4 mole %) with σ-μ polar modifier MeOE (22.6 mole %).

Examples 22 and 23 were conducted in a solvent medium comprising about 94% ethylbenzene. The first of the two runs, Example 22, utilized a catalyst formed from 0.0588 moles of DMEA, the second Example 23 utilized ½ that amount. Example 22 was initiated by co-feeding isoprene (5.0 ml/min) with hydrogen (70.1 SCCM) at a temperature of 60° C. The resulting process was unbelievably fast and as a consequence much cooling was applied to get the reaction temperature down to about 35° C. even under those conditions the reactor pressure had dropped to −8 PSIG (to be clear: negative 8). Thus, with a potassium-based catalyst isoprene could undergo hydrogen mediated anionic polymerization at such a rate that both isoprene and hydrogen were consumed at the rate at which they were fed. In Example 23 as noted above the amount of catalyst charged was cut in half as compared to Example 22. Example 23 polymerization was initiated at 33° C., the reaction temperature was controlled with chilled water (≈5° C.) and the hydrogen co-feed was 78.6 SCCM. The process still featured consumption of isoprene and hydrogen at the rate at which they were fed, however the steady state pressure was much higher (5 down to 2 PSIG hydrogen). Analyses ($^1$HNMR) of Examples 22 and 23 revealed incorporation of ethylbenzene as an organic chain transfer agent. Thus for Example 22 there was produced 169.04 g of an HMPIP composition from 175.5 g of isoprene having an $M_n$ of 596 (169.04/596=0.2836 moles of polymer chains). Proton NMR analysis indicates that 4.91 wt % of the composition is incorporated ethylbenzene (0.0491*169.04=8.30 g ethylbenzene, 8.30 g/106 g/mole=0.078 mole). Thus, under the conditions of Example 22, ethylbenzene competed with hydrogen as a chain transfer agent 27.6% (0.078/0.2836*100%) of the time. For Example 23 there was produced 167.67 g of an HMPIP composition from 184.0 g of isoprene having an $M_n$ of 928 (167.67/928=0.1807 moles of polymer chains). Proton NMR analysis indicates that 1.38 wt % of the composition is incorporated ethylbenzene (0.0138*167.67=2.31 g ethylbenzene, 2.31 g/106 g/mole=0.022 mole). Thus, under the conditions of Example 23 (lower temperature), ethylbenzene competed with hydrogen as a chain transfer agent 12.2% (0.022/0.1807*100%) of the time.

In contrast Examples 24 and 25 were conducted in a solvent medium comprising about 10% ethylbenzene and 90% methylcyclohexane (MCH). The first of the two runs Example 24 utilized a catalyst formed from 0.0294 moles of DMEA, the second run Example 25 utilized an altered LOXKH catalyst formed from 1-Pip-2-propanol (0.0250 mole) and MeOE (0.00728 mole). Example 24 was initiated by co-feeding isoprene (5.0 ml/min) with hydrogen (78.6 SCCM) at a temperature of 35° C. (controlling the reaction temperature with chilled water on the coils). In Example 25 as noted above the catalyst composition was changed to a mixed ligand formulation using the sterically incumbered 2-Pip-2-propanol ligand as well as MeOE. Example 25 was initiated at 45° C. however it was immediate apparent that the process would run at a lower temperature. Accordingly, the reaction temperature dropped to 35° C. and controlled at that temperature with chilled water (≈5° C.). The two processes featured consumption of isoprene and hydrogen at the rate at which they were fed. The steady state hydrogen pressure for Example 24 was 2 to negative 2 PSIG. The steady state pressure for Example 25 was 0 PSIG which was reached in less than about 20 minutes (making this run almost identical to an HMAPS run).

Accordingly, Example 24 produced 168.71 g of an HMPIP composition from 185.5 g of isoprene having an $M_n$ of 1324 (168.71/1324=0.1270 moles of polymer chains). Proton NMR analysis indicates that 0.44 wt % of the composition is incorporated ethylbenzene (0.0044*168.71=0.74 g ethylbenzene, 0.74 g/106 g/mole=0.007 mole). Thus, under the conditions of this Example, ethylbenzene competed with hydrogen as a chain transfer agent 65.5% (0.0070/0.1270*100%) of the time. For Example 25 there was produced 151.21 g of an HMPIP composition from 169.0 g of isoprene having an $M_n$ of 1463 (151.21/1463=0.1033 moles of polymer chains). Proton NMR analysis indicates that 0.36 wt % of the composition is incorporated ethylbenzene (0.0036*151.21=0.544 g ethylbenzene, 0.544/106 g/mole=0.0051 mole). Thus, under the conditions of this Example, ethylbenzene competed with hydrogen as a chain transfer agent 5.0% (0.0051/0.1033*100%) of the time.

Preparation of a 3.5 wt. % Stock Solution of $[DMEA]_2LiK$ (Solution A) in Ethylbenzene All operations were conducted in a nitrogen glovebox. Thus, an oven-dried 1000 ml graduated borosilicate bottle was equipped with a stirring bar and then weighed (698.26 g including cap and stirring bar). The bottle was place on a stirring hot plate in the nitrogen purged glovebox. To the bottle was charged 10.5 g of a 30% dispersion of potassium hydride in mineral oil. The dispersion was washed three time with 30 ml of anhydrous pentane; decanting each wash solution between washes. After the third wash the bottle was equipped with a rubber septum with a long 16-gauge nitrogen inlet needle and a short venting 18-gauge needle. Nitrogen was passed through the bottom of the bottle over the washed KH solid until a free-flowing powder and a constant weight of the bottle and its contents was obtained. At constant weight it was determined that the bottle contained 3.102 g of solid taken as 100% KH (0.07755 mole). The bottle was charged with 400 ml of ethylbenzene and equipped with another rubber septum and a 16-gauge needle vented to an oil bubbler. To the stirred KH suspension was charged 13.8 g (0.1548 mole) of DMEA over time such that the hydrogen produced vented from the bottle at a comfortable rate. Upon completion of the DMEA feed, 30.1 g of a 16.5 wt. % n-butyllithium (2 Min cyclohexane) was carefully introduced with vigorous stirring of the cloudy solution. The addition of BuLi was such that the red color that formed with each added increment was quickly quenched and dissipated. Upon completion of the addition, the resulting homogeneous solution was faint reddish orange. The color was quickly quenched with the addition of a drop of neat DMEA to produce a clear slightly yellow solution. The bottle and its contents were weighed, and it was determined to contain 466.26 g of solution (3.69 wt. % $[DMEA]_2LiK$). The solution was left to stand overnight during which time crystalline solids were deposited, some adhering to the walls and some as fine free flowing crystals. The solution was carefully decanted from the solids into an amber Sure-Seal® bottle and then capped (bottle cap with PTFE liner). The solids left behind were blown free of solvent to a constant weight of 1.0 g. Accordingly, the titer of the $[DMEA]_2LiK$ solution was adjusted to 3.49 wt. % (simple material balance).

Example 22: Preparation of $[DMEA]_4Li_5KH_2$ "LOXKH Catalyst" and in Ethylbenzene with Subsequent Hydrogen Mediated Anionic Chain Transfer Isoprene Polymerization Employing a Variable Hydrogen Co-feed.

Anhydrous Ethylbenzene, 225 ml of 370 ml total, was charged to the reactor at 20.5° C. under a dry hydrogen (21 PSIG $H_2$) atmosphere. To the stirred solvent (≈ 750 RPM) was charged through the charge vessel via positive nitrogen pressure, a solution previously formed from 93.58 g (see above) 3.5 wt. % Stock Solution A of $[DMEA]_2LiK$ (0.0158 moles as $[DMEA]_2LiK$) to which an 2.616 g of N,N-dimethylethanolamine (0.0294) was added (this addition resulted in some off gassing of hydrogen) and 50 ml of the anhydrous solvent from the total above. Thus, the reaction mixture comprised 0.0588 equivalents of DMEA and 0.0316 equivalents of alkali metal.

Next, 22.82 g (16.5 wt. %, 0.0558 mole) of 2.0 M n-butyllithium dissolved in 23 g of anhydrous ethylbenzene ml and 23 g of anhydrous cyclohexane was transferred to the charge vessel and further combined with 50 ml of the anhydrous solvent from the total above. This alkyllithium solution was then pressure transferred over a period of 8 minutes to the stirred (≈750 RPM) reaction mixture under hydrogen. After 1.5 minutes of the transfer the temperature had risen to 21.2° C. and the pressure to 23 PSIG: after 4 minutes of the transfer the temperature had raised to 22.7° C. and the pressure to 24 PSIG. At that point agitation was increased to 1021 RPM; and the transfer was complete in 8 minutes. At the end of the transfer the reactor temperature was 23.4° C. and the pressure had dropped to 21 PSIG. At the end of the organolithium charge the transfer line was flushed with 45 ml of anhydrous solvent from the total above; at completion of the flush the reactor temperature was 23.3° C. and the pressure was 20 PSIG. The reactor was then pressured to 46 PSIG hydrogen and heated to 71.3° C. (61 PSIG) and held at that temperature for 60 minutes at a pressure of (61 PSIG). The catalyst reaction mixture was then cooled (90 minutes after the start of the n-butyllithium addition) to 61.4° C. and then vented to 0 PSIG. The reactor was then recharged with hydrogen (900 standard $cm^3$ volume through the mass flow meter) to a pressure of 11 PSIG.

Isoprene (175.5 g, 2.58 mole) was fed to the reactor through the 0.007" I.D. feed tip at a constant rate of 5.00 ml/min. After the first 5 minutes of feeding the pressure had dropped from 11 PSIG to 9 PSIG. At the 5-minute mark the hydrogen co-feed was initiated at a rate of 45 SCCM however the pressure dropped precipitously at that rate to −1 PSIG. The jacket temperature was reduced from 62° C. to 50° C. in an attempt to slow the rate of reaction and the hydrogen feed rate was increased to 95 SCCM. After the first 15 minutes of monomer feed the reactor pressure reached −5 PSIG with a temperature of 53.3° C. The reactor jacket temperature was adjusted twice more, first to 40° C. and then to 30° C. After 30 minutes of feeding the reaction temperature was now 39.6° C. and the pressure was −8 PSIG utilizing a hydrogen feed rate of 68.5 SCCM. Between 40 minutes and 60 minutes the reactor temperature had lined out at 35° C. with a pressure of −7 PSIG. The feed and flush of the feed system was complete by 60 minutes, at that mark the reactor temperature began to drop, and the pressure began to build. At 70 minutes the reactor temperature was 32.4° C. and the pressure had built to 0 PSIG. A total of 5107 standard $cm^3$ of hydrogen had been fed at an average feed rate of 70.1 SCCM excluding the first 5 minutes of monomer feed.

Following the quench and standard work up including solvent stripping, 169.04 g of hydrogen mediated anionic polyisoprene was obtained. If the composition were comprised of solely isoprene monomer that would represent a 96.3% yield. However, proton NMR analysis revealed that the composition was comprised of 4.91 wt. % ethylbenzene monomer (GPC MW: $M_n$: 596, $M_w$: 1147, $M_z$: 1992, PD: 1.924, $\sigma_n$=573, $n\alpha_3$=2.991 (refractive index detector).

Example 23: Preparation of $[DMEA]_4Li_5KH_2$ "LOXKH Catalyst" and in Ethylbenzene with Subsequent Hydrogen Mediated Anionic Chain Transfer Isoprene Polymerization Employing a Constant Hydrogen Co-feed.

Anhydrous Ethylbenzene, 225 ml of 370 ml total, was charged to the reactor at 20.7° C. under a dry hydrogen (21 PSIG $H_2$) atmosphere. To the stirred solvent (≈750 RPM) was charged through the charge vessel via positive nitrogen pressure, a solution previously formed from 46.79 g (see above) 3.5 wt. % Stock Solution of $[DMEA]_2LiK$ (0.0079 moles as $[DMEA]_2LiK$) to which an 1.308 g of N,N-dimethylethanolamine (0.0147) was added (this addition resulted in some off gassing of hydrogen) and 50 ml of the anhydrous solvent from the total above. Thus, the reaction mixture comprised 0.0294 equivalents of DMEA and 0.0158 equivalents of alkali metal.

Next, 11.41 g (16.5 wt. %, 0.0294 mole) of 2.0 M n-butyllithium dissolved in 23 g of anhydrous ethylbenzene ml and 23 g of anhydrous cyclohexane was transferred to the charge vessel and further combined with 50 ml of the anhydrous solvent from the total above. This alkyllithium solution was then pressure transferred over a period of 8 minutes to the stirred (≈750 RPM) reaction mixture under hydrogen. After 2.0 minutes of the transfer the temperature had risen to 20.9° C. and the pressure to 25 PSIG; after 4.25 minutes of the transfer the temperature had raised to 22.3° C. and the pressure dropped to 24 PSIG. At that point agitation was increased to 1013 RPM: and the transfer was complete in 5 minutes. At the end of the transfer the reactor temperature was 22.4° C. and the pressure had dropped to 23 PSIG. At the end of the organolithium charge the transfer line was flushed with 45 ml of anhydrous solvent from the total above; at completion of the flush the reactor temperature was 23.7° C. and the pressure was 23 PSIG. The reactor was then pressured to 46 PSIG hydrogen and heated to 71.5° C. (59 PSIG) and held at that temperature for 60 minutes at a pressure of (59 PSIG). The catalyst reaction mixture was then cooled (90 minutes after the start of the n-butyllithium addition) to 29.3° C. and then vented to 0 PSIG. The reactor was then recharged with hydrogen (300 standard $cm^3$ volume through the mass flow meter) to a pressure of 3 PSIG.

Isoprene (184.0 g, 2.71 mole) was fed to the reactor through the 0.007" I.D. feed tip at a constant rate of 5.00 ml/min while the hydrogen co-feed was maintained at 78.6 SCCM (from the start). After the first 5 minutes of feeding the pressure had built to 8 PSIG. At the 5-minute mark the reached 10 PSIG with a reaction temperature of 29.9° C. The jacket temperature was increased from 25° C. to 30° C. and the reaction allowed to warm. After the first 15 minutes of monomer feed the reactor pressure peaked at 10 PSIG with a temperature of 34.1° C. After 20 minutes and an exothermic temperature rise to 36.9° C., the pressure dropped to 8 PSIG while still maintaining a hydrogen feed rate of 78.5 SCCM. Between 40 minutes and 60 minutes the reactor temperature had lined out at 33.5° C. with a pressure of 5-2 PSIG. The feed and flush of the feed system was complete by 70 minutes, at that mark the reactor temperature began to drop, and the pressure began to drop to 0 PSIG. At 70 minutes the reactor temperature was 33.0° C. and the pressure was increased to 20 PSIG which did not have an associated temperature rise indicating all the isoprene monomer had been reacted. A total of 5113 standard $cm^3$ of hydrogen had been fed (excluding the charge to 20 PSIG at the end).

Following the quench and standard work up including solvent stripping, 167.67 g of hydrogen mediated anionic polyisoprene was obtained. If the composition were comprised of solely isoprene monomer that would represent a 91.1% yield. However, proton NMR analysis revealed that the composition was comprised of 1.38 wt. % ethylbenzene monomer (GPC MW: $M_n$: 928 $M_w$: 1820, $M_z$: 3019, PD: 1.961, $\sigma_n$=910, $n\alpha_3$=2.649 (refractive index detector).

Example 24: Preparation of $[DMEA]_4Li_5KH_2$ "LOXKH Catalyst" and in Methylcyclohexane with Subsequent Hydrogen Mediated Anionic Chain Transfer Isoprene Polymerization Employing a Constant Hydrogen Co-feed.

Anhydrous methylcyclohexane, 225 ml of 370 ml total, was charged to the reactor at 20.7° C. under a dry hydrogen (22 PSIG $H_2$) atmosphere. To the stirred solvent (Z 750 RPM) was charged through the charge vessel via positive nitrogen pressure, a solution previously formed from 46.79 g (see above) 3.5 wt. % Stock Solution A of $[DMEA]_2LiK$ (0.0079 moles as $[DMEA]_2LiK$) to which an 1.308 g of N,N-dimethylethanolamine (0.0147) was added (this addition resulted in some off gassing of hydrogen) and 50 ml of the anhydrous solvent from the total above. Thus, the reaction mixture comprised 0.0294 equivalents of DMEA and 0.0158 equivalents of alkali metal.

Next, 11.41 g (16.5 wt. %, 0.0294 mole) of 2.0 M n-butyllithium dissolved in 13 g of anhydrous ethylbenzene ml and 33 g of anhydrous methylcyclohexane was transferred to the charge vessel and further combined with 50 ml of the anhydrous solvent from the total above. This alkyllithium solution was then pressure transferred over a period of 9 minutes to the stirred (1030 RPM) reaction mixture under hydrogen. After 2.0 minutes of the transfer the temperature had risen to 21.1° C. and the pressure to 23 PSIG; after 3.8 minutes of the transfer the temperature had raised to 21.8° C. and the pressure held at 23 PSIG. At the end of the transfer and flush of the line the reactor temperature was 21.8° C. and the pressure had dropped to 22 PSIG. The reactor was then pressured to 46 PSIG hydrogen and heated to 72.7° C. (59 PSIG) and held at that temperature for 60 minutes at a pressure of (59 PSIG). The catalyst reaction mixture was then cooled (90 minutes after the start of the n-butyllithium addition) to 33.0° C. and then vented to 0 PSIG.

Isoprene (185.0 g, 2.72 mole) was fed to the reactor through the 0.007" I.D. feed tip at a constant rate of 5.00 ml/min while the hydrogen co-feed was maintained at 78.6 SCCM (from the start). After the first 5 minutes of feeding the pressure had built to 4 PSIG. At the 10-minute mark the pressure reached 6 PSIG with a reaction temperature of 33.9° C. The jacket temperature was increased to and kept at 30° C. After 15 minutes of monomer feed the reactor pressure peaked at 7 PSIG as did the temperature at 37.2° C. After 25 minutes temperature lined out at 35.4° C., the pressure dropped to 5 PSIG while still maintaining a hydrogen feed rate of 78.6 SCCM. Between 40 minutes and 60 minutes the reactor temperature had lined out at 33.5° C. with a pressure of 4-2 PSIG. The feed and flush of the feed system was complete by 70 minutes, at that mark the reactor temperature began to drop, and the pressure dropped to 0 PSIG. The reaction mixture was allowed to stir for an additional 15 minutes without the addition of more hydrogen. At 85 minutes the reactor temperature was 31.2° C. and the pressure was −5 PSIG. The pressure was increased to 26 PSIG, which did not have an associated temperature rise indicating all the isoprene monomer had been reacted. A total of 5244 standard $cm^3$ of hydrogen had been fed.

Following the quench and standard work up including solvent stripping, 168.71 g of hydrogen mediated anionic polyisoprene was obtained. If the composition were comprised of solely isoprene monomer that would represent a 91.2% yield. However, proton NMR analysis revealed that the composition was comprised of 0.44 wt. % ethylbenzene monomer (GPC MW: $M_n$: 1324, $M_w$: 2995, $M_z$: 5103, PD: 2.262, $\sigma_n$=1487, $n\alpha_3$=2.773 (refractive index detector).

Preparation of a Stock Solutions of [1-Pip-2-Propanol]K (Solution B) and $[Pi\text{-}2\text{-}Propanol]_2LiK$ (Solution C) in Ethylbenzene.

All operations were conducted in a nitrogen glovebox. Thus, an oven-dried 250 ml graduated borosilicate bottle was equipped with a stirring bar and then weighed (298.738 g including cap and stirring bar). The bottle was place on a stirring hot plate in the nitrogen purged glovebox. To the bottle was charged 4.139 g of a 30% dispersion of potassium hydride in mineral oil. The dispersion was washed three time with 20 ml of anhydrous pentane; decanting each wash solution between washes. After the third wash the bottle was equipped with a rubber septum with a long 16-gauge nitrogen inlet needle and a short venting 18-gauge needle. Nitrogen was passed through the bottom of the bottle over the washed KH solid until a free-flowing powder and a constant weight of the bottle and its contents was obtained. At constant weight it was determined that the bottle contained 1.165 g of solid taken as 100% KH (0.0291 mole). The bottle was charged with 58.878 g of 98% ethylbenzene (recovered from previous HMPIP runs 2% oligomer content) and equipped with another rubber septum and a 16-gauge needle vented to an oil bubbler. To the stirred KH suspension was charged 8.33 g of 1-piperidino-2-propanol (Pip-2-propanol) over time such that the hydrogen produced vented from the bottle at a comfortable rate. It was determined that the solution weighing 66.717 g thus produced was 7.95 wt. % [Pip-2-propanol]K and a 6.243 wt. % [Pip-2-propanol]. The solution, 26% of which was used immediately in Example 25.

Upon standing over the weekend the solution above deposited solids such that the entire mass of the solution could not be easily slurried. The solution was charged with 25.20 g of the 98% ethylbenzene and then gently heated on a hotplate with an ever-increasing amount of stirring as the slurry became more fluid. To the solution was carefully charged 8.44 g (0.0217) mole of a 16.5 wt. % n-butyllithium (2 M in cyclohexane). The addition of BuLi was such that the red color that formed with each addition was quickly quenched and dissipated. Upon completion of the addition the resulting homogeneous solution was faint reddish orange in color. The color was quickly quenched with the addition of a drop of neat Pip-IPA to produce a clear slightly yellow solution. The resulting 83.06 g of solution was determined (simple mass balance) to contain 8.60 wt. % $[Pip\text{-}2\text{-}propanol]_2LiK$.

Example 25: Preparation of $[Pip\text{-}2\text{-}propanol]_3[MeOE]Li_5KH_2$ "LOXKH Catalyst" and in Methylcyclohexane with Subsequent Hydrogen Mediated Anionic Chain Transfer Isoprene Polymerization Employing a Constant Hydrogen Co-Feed Anhydrous methylcyclohexane, 225 ml of 370 ml total, was charged to the reactor at 20.7° C. under a dry hydrogen (22 PSIG Hz) atmosphere. To the stirred solvent (≈750 RPM) was charged through the charge vessel via positive nitrogen pressure, a solution previously formed from 16.67 g Stock Solution B of 7.95 wt. %[Pip-2-propanol]K (1.325 g, 0.0732 mole) and a 6.243 wt. % [Pip-2-propanol] (1.041 g, 0.00727 mole) to which an 1.041 g of Pip-2-propanol (0.00727 mole) and 0.5540 g (0.728 mole) of MeOE was added and 50 ml of the anhydrous solvent from the total above. Thus, the reaction mixture comprised 0.0219 equivalents of Pip-2-propanol, 0.0073 equivalents of MeOE and 0.0073 equivalents of potassium.

Next, 14.48 g (16.5 wt. %, 0.0373 mole) of 2.0 M n-butyllithium dissolved in 13 g of anhydrous ethylbenzene and 33 g of anhydrous methylcyclohexane was transferred to the charge vessel and further combined with 50 ml of the anhydrous solvent from the total above. This alkyllithium solution was then pressure transferred over a period of 10 minutes to the stirred (762 RPM) reaction mixture under hydrogen. After 2.5 minutes of the transfer the temperature had risen to 20.8° C. and the pressure to 23 PSIG and the RPM mixing was increased to 1023; after 4.5 minutes of the transfer the temperature had raised to 22.7° C. and the pressure to 24 PSIG. The transfer was complete at 6.25 minutes with a temperature of 23.5° C. and a pressure of 23 PSIG. At the end of the flush of the line (10.75 minutes, the reactor temperature was 23.9° C. and the pressure 23 PSIG. The reactor was then pressured to 46 PSIG hydrogen and heated to 71.4° C. (59 PSIG) and held at that temperature for 60 minutes at a pressure of (59 PSIG). The catalyst reaction mixture was then cooled (90 minutes after the start of the n-butyllithium addition) to 45.3° C. and then vented to 0 PSIG.

Isoprene (169.0 g, 2.49 mole) was fed to the reactor through the 0.007" I.D. feed tip at a constant rate of 5.00 ml/min while the hydrogen co-feed was maintained at 78.6 SCCM (from the start). After the first 5 minutes of feeding the pressure had built to 5 PSIG. At the 10-minute mark the reached 6 PSIG with a reaction temperature of 44.4° C. The jacket temperature was decreased kept at 27.5° C. After 15 minutes of monomer feed the reactor pressure was 7 PSIG at a temperature of 45.0° C. After 25 minutes temperature lined out at 35.4° C., the pressure dropped to 0 PSIG while still maintaining a hydrogen feed rate of 78.6 SCCM. Between 20 minutes and 65 minutes the reactor temperature had lined out at 35.4° C. with a pressure of 0 PSIG. The feed and flush of the feed system was complete by 70 minutes, at that mark the reactor temperature began to drop, and the pressure maintained at 0 PSIG. The reaction mixture was allowed to stir for an additional 6 minutes the reactor pressure increased to 27 PSIG. At 71 minutes the reactor temperature was 31.2° C. and the pressure was 24 PSIG. A total of 4806 standard $cm^3$ of hydrogen had been fed. For comparison the reactor pressure profile (PSIG vs. minutes of isoprene feed) for Examples 23-25 are presented in FIG. 8. The low steady state or near steady state pressures—from 6 PSIG to 0 PSIG—were observed. Example 24 was given an extra-long post reaction time wherein the pressure dropped to −5 PSIG.

Following the quench and standard work up including solvent stripping, 151.21 g of hydrogen mediated anionic polyisoprene was obtained. If the composition were comprised of solely isoprene monomer that would represent an 89.5% yield. However, proton NMR analysis revealed that the composition was comprised of 0.36 wt. % ethylbenzene monomer (GPC MW: $M_n$: 1463, $M_w$: 3850, $M_z$: 7117, PD: 2.632, $\sigma_n$=1869, $n\alpha_3$=3.314 (refractive index detector).

Examples 26-28 Table VII: The Examples of Table V entail hydrogen mediated anionic butadiene polymerization utilizing LOXKH catalysts. Examples 26 and 27 utilized the same highly active LOXKH catalyst utilized in Example 25 formed from Pip-2-propanol (0.0287 mole, 80 mole %) and MeOE (0.00719 mole, 20 mole %) and having a PM:SH ratio of 4:2 wherein the Li:K≈5:1. The intent was to feed through the 0.007" I.D. tipped dip leg on these runs hover during the first 15 minutes of feeding butadiene (2.3 g/min based on the scale reading) the feeding slowed. It was concluded that the pressure drop across the subsurface feed line and the pressure in the reactor was equivalent to the pressure in the butadiene cylinder. Thus, the feed had to be rerouted to the reactor headspace to complete the run. As a consequence, the resulting hydrogen mediated polybutadiene (HMPBD) composition thereby formed had a higher asymmetry and broader molecular weight distribution than would have otherwise resulted. Example 26 was repeated as Example 27 with the entire feed delivered to the reactor headspace. Comparison of the data reported in Table VI shows how reproducible the process is, which is quite remarkable given the variability of controlling the feed with a metering valve as compared to a very precise and consistent metering pump.

Example 28 utilized a LOXKH formed exclusively from DMEA having a σ-μ polar modifier: Saline hydride ratio (PM:SH) of 4:2 and a Li:K ratio of about 5:1. Surprisingly this run appeared to consume butadiene much faster than Examples 26 and 27. The pressure in reactor for Example 28 built only to 9 PSIG whereas for Examples 26 and 27 the pressure was greater than 20 PSIG. Anticipating a slower run based on similar isoprene runs the initial hydrogen feed rate was 47.6 SCCM which was increased first to 84 SCCM then to 100 SCCM. On average the hydrogen feed was 90 SCCM but the reactor pressure never reached higher than 9 PSIG. The resulting HMPBD distribution had an $M_n$=1268 but with improved breadth and asymmetry over the two other runs in this series.

Modified General Apparatus Used in Hydrogen Mediated Anionic Butadiene Polymerization Two modifications were made to accommodate feeding butadiene (normal boiling point −4.4° C.): I) modified to directly feed as a liquid from a scale with autogenous back pressure; and II) modified to indirectly feed as a liquid with super atmospheric hydrogen pressure.

Direct Feed of Butadiene from SurPac Cylinder to Reactor when Using a LOXKH Catalysis and Reactor Pressure <22 PSIG The direct feed entailed mounting a 1.0 Kg (contained) butadiene Sure/Pac™ (Aldrich) cylinder inverted on a ring stand resting on top of a top loading balance. The cylinder (21-22 PSIG) was connected to the monomer feed line via 1/16" O.D. stainless steel line. The connection was a "tee" on the delivery side of the monomer feed pump used for isoprene and/or styrene feeding. As with the other monomers, butadiene was fed through the same molecular sieve and $Al_2O_3$ columns (as previously described) before introduction to the reaction mixture. However, instead of feeding through the subsurface feed tip, butadiene was fed the headspace via a fine metering valve. To minimalize flashing of butadiene in the supply side of the metering valve, the valve was connected to the headspace with a 6" length of 1/16" O.D. stainless steel tubing with a 0.01" interior diameter. In this way a reasonably constant butadiene feed based on the changing weigh scale reading could be achieved during the hydrogen co-feed.

Indirect Feed of Butadiene from SurPac™ Cylinder to Reactor when Using a LOXLiH Catalysis and Reactor Pressure >22 PSIG The indirect feed entailed mounting a 1.0 Kg (contained) butadiene Sure/Pac™ (Aldrich) cylinder inverted on a ring stand resting on top of a top loading balance. The cylinder (21-22 PSIG) was connected to a 350 ml stainless steel double-ended vertically mounted sample cylinder. Accordingly, the connection from the Sure/Pac™ cylinder to the sample cylinder was made via 1/8" stainless steel line through the top of the sample cylinder. The delivery line passed through a "bored-through" fitting and terminated ½ way from the bottom of the cylinder. Hydrogen gas was T-ed into the feed line at the connection to the Sure/Pac™ cylinder. The sample cylinder was outfitted with a plastic tub to which a hole (diameter of a standard door-knob hole saw) had been cut from the bottom to accommodate the bottom hemisphere of the sample cylinder. Thus, the cylinder could be packed in dry ice prior to the butadiene transfer. The bottom end of the sample cylinder was outfitted with a ball-valve and then T-ed into the monomer feed line above the delivery end of the metering pump via 1/16" O.D. stainless steel line. As with the other monomers, butadiene was fed through the same molecular sieve and $Al_2O_3$ columns before introduction to the reaction mixture. However, instead of feeding through the subsurface feed tip, butadiene was fed the headspace via a fine metering valve. To minimalize flashing of butadiene in the supply side of the metering valve, the valve was connected to the headspace with a 6" length of 1/16" stainless tubing with a 0.01" interior diameter. This set up provided poor but acceptable control of the butadiene co-feed with hydrogen. The intent of the associated Examples was not to demonstrate a refined process but to determine the microstructure of the resulting hydrogen mediated anionic polybutadiene compositions and how that in turn related to the catalyst composition. Scale up Examples are presented in Examples 34-41 (250 g butadiene) and Examples 42-81 (340 to 760 g butadiene).

Example 27: Preparation of [Pip-2-propanol]3[MeOE]$Li_5KH_2$ "LOXKH Catalyst" and in Cyclohexane with Subsequent Hydrogen Mediated Anionic Chain Transfer Butadiene Polymerization Employing a Constant Hydrogen Co-feed Wherein Liquid Butadiene is fed from an Inverted Sur/Pac™ Cylinder of a Weigh Scale.

Anhydrous cyclohexane, 225 ml of 370 ml total, was charged to the reactor at 22.1° C. under a dry hydrogen (22 PSIG $H_2$) atmosphere. To the stirred solvent (≈750 RPM) was charged through the charge vessel via positive nitrogen pressure, a solution previously formed from 27.687 g Stock Solution C of 4.726 wt. % [Pip-2-propanol]K (1.309 g, 0.0719 mole) and a 3.869 wt. % [Pip-2-propanol]Li (1.071 g, 0.00723 mole) to which an 1.017 g of Pip-2-propanol (0.00710 mole) and 0.5470 g (0.00723 mole) od MeOE was added and 50 ml of the anhydrous solvent from the total above. Thus, the reaction mixture comprised 0.0216 equivalents of Pip-2-propanol, 0.00723 equivalents of MeOE, 0.00723 equivalents of potassium and 0.00723 equivalents of lithium.

Next, 11.153 g (17.5 wt. %, 0.0305 mole) of 2.12 M n-butyllithium dissolved in 13 g of anhydrous ethylbenzene ml and 33 g of anhydrous cyclohexane was transferred to the charge vessel and further combined with 50 ml of the anhydrous solvent from the total above. This alkyllithium solution was then pressure transferred over a period of about 10 minutes to the stirred (762 RPM) reaction mixture under hydrogen. After 2.5 minutes of the transfer the temperature had risen to 21.7° C. and the pressure to 23 PSIG and the RPM mixing was increased to 1056; after 6.75 minutes of the transfer the temperature had raised to 22.5° C. and the pressure to 23 PSIG. The transfer was complete at 9.0 minutes with a temperature of 22.6° C. and a pressure of 23 PSIG. At the end of the flush of the line (10.75 minutes) the reactor temperature was 22.6° C. and the pressure 24 PSIG. The reactor was then pressured to 46 PSIG hydrogen and heated to 64.0° C. (60 PSIG) and held at that temperature for 60 minutes at a pressure of (60 PSIG). The catalyst reaction mixture was then cooled (90 minutes after the start of the n-butyllithium addition) to 32.7° C. and then vented to 0 PSIG.

Butadiene (125.0 g, 2.31 mole) was fed (controlling at about 3 g/min.) to the reactor the headspace. After the first 5 minutes of feeding the pressure remained at 0 PSIG while the hydrogen co-feed was then initiated and maintained at 78.6 SCCM. At the 10-minute mark the pressure reached 1 PSIG with a reaction temperature of 35.5° C. The jacket temperature was decreased to and kept at 27.5° C. After 15 minutes of monomer feed the reactor pressure was 5 PSIG at a temperature of 34.4° C. After 25 minutes temperature lined out at 34.4° C., the pressure continued to build to 9 PSIG while still maintaining a hydrogen feed rate of 78.6 SCCM. At 35 minutes the temperature had dropped to 33.8° C. with a pressure of 18 PSIG. Over the next 25 minutes the temperature was allowed to increase to 39.9° C. and the reactor pressure remained between 16 and 19 PSIG. At the end of the feed the reactor pressure was 19 PSIG and the temperature was 39.1° C.—a total of 1600 std. $cm^3$ had been fed. The feed and flush of the feed system was complete by 70 minutes, at that mark the reactor temperature began to drop from 16 to 6 PSIG and the end of the reaction (90 minutes). The reaction mixture was allowed to stir for an additional 6 minutes the reactor pressure increased to 27

PSIG which did not produce a heat kick indicating that all of the butadiene had been reacted.

Following the quench and standard work up including solvent stripping, 115.20 g of hydrogen mediated anionic polybutadiene was obtained (GPC MW: $M_n$: 1172, $M_w$: 2370, $M_z$: 4494, PD: 2.167, $\sigma_n$=1185, $n\alpha_3$=3.568 (refractive index detector).

Examples 29-33 Table VIII. The experiments of Table VIII entail hydrogen mediated anionic butadiene polymerization utilizing a variety of LOXLiH catalysts formed with or without ether-alcohol co-ligands. In this series of 5 experiments butadiene was fed as a liquid from an intermediate double-ended sample cylinder controlling (poorly) with a fine metering valve. Although the fine metering valve employed has a Vernier handle (20 to 30 PSI pressure drop across the feed system) less than a tenth of a full turn above closed makes the difference of a 20-minute feed or 40-minute feed of about 125 g of butadiene. Nonetheless, the intent of this series of experiments was a survey of HMPBD microstructure as a function of LOXLiH ligand composition. As was the design of the experiments: 1) qualify with styrene; 2) validate and rough in with isoprene; and 3) apply to butadiene the solid information that was gathered with these 5 along with the previous 3 butadiene runs. The experimental details as well as the results are presented in Table VIII. In general, it appears that butadiene underwent hydrogen mediated anionic polymerization faster than isoprene requiring much shorter ride times after the end of the monomer feed.

Example 30: Representative of 1-Piperidino-2-propanol based LOXLiH Catalyst Preparation with Subsequent Hydrogen Mediated Anionic Chain Transfer Butadiene Polymerization Employing a Constant Hydrogen Co-feed Wherein Liquid Butadiene is fed from an Intermediate Sample Cylinder under Additional Pressure from Hydrogen.

The procedure for forming the $[DMEA]_2Li_3H$ catalyst presented above was followed to form the catalyst composition(s) having the stoichiometry of $[PCA]_2Li_3H$ (wherein the PCA is 1-piperidino-2-propanol, 1-Pip-2-propanol). Thus, the catalyst was formed from: 8.421 g (0.0588 mole) 1-Pip-2-propanol; and 44.07 ml (34.219 g, 0.0881 mole) 2 M n-butyllithium. At the end of the initial catalyst forming step the $H_2$ pressure did not decrease but had increased to 26 PSIG while the temperature increased from 20.3° C. to 24.7° C. (10 minutes since starting the butyllithium charge). After completion of the line flush, the pressure was increased to 47 PSIG with a temperature of 24.4° C. within 4 minutes the pressure dropped to 46 PSIG while the temperature only dropped to 24.2° C. giving the first indication of lithium hydride formation. The reaction mixture was heated 76.3° C. with a pressure of 55 PSIG indicating further catalyst formation during the heating process.

The catalyst was aged at 76.3° C. and 55 PSIG for 40 more minutes before heating to 79.0° C. (90° C. oil on jacket) and then venting to 0 PSIG. The reactor was then recharged with 900 standard $cm^3$ of Hydrogen (350 SCCM) to a pressure of 9 PSIG. The butadiene feed, 137 g (2.53 mole), was initiated feeding to the headspace of the reactor. The pressure increased to 23 PSIG while the temperature decreased from 79.0° C. to 78.3° C. during that first 10-minute period. After 15 minutes of feed time, the valve from the hydrogen mass flow meter (31.8 SCCM) to the reactor was opened causing the pressure to build to 34 PSIG over the next 25 minutes (40 minutes of feeding). During that time the temperature was increased from 81.0° C. to 90.5° C. After 40 minutes the butadiene feed was complete, and the hydrogen feed was then stopped. A total of 1740 std. $cm^3$ of hydrogen had been charged. The reaction temperature peaked at 91.2° C. at 45 minutes with the pressure having decreased to 22 PSIG. Over the next 60 minutes the reactor pressure reacted down to 1 PSIG as the reaction temperature dropped to 85° C.

The unquenched polymerization reaction mixture was transferred with positive $H_2$ pressure to the wash vessel previously heated ($N_2$ atmosphere) and previously charged with 500 ml of deoxygenated water.

After the standard work-up and solvent strip the solution was then further stripped of ethylbenzene with the use of a wiped film evaporator (WFE, 2" glass Pope Still, operated at 50.0 mmHg vacuum, 142° C., wiper speed 65% of full rate, feeding at 1.0 liters/hr). This WFE operation produced 124.3 g 90.7% yield of a hydrogen mediated anionic polybutadiene composition having $M_n$: 881, $M_w$: 1235, $M_z$: 1650, PD: 1.402, $\sigma_n$=558, $n\alpha_3$=1.65 (refractive index detector).

Table XVI tabulates the key analytical data for all HMPBD samples inclusive of the results for Examples 26-81 of Tables VII through XV.

For Examples 34-81, the 350 ml butadiene sample cylinder described above was replaced with a 1000 ml Teflon® lined sample cylinder. The cylinder was completely evacuated and then charged with between 240 g to 600 g of butadiene (400 ml to 950 ml). Transfer of butadiene to the reactor was as before except that the sample cylinder pressure was maintained about 20 PSI above the pressure of the polymerization reactor with hydrogen gas. The sample cylinder was kept on a weigh scale and butadiene was fed as a liquid to the headspace of the reactor by means of a fine metering valve having two stems. This provided for a very flexible yet very accurate delivery of butadiene monomer per unit time. For Examples 61, 62 and 64-81 a predetermined amount of hydrogen was charged by setting the totalizer on the hydrogen mass flow meter to the desired amount. The feed rate of butadiene and of hydrogen were maintained such that the feeds would be complete simultaneously. In doing so a specific ratio of moles butadiene to total moles of hydrogen could be obtained.

Example 40 is representative of Examples 34-41 of Table IX wherein 250 grams of butadiene was polymerized under hydrogen mediation of an anionic process. Thus the procedure for forming the $[DMEA]_2Li_3H$ catalyst presented above was followed to form the catalyst composition(s) having the stoichiometry of $[PCA]_2Li_3H$ (wherein the PCA is 2-piperidinoethanol 75 mole % and 1-methoxy-2-butanol 25 mole %). Thus, the catalyst was formed from: 0.0468 mole 2-piperidinoethanol; 0.01561 moles of 1-methoxy-2-butanol; and 0.0936 mole of n-butyllithium in a solvent mixture comprising 75% ethylbenzene and 25% cyclohexane. At the end of the initial catalyst forming step the $H_2$ pressure had increased from 21 to 24 PSIG before decreasing to 23 PSIG while the temperature increased from 20.9° C. to 25.9° C. (14 minutes since starting the butyllithium charge). After completion of the line flush, the pressure was increased to 40 PSIG with a temperature of 25.7° C. The jacket temperature was set to 77.5° C. At about 44 minutes the temperature was 68.9° C. and the pressure was 47 PSIG.

The catalyst was aged at 68.9° C. and 47 PSIG for 20 more minutes and then vented to 0 PSIG. The reactor was then recharged with 900 standard $cm^3$ of hydrogen to a pressure of 7 PSIG stirring at 1060 RPM. The butadiene feed, 251 g (4.64 mole), was initiated feeding to the headspace of the reactor. The pressure increased to 18 PSIG while the temperature increased from 68.8° C. to 72.9° C. during that first 20-minute period. After 15 minutes of feed time, the valve from the hydrogen mass flow meter (90

SCCM) to the reactor was opened causing the pressure to build to and run between 16 and 19 PSIG over the next 62 minutes (76 minutes of feeding). During that time the temperature was maintained at about 72.5° C. After 76 minutes the butadiene feed was complete, and the hydrogen feed was then stopped, and the reaction mixture was left to stir at 1060 RPM for 35 more minutes until the reaction was deemed completed. A total of 7131 std. $cm^3$ of hydrogen had been charged, initial charge and hydrogen co-fed. The reaction temperature peaked at 74.0° C. at about 21 minutes with the pressure having decreased to 16 PSIG. The reaction pressure remained between 16 and 19 PSIG and temperature was constant at 72° C.

After the standard work up procedure and solvent strip (WFE 140° C. 50 mmHg) a hazy liquid polymer (231 g 91.5%) was obtained. GPC analysis (Resipore Columns 50% 1,4-BD standards) was as follows: $M_n$=1000, $M_w$=1465, $M_z$=2071, standard deviation=682; asymmetry=2.015.

Example 46 is representative of Examples 42-52 of Table X and XI wherein 560 grams of butadiene was polymerized under hydrogen mediation of an anionic process. Thus the procedure for forming the $[DMEA]_2Li_3H$ catalyst presented above was followed to form the catalyst composition(s) having the stoichiometry of $[PCA]_2Li_3H$ (wherein the PCA is 2-dimethylaminoethanol 69 mole % and 1-methoxy-2-propanol 31 mole %). Thus, the catalyst was formed from: 0.0437 mole dimethylaminoethanol; 0.0192 moles of 1-methoxy-2-propanol; 0.0312 mole TMEDA and 0.0952 mole of n-butyllithium in a solvent mixture comprising 52% ethylbenzene, 47% cyclohexane, 0.25% styrene and 0.25% THF recycle from previous runs.

At the end of the initial catalyst forming step the $H_2$ pressure had increased from 23 to 27 PSIG before decreasing to 26 PSIG while the temperature increased from 20.6° C. to 26.4° C. (14 minutes since starting the butyllithium charge). After completion of the line flush, the pressure was increased to 40 PSIG with a temperature of 25.8° C. The jacket temperature was set to 75° C. At about 80 minutes the temperature was 69.8° C. and the pressure was 57 PSIG.

The catalyst was aged at 68.9° C. and 47 PSIG for 10 more minutes and then vented to 0 PSIG. The reactor was then recharged with 900 standard $cm^3$ of hydrogen to a pressure of 7 PSIG stirring at 1060 RPM. The butadiene feed, 560 g (10.35 mole), was initiated feeding to the headspace of the reactor. The pressure increased to 24 PSIG while the temperature increased from 69.5° C. to 71.6° C. during that first 20-minute period. After 15 minutes of feed time, the valve from the hydrogen mass flow meter (80 SCCM) to the reactor was opened causing the pressure to build from 18 to 24 PSIG. Butadiene was fed for a total of 156 minutes with reactor pressure lining out at 16-17 PSIG and temperature at 70.5° C. After 156 minutes the butadiene feed was complete, and the hydrogen feed was then stopped, and the reaction mixture was left to stir at 1060 RPM for 34 more minutes until the reaction was deemed completed. A total of 13,067 std. $cm^3$ of hydrogen had been charged, initial charge and hydrogen co-fed. The reaction temperature peaked at 72.0° C. at about 21 minutes with the pressure having peaked at 24 PSIG. The reaction pressure and temperature profile are attached as FIG. 9.

After the standard work up procedure and solvent strip (WFE 115° C. 20 mmHg) a clear colorless liquid polymer (535 g 91.5%) was obtained. GPC analysis (Resipore Columns 50% 1,4-BD standards) was as follows: $M_n$=1096, $M_w$=1692. $M_z$=2460, standard deviation=801; asymmetry=2.150. The deeper vacuum employed (WFE) in earlier Examples reduced the residual ethylbenzene to 0.20 wt. % by $^1$HNMR analysis.

Example 53 demonstrates a high efficiency process wherein subsequent charges, first 507 g and then 251 g of butadiene, are made in the course of the hydrogen mediated anionic butadiene polymerization. Thus the procedure for forming the $[DMEA]_2Li_3H$ catalyst presented above was followed to form the catalyst composition(s) having the stoichiometry of $[PCA]_2Li_3H$ (wherein the PCA is dimethylaminoethanol 69 mole % and 1-methoxyethanol 31 mole %). Accordingly, the catalyst was formed from: 0.0376 mole dimethylaminoethanol; 0.0166 moles of 1-methoxyethanol; 0.0271 mole TMEDA and 0.0836 mole of n-butyllithium in a solvent mixture comprising 10% ethylbenzene and 90% cyclohexane At the end of the initial catalyst forming step the $H_2$ pressure had increased from 25 to 28 PSIG before decreasing to 24 PSIG while the temperature increased from 21.1° C. to 25.4° C. (12 minutes since starting the butyllithium charge). After completion of the line flush, the pressure was increased to 41 PSIG with a temperature of 25.4° C. The jacket temperature was set to 70° C. At about 80 minutes the temperature was 69.3° C. and the pressure was 56 PSIG.

The catalyst was aged at 68.9° C. and 47 PSIG for 15 more minutes and then vented to 0 PSIG. The reactor was then recharged with 900 standard $cm^3$ of hydrogen to a pressure of 9 PSIG stirring at 1060 RPM. The first butadiene feed, 507 g (9.38 mole), was initiated feeding to the headspace of the reactor. The pressure increased to 20 PSIG while the temperature increased from 69.4° C. to 73.3° C. during that first 20-minute period. After 10 minutes of feed time, the valve from the hydrogen mass flow meter (100 SCCM) to the reactor was opened causing the pressure to build from 18 to 23 PSIG. Butadiene was fed for a total of 124 minutes with reactor pressure lining out at 21-23 PSIG and temperature at 69.7° C. After 124 minutes the butadiene feed was complete, and the hydrogen feed was then stopped, and the reaction mixture was left to stir at 1060 RPM for 40 more minutes until the reaction was deemed completed—the reactor pressure dropped to negative 3 PSIG. A total of 12,469 std. $cm^3$ of hydrogen had been charged, initial charge and hydrogen co-fed combined.

The sample cylinder was evacuated and charged with 251 g of butadiene. The reactor was again charged with 900 standard $cm^3$ of hydrogen to a pressure of 13 PSIG stirring at 1060 RPM. The second butadiene feed, 251 g (4.65 mole), was initiated feeding to the headspace of the reactor. The pressure increased to 23 PSIG while the temperature increased from 65.9° C. to 71.3° C. during that first 20-minute period. After 10 minutes of feed time, the valve from the hydrogen mass flow meter (100 SCCM) to the reactor was opened causing the pressure to build from 25 to 30 PSIG. The reactor temperature was allowed to warm to 72.6° C. which resulted in an autogenous reactor pressure of 26 PSIG. Butadiene was fed for a total of 63 minutes with reactor pressure lining out at 26 PSIG and temperature at 72.6° C. After 63 minutes the butadiene feed was complete, and the hydrogen feed was then stopped, and the reaction mixture was left to stir at 1060 RPM for 27 more minutes until the reaction was deemed completed—the reactor pressure dropped to negative 2 PSIG. A total of 6464 std. $cm^3$ of hydrogen had been charged, initial charge and hydrogen co-fed. The total butadiene feed was therefore 758 g while the total hydrogen charge was 18933 standard $cm^3$. The combined reaction pressure and temperature profile are attached as FIG. 10

After the standard work up procedure and solvent strip (WFE 115° C. 20 mmHg) a clear colorless liquid polymer (713 g 94.1%) was obtained. GPC analysis (Resipore Columns 50% 1,4-BD standards) was as follows: $M_n$=1112, $M_w$=1719. $M_z$=2531, standard deviation=822; asymmetry=2.184. The deeper vacuum employed (WFE) in earlier Examples reduced the residual ethylbenzene to 0.14 wt. % by $^1$HNMR analysis.

Example 58 is representative of Examples 54-59 of Table XII wherein 575 grams of butadiene was polymerized under highly efficient hydrogen mediation of an anionic process. Thus the procedure for forming the $[DMEA]_2Li_3H$ catalyst presented above was followed to form the catalyst composition(s) having the stoichiometry of $[PCA]_2Li_3H$ (wherein the PCA is 2-pyrrolidinoethanol 72 mole % and 1-methoxyethanol 28 mole %). Thus, the catalyst was formed from: 0.0307 mole dimethylaminoethanol; 0.0118 moles of 2-methoxyethanol; and 0.0633 mole of n-butyllithium in a solvent mixture (fresh) comprising 10% ethylbenzene and 90% cyclohexane. At the end of the initial catalyst forming step the $H_2$ pressure had increased from 22 to 24 PSIG before decreasing to 23 PSIG while the temperature increased from 19.7° C. to 23.5° C. (10 minutes since starting the butyllithium charge). After completion of the line flush, the pressure was increased to 40 PSIG with a temperature of 25.8° C. The jacket temperature was set to 77° C. At about 53 minutes the temperature was 71.7° C. and the pressure was 52 PSIG.

The catalyst was aged at 61.1° C. and 47 PSIG for 10 more minutes and then vented to 0 PSIG. The reactor was then recharged with 700 standard cm$^3$ of hydrogen to a pressure of 6 PSIG stirring at 1060 RPM. The butadiene feed, 575 g (10.63 mole), was initiated feeding to the headspace of the reactor. The pressure increased to 15 PSIG while the temperature increased from 69.5° C. to 71.6° C. during that first 20-minute period. The hydrogen co-feed (100 SCCM) was initiated at the same time as the start of the butadiene feed It was noted that unlike most all other Examples, this catalyst system which at first appeared to be the most active, appeared to deactivate throughout the course of the run. Accordingly, the autogenous reactor pressure continued to build over the course of the run from 15 PSIG at start to 25 PSIG at the end. (Though we wish not to bound by theory the pyrrolidine amine fragment may not be completely stable under the polymerization reaction conditions). Butadiene was fed for a total of 140 minutes with reactor pressure building throughout the course of the co-feed with a reaction temperature at 69.7° C. to 70.5° C. After 140 minutes the butadiene feed was complete, and the hydrogen feed was then stopped, and the reaction mixture was left to stir at 1060 RPM for 30 more minutes until the reaction was deemed completed—the reactor pressure dropped to 0PSIG. A total of 14.644 std. cm$^3$ of hydrogen had been charged, initial charge and hydrogen co-fed. The reaction temperature peaked at 70.6° C. at about 21 minutes.

After the standard work up procedure and solvent strip (WFE 115° C. 20 mmHg) a clear colorless liquid polymer (526 g 91.5%) was obtained. GPC analysis (Resipore Columns 50% 1,4-BD standards) was as follows: $M_n$=1024, $M_w$=1634. $M_z$=2458, standard deviation=788; asymmetry=2.29. The deeper vacuum employed (WFE) in earlier Examples reduced the residual ethylbenzene to 0.23 wt. % by $^1$HNMR analysis.

Example 63-65 are representative of Examples of Table XIII wherein reduced vinyl-1,2-BD compositions are selectively produced with aminoalcohol polar modifier ligands wherein the alcohol function is a secondary alcohol. Accordingly, 420 grams of butadiene was polymerized under hydrogen mediation of an anionic process. Thus the procedure for forming the $[DMEA]_2Li_3H$ catalyst presented above was followed to form the catalyst composition(s) having the stoichiometry of $[PCA]_2Li_3H$ (wherein the PCA is 2-piperidino-2-butanol). Hence, the catalyst was formed from: 2-piperidino-2-butanol 0.0631 mole and 0.0950 mole of n-butyllithium in a solvent mixture comprising 10% ethylbenzene and 90% cyclohexane (fresh solvents). At the end of the initial catalyst forming step the $H_2$ pressure had increased from 23 to 26 PSIG before decreasing to 26 PSIG while the temperature increased from 37.6° C. to 40.9° C. (6 minutes since starting the butyllithium charge). After completion of the line flush, the pressure was increased to 45 PSIG with a temperature of 39.8° C. The jacket temperature was set to 85° C. At about 48 minutes the temperature was 75.2° C. and the pressure was 51 PSIG.

The catalyst was aged at 75.2° C. and 47 PSIG for 3 more minutes and then vented to 0 PSIG. The reactor was then recharged with 700 standard cm$^3$ of hydrogen warmed to 85.4C (95-100° C. on jacket) over a 39 minutes resulting in a pressure of 10 PSIG while stirring at 1060 RPM. The butadiene feed, 420 g (7.78 mole), was initiated feeding to the headspace of the reactor. The pressure increased to 43 PSIG while the temperature increased from 85.5° C. to 94.2° C. during that first 20-minute period. After 2 minutes of feed time, the valve from the hydrogen mass flow meter (80 SCCM) to the reactor was opened causing the autogenous pressure to build from 10 to 43 PSIG. Butadiene was fed for a total of 122 minutes with reactor pressure lining out at 43 PSIG and temperature at 95.6° C. After 122 minutes the butadiene feed was complete, and the hydrogen feed was then stopped, and the reaction mixture was left to stir at 1060 RPM for 42 more minutes until the reaction was deemed completed—final reactor pressure of 5 PSIG. A total of 10,836 std. cm$^3$ of hydrogen had been charged, initial charge and hydrogen co-fed. The reaction temperature peaked at 96.3° C. at about 21 minutes with the pressure having peaked at 49 PSIG.

After the standard work up procedure and solvent strip (WFE 115° C. 20 mmHg) a clear colorless liquid polymer (396 g 94.3%) was obtained. GPC analysis (Resipore Columns 50% 1,4-BD standards) was as follows: $M_n$=1060, $M_w$=1646. $M_z$=2458, standard deviation=788; asymmetry=2.293. The deeper vacuum employed (WFE) in earlier Examples reduced the residual ethylbenzene to 0.20 wt. % by $^1$HNMR analysis.

Examples 64 and 65 are representative of Examples 61, 62 and 64-81 wherein the totalizer function of the hydrogen gas mass flow meter was utilized. For Example 64, 560 g of butadiene was co-fed with $H_2$ (65.8 SCCM) over 140 minutes to a reactor initially charged with 250 std. cm$^3$ $H_2$ such that the preset charge of 9450 std. cm$^3$ $H_2$ (25 mole butadiene per mole $H_2$) was achieved at the end of the co-feed. For Example 64, 576 g of butadiene was co-fed with $H_2$ (122 SCCM) over 201 minutes to a reactor initially charged with 472 std. cm$^3$ $H_2$ such that the preset charge of 25,000 std. cm$^3$ $H_2$ (9.67 mole butadiene per mole $H_2$) was achieved at the end of the co-feed.

The experimental details of Example 65 are representative of said Examples and is presented. Accordingly 576 g of butadiene was co-fed with hydrogen to a reaction medium comprising a catalyst formed from: 2-piperidino-2-butanol 0.0839 mole and 0.1259 mole of n-butyllithium and solvent mixture made of 70% ethylbenzene and 30% cyclohexane (fresh solvents). At the end of the initial catalyst forming step the $H_2$ pressure had increased from 24 to 29 PSIG without decreasing while the temperature increased from 37.7° C. to 42.5° C. (9 minutes since starting the butyllithium charge). After completion of the line flush, the pressure was increased to 45 PSIG with a temperature of 39.8° C. The jacket temperature was set to 98° C. At about 80 minutes the temperature was 91.5° C. and the pressure was 54 PSIG.

The catalyst was aged at 90° C. and 54 PSIG for at least 40 minutes. At 80 minutes since the initial charge of butyllithium the reactor was vented to 0 PSIG. The reactor was then recharged with 472 standard $cm^3$ of hydrogen warmed to 94.4C (105° C. on jacket) over a 10 minutes resulting in a pressure of 3 PSIG while stirring at 1060 RPM. The butadiene feed, 576 g (10.65 mole), was initiated feeding to the headspace of the reactor. The pressure increased to 26 PSIG while the temperature increased from 94.4° C. to 99.5° C. during that first 20-minute period. After 9 minutes of feed time, the valve from the hydrogen mass flow meter (122 SCCM) to the reactor was opened causing the autogenous pressure to build from 6 to 26 PSIG. Butadiene was fed for a total of 205 minutes with reactor pressure lining out at 29 PSIG and temperature at 98.8° C. After 205 minutes the butadiene feed was complete, and the hydrogen feed stopped automatically at exactly 25,000 std. $cm^3$ and the reaction mixture was left to stir at 1060 RPM for 40 more minutes until the reaction was deemed completed—final reactor pressure of 5 PSIG. A total of 25,000 std. $cm^3$ of hydrogen had been charged, initial charge and hydrogen co-fed. The reaction temperature peaked at 99.8° C. at about 21 minutes with the pressure having peaked at 27 PSIG with pressure building slowly to 30 PSIG over the course of the run. The reaction pressure and temperature profile for Examples 63-65 are attached as FIG. 11

After the standard work up procedure but employing formic acid in the acid wash and solvent strip (WFE 115° C. 12 mmHg) a clear colorless liquid polymer (520 g 90.3%) was obtained. GPC analysis (Resipore Columns 50% 1,4-BD standards) was as follows: $M_n$=799, $M_w$=1101. $M_z$=1506, standard deviation=491; asymmetry=1.994. with residual ethylbenzene of 0.39 wt. % by $^1$HNMR analysis.

Comparative Examples: Seven (Comparative Examples 1-7) of commonly available commercial liquid BR samples were analyzed by FT-IR, NMR, Brookfield Viscosity, DSC and GPC; the results of which are presented in Table XVII.

Accordingly the compositions thereof and producible by the LOXSH catalysts and hydrogen mediation process of this disclosure are novel and inherently provide very low viscosity and $T_g$ values at a given $M_n$, while maintaining intermediate to very high total vinyl content with high vinyl-1,2-/VCP ratios. Liquid BRs having those unique and valuable combination of characteristics heretofore have never been available.

TABLE II

| | Example | | | |
|---|---|---|---|---|
| | 1 | 2 | 3 | 4 |
| Catalyst AA | AA-1 | AA-1 | AA-1 | AA-1 |
| Dimethylethanolamine (g) | 4.008 | 4.030 | 4.001 | 4.010 |
| mole lithium/mole PA | 1.520 | 1.607 | 1.524 | 1.529 |
| Initial LiH Equivalent Molarity | 0.046 | 0.054 | 0.046 | 0.047 |
| Styrene (g) | 416.0 | 105.0 | 82.5 | 0.0 |
| wt. % | 85.9% | 27.1% | 18.6% | 0.0% |
| mole % | 80.0% | 20.0% | 13.0% | 0.0% |
| Isoprene (g) | 68.1 | 283.0 | 361.5 | 170.0 |
| wt. % | 14.1% | 72.9% | 81.4% | 100.0% |
| mole % | 20.0% | 80.0% | 87.0% | 100.0% |
| wt. % Isoprene in Crude RM | 0.08% | 1.51% | 0.60% | 0.69% |
| Product Resin | HMA(PS-coPIP) | HMA(PS-coPIP) | HMA(PS-coPIP) | HMPIP |
| polymer yield, g | 450.0 | 323.6 | 396.6 | 140.0 |
| yield % on monomer | 93.0% | 83.4% | 89.3% | 82.4% |
| $M_n$ | 853 | 776 | 1455 | 826 |
| $M_w$ | 1403 | 1177 | 2671 | 1193 |
| $M_z$ | 2071 | 1724 | 4195 | 1831 |
| $PD_n$ | 1.645 | 1.517 | 1.836 | 1.444 |
| $\sigma_n$ | 685 | 558 | 1330 | 551 |
| ${}_n\alpha_3$ | 2.045 | 2.206 | 2.337 | 2.933 |
| wt. % Polystyrene | 82.48% | 31.61% | 18.74% | 1.27% |
| wt. % Polyisoprene | 16.88% | 67.38% | 80.46% | 97.54% |
| Moles monomer/100 g | 1.041 | 1.295 | 1.363 | 1.447 |
| mole % styrene | 76.16% | 23.47% | 13.22% | 0.84% |
| mole % isoprene | 23.84% | 76.53% | 86.78% | 99.16% |
| Viscosity | NA | NA | | |
| 1,2-IP | 2.22% | 9.43% | 11.05% | 13.72% |
| 3,4-IP | 6.83% | 49.62% | 53.73% | 50.82% |
| 1,4-IP | 90.95% | 40.94% | 35.22% | 35.45% |

TABLE III

| | Example | | | | | |
|---|---|---|---|---|---|---|
| | 5 | 6 | 7 | 8 | 9 | 10 |
| PM AA | AA-5 | AA-1 | AA-1 | AA-1 | AA-5 | AA-5 |
| amt (g) | 5.741 | 5.241 | 4.191 | 3.921 | 3.921 | 7.597 |
| EA or AA | EA-5 | None | EA-5 | EA-1 | EA-1 | None |
| amt (g) | 1.560 | 0.000 | 1.201 | 1.119 | 1.119 | 0.000 |
| Mole % AA | 74.4% | 100% | 80.0% | 75.0% | 75.1% | 100% |
| Li/mole PM | 1.5000 | 1.5029 | 1.5000 | 1.5000 | 1.5000 | 1.5005 |
| LiH Molarity | 0.0581 | 0.0566 | 0.0566 | 0.0568 | 0.0569 | 0.0566 |
| Isoprene (g) | 180.0 | 180.0 | 181.0 | 185.0 | 193.0 | 185.0 |
| mole isoprene | 2.64 | 2.64 | 2.66 | 2.72 | 2.83 | 2.72 |
| $H_2$ int. (SCCM) | NA | NA | 1200.0 | 1200.0 | 1200.0 | 1200.0 |
| Rxn t. (Min) | 162.0 | 165.0 | 120.0 | 100.0 | 135.0 | 150.0 |
| Isoprene (g/min) | 6.62 | 6.62 | 6.62 | 6.62 | 6.62 | 6.62 |
| Feed (min) | 27.2 | 27.2 | 27.3 | 27.9 | 29.2 | 27.9 |
| SCCM | 30.0 | 30.0 | 30.0 | 30.0 | 30.0 | 30.0 |
| Time of $H_2$ Feed | 124.3 | 124.5 | 94.3 | 69.4 | 102.7 | 113.6 |
| Std. $cm^3$ | 3729 | 3736 | 2830 | 2081 | 3082 | 3409 |
| Total moles Hydrogen | NA | NA | 0.178 | 0.145 | 0.189 | 0.203 |
| Mole Isoprene/Mole $H_2$ | NA | NA | 15.0 | 18.8 | 15.0 | 13.4 |
| Reactor T start, ° C. | 51.0° | 50.0° | 52.8° | 53.5° | 52.2° | 52.6° |
| T Run, ° C. | 61.5° | 61.5° | 61.5° | 61.5° | 64.5° | 69.5° |

| | Example | | | | | |
|---|---|---|---|---|---|---|
| | 11 | 12 | 13 | 14 | 15 | 16 |
| PM AA | AA-1 | AA-1 | AA-1 | AA-1 | AA-1 | AA-1 |
| amt (g) | 3.921 | 3.658 | 3.397 | 3.437 | 3.921 | 2.453 |
| EA or AA | EA-1 | EA-1 | EA-1 | EA-1 | AA-5 | EA-1 |
| amt (g) | 1.142 | 1.341 | 1.561 | 1.561 | 1.899 | 0.900 |
| Mole % AA | 74.6% | 70.0% | 65.0% | 65.3% | 100% | 69.9% |
| Li/mole PM | 1.5281 | 1.5000 | 1.5000 | 1.5068 | 1.5000 | 1.4960 |
| LiH Molarity | 0.0599 | 0.0565 | 0.0564 | 0.0576 | 0.0568 | 0.0387 |
| Isoprene (g) | 185.0 | 185.0 | 186.0 | 184.0 | 181.0 | 185.0 |
| mole isoprene | 2.72 | 2.72 | 2.73 | 2.70 | 2.66 | 2.72 |
| $H_2$ int. (SCCM) | 1200.0 | 1200.0 | 1200.0 | 1400.0 | 600.0 | 700.0 |
| Rxn t. (Min) | 125.0 | 90.0 | 75.0 | 80.0 | 165.0 | 125.0 |
| Isoprene (g/min) | 6.62 | 6.62 | 6.62 | 6.62 | 3.00 | 3.16 |
| Feed (min) | 27.9 | 27.9 | 28.1 | 27.8 | 60.3 | 58.5 |
| SCCM | 40.0 | 45.0 | 50.0 | 60.0 | 30.0 | 45.0 |
| Time of $H_2$ Feed | 96.8 | 74.4 | 61.7 | 67.5 | 143.8 | 106.4 |
| Std. $cm^3$ | 3870 | 3350 | 3084 | 4047 | 4343 | 4789 |
| Total moles Hydrogen | 0.223 | 0.200 | 0.189 | 0.240 | 0.218 | 0.242 |
| Mole Isoprene/Mole $H_2$ | 12.2 | 13.6 | 14.5 | 11.3 | 12.2 | 11.2 |
| Reactor T start, ° C. | 54.9° | 56.1° | 57.8° | 59.4° | 59.2° | 59.1° |
| T Run, ° C. | 61.5° | 61.5° | 61.5° | 61.5° | 64.7° | 64.7° |

TABLE IV

| | Example | | | | | |
|---|---|---|---|---|---|---|
| | 5 | 6 | 7 | 8 | 9 | 10 |
| AA | AA-5 | AA-1 | AA-1 | AA-1 | AA-5 | AA-5 |
| EE or AA | EA-5 | None | EA-5 | EA-1 | EA-1 | None |
| Mole % AA | 74.4 | 100.0 | 80.0 | 75.0 | 75.1 | 100.0 |
| $T_g$ | −52.8 | −58.4 | −43.1 | −44.7 | −51.8 | −55.5 |
| Viscosity cP | 3600 | 1525 | 9783 | 11250 | 3458 | 2100 |
| HMPIP, g | 156.2 | 151.0 | 161.0 | 166.5 | 157.5 | 155.0 |
| yield % on monomer | 86.8 | 83.9 | 89.0% | 90.0 | 78.8 | 80.3 |
| $M_n$ | 1065 | 937 | 1387 | 1339 | 1075 | 970 |
| $M_w$ | 2088 | 1639 | 2812 | 2633 | 1965 | 1874 |
| $M_z$ | 3624 | 2577 | 4591 | 4213 | 3151 | 3193 |
| $PD_n$ | 1.749 | 2.027 | 1.966 | 1.828 | 1.932 | 1.913 |
| Standard Dev. | 811 | 1406 | 1316 | 978 | 936 | 1110 |
| Asymmetry | 2.411 | 2.524 | 2.408 | 2.488 | 2.849 | 2.585 |

TABLE IV-continued

| | | | | | | |
|---|---|---|---|---|---|---|
| wt. % Polyisoprene | 98.64 | 98.69 | 99.16 | 98.85 | 99.20 | 99.09 |
| moles/100 g | 1.454 | 1.453 | 1.459 | 1.454 | 1.459 | 1.457 |
| mole % styrene | 0.22 | 0.10 | 0.09 | 0.05 | 0.05 | 0.00 |
| mole % isoprene | 99.78 | 99.90 | 99.91 | 99.95 | 99.95 | 100.0 |
| % 1,2-IP | 14.84 | 14.05 | 20.55 | 19.22 | 13.14 | 11.65 |
| % 3,4-IP | 52.71 | 52.73 | 48.79 | 49.56 | 53.23 | 53.77 |
| % 1,4-IP | 32.44 | 33.67 | 30.66 | 31.23 | 33.63 | 34.58 |
| Wt. % Residual Ethylbenzene | 1.02 | 1.16 | 0.71 | 1.07 | 0.73 | 0.9 |

| | Example | | | | | |
|---|---|---|---|---|---|---|
| | 11 | 12 | 13 | 14 | 15 | 16 |
| AA | AA-1 | AA-1 | AA-1 | AA-1 | AA-1 | AA-1 |
| EE or AA | EA-1 | EA-1 | EA-1 | EA-1 | AA-5 | EA-1 |
| Mole % AA | 74.6 | 70.0 | 65.0 | 65.3 | 100.0 | 69.9 |
| $T_g$ | −49.9 | −41.5 | −37.0 | −43.5 | −49.1 | −46.9 |
| Viscosity cP | 6233 | 12220 | 22080 | 7858 | 6333 | 4817 |
| HMPIP, g | 168.3 | 168.0 | 174.5 | 170.0 | 161.2 | 163.8 |
| yield % on monomer | 90.0 | 90.8 | 93.8 | 92.4 | 89.1 | 88.5 |
| $M_n$ | 1162 | 1421 | 1761 | 1370 | 1221 | 1179 |
| $M_w$ | 2223 | 3079 | 3930 | 2859 | 2515 | 2275 |
| $M_z$ | 3641 | 5120 | 6460 | 4716 | 4230 | 3739 |
| $PD_n$ | 2.167 | 2.232 | 2.087 | 2.060 | 1.930 | 1.930 |
| Standard Dev. | 1535 | 1954 | 1428 | 1257 | 1137 | 1137 |
| Asymmetry | 2.624 | 2.554 | 2.580 | 2.710 | 2.600 | 2.600 |
| wt. % Polyisoprene | 98.96 | 99.44 | 99.19 | 99.25 | 99.00 | 99.26 |
| moles/100 g | 1.455 | 1.462 | 1.459 | 1.460 | 1.456 | 1.460 |
| mole % styrene | 0.00 | 0.00 | 0.00 | 0.00 | 0.00 | 0.00 |
| mole % isoprene | 100.0 | 100.0 | 100.0 | 100.0 | 100.0 | 100.0 |
| % 1,2-IP | 19.01 | 23.94 | 28.33 | 24.54 | 12.64 | 20.92 |
| % 3,4-IP | 49.27 | 46.40 | 43.79 | 45.67 | 53.42 | 47.65 |
| % 1,4-IP | 31.72 | 29.66 | 27.88 | 29.79 | 33.94 | 31.43 |
| Wt. % Residual Ethylbenzene | 1.04% | 0.56 | 0.81 | 0.75 | 1.00 | 0.74 |

TABLE V

| | Example | | | | |
|---|---|---|---|---|---|
| | 17 | 18 | 19 | 20 | 21 |
| Catalyst Aminoalcohol (PM) | AA-8 | AA-21 | AA-16 | AA-6 | AA-14 |
| moles | 0.0588 | 0.0588 | 0.0588 | 0.0588 | 0.0588 |
| Temp Catalyst Formed , ° C. | 29-31 | 30-33 | 30-33 | 21-26 | 21-25 |
| mole lithium/mole PM | 1.5000 | 1.6157 | 1.4990 | 1.4990 | 1.4989 |
| Mole of isoprene/mole catalyst | 177.4 | 139.9 | 183.7 | 91.6 | 85.1 |
| Initial LiH Equivalent Molarity | 0.0566 | 0.0693 | 0.0565 | 0.0565 | 0.0565 |
| Temperature, ° C. | 68-72 | 76 | 71-73 | 78-85 | 85-92 |
| Isoprene (g) | 355.0 | 345.0 | 367.0 | 183.0 | 170.0 |
| moles | 5.21 | 5.07 | 5.39 | 2.69 | 2.50 |
| vol, ml | 522 | 507 | 540 | 269 | 250 |
| feed rate ml/min | 4.780 | 4.780 | 4.780 | 3.300 | 2.540 |
| Time of Isoprene Feed (min.) | 109 | 106 | 113 | 82 | 98 |
| Total Rxn Time (min.) | 210 | 275 | 240 | 193 | 195 |
| Initial $H_2$ charge (std. $cm^3$) | 900 | 900 | 900 | 900 | 900 |
| Time of $H_2$ feed (min.) | 188 | 192 | 198 | 126 | 127 |
| $H_2$ Feed Rate (SCCM) | 37.5 | 39.8 | 43.9 | 29.1 | 25.0 |
| Std. $cm^3$ $H_2$ | 7950 | 8550 | 9594 | 4572 | 4072 |
| mole $H_2$ | 0.180 | 0.186 | 0.218 | 0.105 | 0.108 |
| mole monomer/$H_2$ | 28.892 | 27.193 | 24.680 | 25.704 | 23.029 |
| Viscosity, cP | 742 | 7325 | 550.0 | 316.7 | 633 |
| $T_g$ (° C.) | −74.17 | −51.12 | −76.06 | <−80 | −76.87 |
| $M_{n\ calc}$ | 12,067 | 9,517 | 12,492 | 6,230 | 5,788 |
| Efficiency | 714% | 496% | 823% | 451% | 343% |
| Theoretical yield | 355.0 | 345.0 | 367.0 | 183.0 | 170.0 |
| polymer yield, g | 290.00 | 326.00 | 326.00 | 140.58 | 149.00 |
| yield % on monomer | 81.7% | 94.5% | 88.8% | 76.8% | 87.6% |
| $M_n$ | 1353 | 1595 | 1170 | 1071 | 1330 |
| $M_w$ | 3244 | 3639 | 2702 | 2250 | 2971 |

TABLE V-continued

| | Example | | | | |
|---|---|---|---|---|---|
| | 17 | 18 | 19 | 20 | 21 |
| $M_z$ | 5415 | 6125 | 4686 | 3805 | 4953 |
| $PD_n$ | 2.398 | 2.282 | 2.309 | 2.101 | 2.234 |
| $\sigma_n$ | 1600 | 1806 | 1339 | 1124 | 1477 |
| $_n\alpha_3$ | 2.665 | 2.700 | 2.884 | 2.737 | 2.639 |
| 1,2-IP | 2.857 | 6.672 | 2.572 | 2.319 | 1.703 |
| 3,4-IP | 22.269 | 47.436 | 24.072 | 19.636 | 20.479 |
| 1,4-IP | 74.875 | 45.892 | 73.357 | 78.045 | 77.818 |

TABLE VI

| | Example | | | |
|---|---|---|---|---|
| | 22 | 23 | 24 | 25 |
| Stock Solution | A | A | A | B |
| Catalyst (PM) | AA-1 | AA-1 | AA-1 | AA-6 |
| Wt. % [PM]K | 1.982% | 1.982% | 1.982% | 7.950% |
| Wt. % [PM]Li | 1.508% | 1.508% | 1.508% | 0.000% |
| Wt. % solvent (as Ethylbenzene) | 96.51% | 96.51% | 96.51% | 85.81% |
| Charged Stock Solution (g) | 93.58 | 46.79 | 46.79 | 16.67 |
| [PM]K (g) | 1.85 | 0.93 | 0.93 | 1.33 |
| [PM]K (mole) | 0.01458 | 0.00729 | 0.00729 | 0.01042 |
| [PM]Li (g) | 1.41 | 0.71 | 0.71 | 0.00 |
| [PM]Li (mole) | 0.01484 | 0.00742 | 0.00742 | 0.00000 |
| Alkali Metal (mole) | 0.0294 | 0.0147 | 0.0147 | 0.0104 |
| Aminoalcohol PM (stock, g) | 2.622 | 1.311 | 1.311 | 2.533 |
| Aminoalcohol PM (added, g) | 2.617 | 1.308 | 1.308 | 1.041 |
| moles | 0.0294 | 0.0147 | 0.0147 | 0.0117 |
| Total Aminoalcohol PM (g) | 5.239 | 2.619 | 2.619 | 3.574 |
| moles | 0.0588 | 0.0294 | 0.0294 | 0.0250 |
| Catalyst (PA) | none | none | none | EA-1 |
| ether alcohol (g) | 0.000 | 0.000 | 0.000 | 0.554 |
| moles | 0.00000 | 0.00000 | 0.00000 | 0.00728 |
| mole % Aminoalcohol | 100.0% | 100.0% | 100.0% | 77.4% |
| Hydrogen Feed Rate (SCCM) | 70.1 | 78.6 | 78.6 | 78.6 |
| mole Hydrogen | 0.167 | 0.196 | 0.197 | 0.180 |
| mole monomer/Hydrogen | 15.452 | 13.781 | 13.781 | 13.781 |
| Temp Catalyst Initially Formed | 23 | 23 | 23 | 23 |
| Temperature, ° C. | 60-35 | 33 | 35 | 45-35 |
| RPM | 1000 | 1000 | 1000 | 1000 |
| Solvent | EB | EB | MeCH | MeCH |
| vol, ml | 340 | 340 | 340 | 340 |
| CH g (or MCH) | 0.0 | 0.0 | 285.6 | 285.6 |
| Solvent Ethylbenzene Wt % | 100.0% | 100.0% | 0.0% | 0.0% |
| Ethylbenzene g | 285.60 | 285.60 | 0.00 | 0.00 |
| total Solvent vol, ml | 499 | 499 | 499 | 499 |
| Total EB wt. % | 93.8% | 93.8% | 5.4% | 5.4% |
| Solvent | EB + CH | EB + CH | EB + MeCH | EB + MeCH |
| Wt of Solvent (catalyst) | 135 | 135 | 135 | 135 |
| Solvent Ethylbenzene Wt % | 83.0% | 83.0% | 17.0% | 17.0% |
| vol, ml | 159 | 159 | 159 | 159 |
| n-Butyllithium, M | 2.0 | 2.0 | 2.0 | 2.12 |
| vol, ml | 29.39 | 14.69 | 14.69 | 19.27 |
| moles | 0.0588 | 0.0294 | 0.0294 | 0.0385 |
| Mass of solution g | 22.820 | 11.410 | 11.410 | 14.110 |
| neat mass, g | 3.77 | 1.88 | 1.88 | 2.47 |
| mole Alkali Metal/mole PM | 1.5006 | 1.5008 | 1.5008 | 1.5190 |
| Isoprene | 175.5 | 184.0 | 185.0 | 169.0 |
| moles | 2.58 | 2.70 | 2.72 | 2.48 |
| vol, ml | 258 | 271 | 272 | 249 |
| feed rate ml/min | 4.78 | 4.78 | 4.78 | 4.78 |
| time of feed, min | 54.01 | 56.62 | 56.93 | 52.01 |
| feed rate g/min | 3.250 | 3.250 | 3.250 | 3.250 |
| XP- | 9951-111 | 9951-114 | 9951-116 | 9951-119 |
| Viscosity, cP | 366.7 | 1175 | 3900 | 8100 |
| $T_g$ (° C.) | −68.21 | −63.92 | −52.36 | −51.55 |
| Mole Monomer/Saline Hydride | 87.59 | 183.61 | 184.61 | 148.34 |
| $M_{n\ Theory}$ | 5958 | 12488 | 12555 | 10089 |
| Efficiency | 693% | 1027% | 765% | 556% |
| Theoretical yield | 175.5 | 184.0 | 185.0 | 169.0 |
| polymer yield, g | 169.04 | 167.67 | 168.71 | 151.21 |

TABLE VI-continued

| | Example | | | |
|---|---|---|---|---|
| | 22 | 23 | 24 | 25 |
| yield % on monomer | 96.3% | 91.1% | 91.2% | 89.5% |
| $M_n$ | 596 | 928 | 1324 | 1463 |
| $M_w$ | 1147 | 1820 | 2995 | 3850 |
| $M_z$ | 1992 | 3019 | 5103 | 7117 |
| $PD_n$ | 1.924 | 1.961 | 2.262 | 2.632 |
| Standard deviation | 573 | 910 | 1487 | 1869 |
| Asymmetry | 2.991 | 2.649 | 2.773 | 3.314 |
| 1,2-IP | 12.8% | 14.2% | 12.9% | 16.2% |
| 3,4-IP | 40.4% | 42.4% | 42.5% | 40.7% |
| 1,4-IP | 46.8% | 43.3% | 44.6% | 43.1% |
| Wt. % EB (incorporated) | 4.91% | 1.38% | 0.44% | 0.36% |
| % of Chains w/EB CTA | 27.6% | 12.1% | 5.5% | 5.0% |

TABLE VII

| | Example | | |
|---|---|---|---|
| | 26 | 27 | 28 |
| Stock Solution | C | C | A |
| Catalyst (PM) | AA-6 | AA-6 | AA-1 |
| Wt. % [PM]K | 4.726% | 4.726% | 1.982% |
| Wt. % [PM]Li | 3.869% | 3.869% | 1.508% |
| Wt. % solvent (as Ethylbenzene) | 91.41% | 91.41% | 96.51% |
| Charged Stock Solution (g) | 27.69 | 27.69 | 46.79 |
| [PM]K (g) | 1.31 | 1.31 | 0.93 |
| [PM]K (mole) | 0.01028 | 0.01028 | 0.00729 |
| [PM]Li (g) | 1.07 | 1.07 | 0.71 |
| [PM]Li (mole) | 0.01127 | 0.01127 | 0.00742 |
| Alkali Metal (mole) | 0.0216 | 0.0216 | 0.0147 |
| Aminoalcohol PM (stock, g) | 3.087 | 3.087 | 1.311 |
| Aminoalcohol PM (added, g) | 1.017 | 1.017 | 1.308 |
| Moles | 0.0114 | 0.0114 | 0.0147 |
| Total Aminoalcohol PM (g) | 4.104 | 4.104 | 2.619 |
| Moles | 0.0287 | 0.0287 | 0.0294 |
| Catalyst (PA) | MeOE | MeOE | MeOE |
| ether alcohol (g) | 0.547 | 0.547 | 0.000 |
| Moles | 0.00719 | 0.00719 | 0.00000 |
| mole % Aminoalcohol | 79.9% | 79.9% | 100.0% |
| Hydrogen Feed Rate (SCCM) | 78.6 | 78.6 | 90 |
| Std. $cm^3$ | 3144 | 3458.4 | 2358 |
| mole Hydrogen | 0.139 | 0.153 | 0.104 |
| mole monomer/Hydrogen | 15.0 | 15.1 | 22.2 |
| Temp Catalyst Initially Formed | 23 | 23 | 23 |
| Temperature, ° C. | 35 | 35-40 | 42 |
| RPM | 1000 | 1000 | 1000 |
| Solvent | CH | CH | CH |
| vol, ml | 340 | 340 | 340 |
| CH g (or MCH) | 285.6 | 285.6 | 285.6 |
| Solvent Ethylbenzene Wt % | 0.0% | 0.0% | 0.0% |
| Ethylbenzene g | 0.00 | 0.00 | 0.00 |

TABLE VII-continued

| | Example | | |
|---|---|---|---|
| | 26 | 27 | 28 |
| total Solvent vol, ml | 499 | 499 | 499 |
| Total EB wt. % | 5.4% | 5.4% | 5.4% |
| Solvent | EB + CH | EB + CH | EB + CH |
| Wt of Solvent (catalyst) | 135 | 135 | 135 |
| Solvent Ethylbenzene Wt % | 17.0% | 17.0% | 17.0% |
| vol, ml | 159 | 159 | 159 |
| n-Butyllithium, M | 2.12 | 2.12 | 2.12 |
| vol, ml | 15.23 | 15.23 | 15.23 |
| moles | 0.0305 | 0.0305 | 0.0305 |
| Mass of solution g | 11.153 | 11.153 | 11.410 |
| neat mass, g | 1.95 | 1.95 | 1.95 |
| mole Alkali Metal/mole PM | 1.4514 | 1.4514 | 1.5375 |
| Butadiene | 112.0 | 125.0 | 125.0 |
| moles | 2.071 | 2.311 | 2.311 |
| vol, ml | 0 | 0 | 0 |
| time of feed, min | 45.0 | 60.0 | 40.0 |
| feed rate g/min | 2.489 | 2.083 | 3.125 |
| XP- | 9951-123 | 9951-119 | 9951-128 |
| Viscosity, cP | 725.0 | 608.3 | 733.3 |
| $T_g$ (° C.) | <−80 | <−80 | <−80 |
| Mole Monomer/Saline Hydride | 127.98 | 142.84 | 146.32 |
| $M_{n\ Theory}$ | 8705 | 9715 | 9951 |
| Efficiency | 761% | 829% | 785% |
| Theoretical yield | 112.0 | 125.0 | 125.0 |
| polymer yield, g | 93.30 | 115.20 | 118.26 |
| yield % on monomer | 83.3% | 92.2% | 94.6% |
| $M_n$ | 1144 | 1172 | 1268 |
| $M_w$ | 2396 | 2370 | 2509 |
| $M_z$ | 4852 | 4494 | 4515 |
| $PD_n$ | 2.094 | 2.022 | 1.979 |
| Standard deviation | 1197 | 1185 | 1254 |
| Asymmetry | 4.018 | 3.568 | 3.212 |

TABLE VIII

| | Example | | | | |
|---|---|---|---|---|---|
| | 29 | 30 | 31 | 32 | 33 |
| Catalyst (PM) | AA-1 | AA-6 | AA-8 | AA-5 | AA-6 |
| moles | 0.0470 | 0.0588 | 0.0587 | 0.0588 | 0.0441 |
| Catalyst (PM) | EA-5 | None | None | None | EA-1 |
| Moles | 0.0118 | 0.0000 | 0.0000 | 0.0000 | 0.0150 |
| mole % Aminoalcohol | 80.0% | 100.0% | 100.0% | 100.0% | 74.6% |
| Temp Catalyst Formed | 20-25 | 20-25 | 36-39 | 20-25 | 21-26 |
| mole Li/mole PA | 1.5006 | 1.5001 | 1.5031 | 1.5000 | 1.4922 |
| BD/Catalyst | 83.6 | 86.1 | 73.6 | 78.3 | 70.0 |
| total Solvent vol, ml | 475 | 475 | 475 | 475 | 475 |
| Initial LiH Equivalent Molarity | 0.0566 | 0.0566 | 0.0568 | 0.0566 | 0.0560 |
| Temperature, ° C. | 73-76 | 81-91 | 80-86 | 75-80 | 73-75 |

TABLE VIII-continued

| | Example | | | | |
|---|---|---|---|---|---|
| | 29 | 30 | 31 | 32 | 33 |
| BD Feed (min.) | 27 | 40 | 27 | 20 | 27 |
| Total Rxn Time | 35 | 100 | 75 | 60 | 50 |
| $H_2$ Charge (std. $cm^3$) | 0 | 900 | 900 | 900 | 900 |
| Time of $H_2$ co-feed | 23.0 | 26.5 | 19.0 | 12.0 | 15.0 |
| $H_2$ Feed Rate (SCCM) | 66.7 | 31.8 | 45 | 66.7 | 66.7 |
| Std. $cm^3$ $H_2$ | 1534 | 1743 | 1755 | 1700 | 1901 |
| mole $H_2$ | 0.068 | 0.037 | 0.038 | 0.035 | 0.044 |
| mole BD/$H_2$ | 36.4 | 33.0 | 28.1 | 30.7 | 24.3 |
| $M_{n\ calc}$ | 4,515 | 4,654 | 3,974 | 4,230 | 3,784 |
| Efficiency | 387% | 451% | 376% | 304% | 302% |
| Theoretical yield | 133.0 | 137.0 | 117.5 | 124.5 | 110.2 |
| polymer yield, g | 125.66 | 125.66 | 96.49 | 110.37 | 98.37 |
| yield % on monomer | 94.5% | 91.7% | 82.1% | 88.7% | 89.3% |
| $M_n$ | 1204 | 881 | 1202 | 1393 | 1251 |
| $M_w$ | 1895 | 1235 | 1999 | 2477 | 2047 |
| $M_z$ | 2664 | 1650 | 3068 | 3785 | 3186 |
| $PD_n$ | 1.574 | 1.402 | 1.663 | 1.778 | 1.636 |
| Standard deviation | 912 | 558 | 979 | 1229 | 998 |
| Asymmetry | 1.75 | 1.65 | 2.33 | 2.18 | 2.48 |

TABLE IX

| | Example | | | | | | | |
|---|---|---|---|---|---|---|---|---|
| | 34 | 35 | 36 | 37 | 38 | 39 | 40 | 41 |
| Catalyst (PM) | AA-5 | AA-5 | AA-5 | AA-5 | AA-5 | AA-5 | AA-5 | AA-1 |
| moles | 0.0624 | 0.0624 | 0.0624 | 0.0500 | 0.0437 | 0.0468 | 0.0468 | 0.0437 |
| Catalyst (PM) | None | None | None | EA-2 | EA-2 | EA-2 | EA-3 | EA-1 |
| moles | 0.0 | 0.0 | 0.0 | 0.0125 | 0.0187 | 0.01595 | 0.01561 | 0.01921 |
| mole % AA | 100.0% | 100.0% | 100.0% | 80.0% | 70.0% | 74.6% | 75.0% | 69.5% |
| Promotor | TMEDA | TMEDA | TMEDA | TMEDA | TMEDA | none | none | TMEDA |
| moles | 0.0312 | 0.0312 | 0.0312 | 0.0312 | 0.0312 | 0.0 | 0.0 | 0.0312 |
| Moles Li/Promotor | 3.000 | 3.000 | 3.082 | 2.999 | 2.999 | NA | NA | 3.023 |
| Temp Catalyst Formed | 20-25 | 20-25 | 20-25 | 20-25 | 20-25 | 20-25 | 20-25 | 20-25 |
| mole lithium/mole PM | 1.5000 | 1.5000 | 1.5412 | 1.4997 | 1.4997 | 1.5220 | 1.4997 | 1.5000 |
| BD/Catalyst | 145.3 | 149.2 | 120.9 | 149.3 | 137.7 | 142.4 | 149.6 | 147.5 |
| total Solvent vol, ml | 475 | 475 | 475 | 475 | 475 | 475 | 475 | 475 |
| Initial LiH Molarity | 0.0612 | 0.0612 | 0.0661 | 0.0611 | 0.0611 | 0.0641 | 0.0612 | 0.0616 |
| Temperature, ° C. | 74.7 | 70.5 | 70.5 | 69.5 | 71.4 | 72.5 | 72.5 | 67.4 |
| Reactor Pressure (PSIG) | 19 | 19 | 19 | 18 | 16 | 17 | 17 | 11 |
| BD Feed rate | 3.46 | 3.05 | 3.35 | 3.45 | 3.23 | 3.06 | 3.15 | 3.49 |
| BD Feed time (min.) | 71 | 83 | 65 | 73 | 72 | 80 | 76 | 72 |
| Total Rxn Time | 100 | 100 | 100 | 110 | 110 | 115 | 110 | 110 |
| $H_2$ Charge Start (std. $cm^3$) | 900 | 900 | 900 | 900 | 900 | 900 | 900 | 900 |
| Time of $H_2$ co-feed | 65.0 | 72.0 | 57.0 | 63.1 | 65.3 | 74.5 | 71.0 | 66.6 |
| $H_2$ Feed (SCCM) | 81.5 | 75.3 | 80 | 80.0 | 80.0 | 80.0 | 87.8 | 80.0 |
| Std. $cm^3$ $H_2$ | 6198 | 6322 | 5459 | 5950 | 6120 | 6861 | 7131 | 6227 |
| mole monomer/mole $H_2$ | 16.6 | 16.7 | 17.0 | 17.8 | 15.9 | 15.4 | 14.9 | 16.9 |
| $M_n$ calculated | 7,850 | 8,058 | 6,529 | 8,063 | 7,440 | 7,694 | 8,079 | 7,996 |
| Efficiency | 833% | 767% | 586% | 706% | 707% | 779% | 808% | 743% |
| $M_n$ Experimental | 942 | 1050 | 1114 | 1142 | 1052 | 988 | 1000 | 1072 |

TABLE X

| | Example | | | | | |
|---|---|---|---|---|---|---|
| | 42 | 43 | 44 | 45 | 46 | 47 |
| Catalyst (PM) | AA-5 | AA-5 | AA-5 | AA-5 | AA-1 | AA-1 |
| moles | 0.046841 | 0.046942 | 0.062745 | 0.046942 | 0.043718 | 0.044034 |
| Catalyst (PM) | EA-1 | EA-5 | None | Ea-4 | EA-2 | EA-2 |
| moles | 0.02007 | 0.01580 | 0.00000 | 0.01672 | 0.01921 | 0.02015 |
| mole % Aminoalcohol | 70.0% | 74.8% | 100.0% | 73.7% | 69.5% | 68.6% |
| Promotor | TMEDA | TMEDA | TMEDA | TMEDA | TMEDA | Trace THF |

TABLE X-continued

| | Example | | | | | |
|---|---|---|---|---|---|---|
| | 42 | 43 | 44 | 45 | 46 | 47 |
| moles | 0.0335 | 0.0314 | 0.0000 | 0.0318 | 0.0312 | 0.0138 |
| Moles Li/Promotor | 3.000 | 3.009 | NA | 3.050 | 3.047 | 7.096 |
| Temp Catalyst Formed | 20-25 | 20-25 | 20-25 | 20-25 | 20-25 | 20-25 |
| mole lithium/mole PM | 1.5000 | 1.5045 | 1.5189 | 1.5248 | 1.5123 | 1.5249 |
| BD/Catalyst | 193.4 | 265.7 | 277.1 | 189.3 | 321.1 | 277.1 |
| total Solvent vol, ml | 475 | 475 | 475 | 475 | 400 | 400 |
| Initial LiH Molarity | 0.0651 | 0.0620 | 0.0637 | 0.0652 | 0.0631 | 0.0657 |
| Temperature, ° C. | 71.5 | 71.5 | 72.5 | 70.5 | 70.5 | 70.5 |
| BD Feed (min.) | 105 | 137 | 150 | 105 | 156 | 132 |
| BD feed (g/min) | 3.33 | 3.32 | 3.25 | 3.26 | 3.59 | 3.84 |
| Total Rxn Time | 130 | 160 | 180 | 135 | 190 | 150 |
| $H_2$ Charge (std. $cm^3$) | 900 | 900 | 900 | 900 | 900 | 900 |
| Time of $H_2$ co-feed | 99.2 | 131.3 | 142.0 | 98.2 | 152.1 | 124.5 |
| Reactor Pressure (PSIG) | 24-19 | 22.0 | 21-25 | 21-25 | 16-18 | 16-18 |
| $H_2$ Feed Rate (SCCM) | 80 | 80 | 85.58 | 80 | 80 | 90 |
| Std. $cm^3$ $H_2$ | 8833 | 11404 | 13052 | 8754 | 13067 | 12073 |
| mole monomer/$H_2$ | 16.6 | 16.7 | 15.7 | 16.4 | 18.0 | 17.6 |
| $M_n$ calculated | 10,447 | 14,352 | 14,966 | 10,222 | 17,342 | 14,968 |
| Efficiency | 930% | 1328% | 1377% | 925% | 1582% | 1412% |

TABLE XI

| | Example | | | | |
|---|---|---|---|---|---|
| | 48 | 49 | 50 | 51 | 52 |
| Catalyst (PM) | AA-1 | AA-1 | AA-1 | AA-1 | AA-1 |
| moles | 0.062825 | 0.062825 | 0.046942 | 0.047119 | 0.062825 |
| Catalyst (PM) | none | none | EA-5 | EA-3 | none |
| moles | 0.00000 | 0.00000 | 0.01580 | 0.01636 | 0.00000 |
| mole % Aminoalcohol | 100.0% | 100.0% | 74.8% | 74.2% | 100.0% |
| Promotor | (trace THF) | THF | (trace THF) | (trace THF) | (trace THF) |
| moles | 0.0138 | 0.2000 | 0.0138 | 0.0138 | 0.0138 |
| Moles Li/Promotor | 6.928 | 0.477 | 6.887 | 7.059 | 7.021 |
| Temp Catalyst Formed | 20-25 | 20-25 | 20-25 | 20-25 | 20-25 |
| mole lithium/mole PA | 1.5210 | 1.5173 | 1.5140 | 1.5337 | 1.5415 |
| Moles Monomer/Catalyst | 285.2 | 295.2 | 297.5 | 288.7 | 288.3 |
| total Solvent vol, ml | 400 | 400 | 400 | 400 | 400 |
| Initial LiH Molarity | 0.0640 | 0.0636 | 0.0631 | 0.0661 | 0.0665 |
| Temperature, ° C. | 74.4-69.6 | 71.5 | 66.6 | 71.5 | 74.5-70.6 |
| BD Feed (min.) | 128 | 134 | 127 | 129 | 130 |
| BD feed rate (g/min) | 3.95 | 3.89 | 4.09 | 4.10 | 4.08 |
| Total Rxn Time | 150 | 155 | 155 | 155 | 155 |
| $H_2$ Charge (std. $cm^3$) | 900 | 900 | 900 | 900 | 900 |
| Hydrogen co-feed (min.) | 120.0 | 127.5 | 122.0 | 123.3 | 123.9 |
| Reactor Pressure (PSIG) | 19-20 | 23.0 | 19.0 | 21.0 | 23.0 |
| $H_2$ Feed Rate (SCCM) | 98 | 98 | 99 | 100 | 100 |
| Std. $cm^3$ $H_2$ | 12655 | 13390 | 13004 | 13231 | 13287 |
| mole $H_2$ | 0.557 | 0.590 | 0.573 | 0.583 | 0.585 |
| mole monomer/$H_2$ | 16.7 | 16.3 | 16.7 | 16.8 | 16.8 |
| Mn calculated | 15,404 | 15,944 | 16,069 | 15,589 | 15,569 |
| Efficiency | 1498% | 1579% | 1593% | 1562% | 1557% |

TABLE XII

| | Example | | | | | | |
|---|---|---|---|---|---|---|---|
| | 53 | 54 | 55 | 56 | 57 | 58 | 59 |
| Catalyst (PM) | AA-1 | AA-1 | AA-1 | AA-1 | AA-1 | AA-9 | AA-5 |
| moles | 0.037583 | 0.032860 | 0.041465 | 0.041465 | 0.027082 | 0.030711 | 0.031076 |
| Catalyst (PM) | EA-1 | EA-5 | None | None | EA-1 | EA-1 | EA-1 |
| moles | 0.01666 | 0.01106 | 0.0 | 0.0 | 0.01493 | 0.01183 | 0.01238 |
| mole % Aminoalcohol | 69.3% | 74.8% | 100.0% | 100.0% | 64.5% | 72.2% | 71.5% |
| Promotor | TMEDA | None | None | TMEDA | None | None | None |
| moles | 0.0271 | 0.0 | 0.0 | 0.0415 | 0.0 | 0.0 | 0.0 |
| Moles Li/Promotor | 3.084 | NA | NA | 1.539 | NA | NA | NA |

TABLE XII-continued

| | Example | | | | | | |
|---|---|---|---|---|---|---|---|
| | 53 | 54 | 55 | 56 | 57 | 58 | 59 |
| Temp Catalyst Formed | 20-25 | 20-25 | 20-25 | 20-25 | 20-25 | 20-25 | 20-25 |
| mole lithium/mole PM | 1.5416 | 1.5416 | 1.5416 | 1.5385 | 1.5416 | 1.4886 | 1.4950 |
| Moles Monomer/Catalyst | 477.0 | 458.5 | 461.0 | 462.8 | 483.8 | 511.5 | 496.8 |
| total Solvent vol, ml | 464 | 464 | 464 | 464 | 464 | 464 | 464 |
| Initial LiH Molarity | 0.0598 | 0.0489 | 0.0463 | 0.0461 | 0.0469 | 0.0429 | 0.0443 |
| Temperature, ° C. | 69.6-72.6 | 72.6 | 76.6-75.5 | 78.6-76.6 | 74.5-72.5 | 69-71 | 69-71 |
| Monomer Feed (min.) | 185 | 142 | 137 | 138 | 146 | 140 | 142 |
| Monomer feed (g/min) | 4.10 | 4.15 | 4.08 | 4.06 | 4.08 | 4.12 | 4.08 |
| Total Rxn Time | 250 | 170 | 170 | 170 | 170 | 180 | 185 |
| Hydrogen Charge (std. $cm^3$) | 900 | 900 | 500 | 500 | 500 | 700 | 700 |
| Time of Hydrogen co-feed | 171.3 | 136.6 | 137.1 | 138.0 | 146.0 | 140.0 | 140.0 |
| Reactor Pressure (PSIG) | 23-26 | 21-24 | 33-27 | 31-32 | 25-23 | 25-23 | 25-23 |
| Hydrogen Feed (SCCM) | 100 | 100 | 100 | 100 | 100 | 100 | 100 |
| Std. $cm^3$ Hydrogen | 18933 | 14560 | 14210 | 14280 | 15082 | 14644 | 14756 |
| mole Hydrogen | 0.834 | 0.641 | 0.626 | 0.629 | 0.664 | 0.645 | 0.650 |
| mole monomer/Hydrogen | 16.8 | 17.0 | 16.5 | 16.4 | 16.6 | 16.5 | 16.4 |
| $M_n$ calculated | 25,758 | 24,763 | 24,895 | 24,993 | 26,129 | 27,620 | 26,828 |
| Efficiency | 2316% | 2289% | 2398% | 2446% | 2564% | 2697% | 2531% |

TABLE XIII

| | Example | | | | | | |
|---|---|---|---|---|---|---|---|
| | 60 | 61 | 62 | 63 | 64 | 65 | 66 |
| Catalyst (PM) | AA-3 | AA-3 | AA-3 | AA-7 | AA-7 | AA-7 | AA-6 |
| PM (g) | 7.395 | 7.395 | 9.835 | 9.923 | 9.923 | 13.197 | 12.020 |
| moles | 0.063100 | 0.063100 | 0.083923 | 0.063100 | 0.063100 | 0.083923 | 0.083923 |
| Mole Li | 9.5000E−02 | 9.4650E−02 | 1.2588E−01 | 9.5000E−02 | 9.4650E−02 | 1.2588E−01 | 1.2588E−01 |
| mole Li/mole PM | 1.5055 | 1.5000 | 1.5000 | 1.5055 | 1.5000 | 1.5000 | 1.5000 |
| Moles BD./Cat. | 227.5 | 319.4 | 234.4 | 243.4 | 328.1 | 253.8 | 248.5 |
| total Solvent vol, ml | 464 | 464 | 464 | 464 | 464 | 464 | 464 |
| EB wt. % | 10.2% | 70.6% | 70.6% | 10.2% | 10.2% | 70.6% | 70.6% |
| Temperature, ° C. | 92-94 | 92.8 | 96.9 | 96.0 | 96.0 | 96.9 | 96.9 |
| RPM | 1060 | 1060 | 1060 | 1060 | 1060 | 1060 | 1060 |
| BD Feed (min.) | 141 | 136 | 191 | 121 | 141 | 209 | 205 |
| BD feed rate (g/min) | 2.79 | 4.01 | 2.79 | 3.46 | 3.96 | 2.75 | 2.75 |
| Total Rxn Time | 190 | 160 | 210 | 140 | 140 | 240 | 240 |
| $H_2$ Charge (Std. $cm^3$) | 700 | 270 | 500 | 700 | 250 | 472 | 502 |
| $H_2$ co-feed (min.) | 141.0 | 134.0 | 187.0 | 120.0 | 139.8 | 201.0 | 201.8 |
| Pressure (PSIG) | 43.0 | 28 to 32 | 33.0 | 46.0 | 33.0 | 28.0 | 33.0 |
| $H_2$ Feed (SCCM) | 65.8 | 66 | 123.0 | 84.5 | 65.8 | 122.0 | 123.0 |
| Std. $cm^3$ $H_2$ | 9978 | 9114 | 23502 | 10840 | 9450 | 25000 | 25325 |
| mole $H_2$ | 0.440 | 0.401 | 1.035 | 0.478 | 0.416 | 1.101 | 1.116 |
| mole monomer/$H_2$ | 16.5 | 25.1 | 9.50 | 16.3 | 24.9 | 9.67 | 9.35 |
| Theoretical $M_n$ | 891 | 1,355 | 513 | 878 | 1,343 | 522 | 505 |
| $M_{n\ calc}$ | 12,286 | 17,247 | 12,659 | 13,146 | 17,722 | 13,706 | 13,421 |
| Efficiency | 1170% | 1244% | 1806% | 1154% | 1286% | 1715% | 1792% |
| Theoretical yield | 392.5 | 545.0 | 532.0 | 420.0 | 560.0 | 576.0 | 564.0 |
| polymer yield, g | 371.80 | 512.52 | 470.00 | 396.00 | 534.00 | 520.00 | 512.00 |
| yield % on monomer | 94.7% | 94.0% | 88.3% | 94.3% | 95.4% | 90.3% | 90.8% |

TABLE XIV

| | Example | | | | | | |
|---|---|---|---|---|---|---|---|
| | 67 | 68 | 69 | 70 | 71 | 72 | 73 |
| Catalyst (PM) | AA-1 | AA-1 | AA-1 | AA-5 | AA-5 | AA-1 | AA-1 |
| PM (g) | 3.696 | 3.720 | 3.702 | 5.642 | 3.950 | 2.764 | 3.195 |
| moles | 0.041465 | 0.041734 | 0.041532 | 0.043672 | 0.030570 | 0.031009 | 0.035844 |
| Catalyst (PM) | none | none | none | none | EA-2 | EA-1 | EA-1 |
| PM (g) | 0.000 | 0.000 | 0.000 | 0.000 | 1.182 | 1.012 | 1.170 |
| moles | 0.00000 | 0.00000 | 0.00000 | 0.00000 | 0.01312 | 0.01330 | 0.01538 |
| mole % Aminoalcohol | 100.0% | 100.0% | 100.0% | 100.0% | 70.0% | 70.0% | 70.0% |
| Promotor | none | none | none | none | TMEDA | TMEDA | TMEDA |
| moles | 0.0000 | 0.0000 | 0.0000 | 0.0000 | 0.0224 | 0.0227 | 0.0258 |

TABLE XIV-continued

| | Example | | | | | | |
|---|---|---|---|---|---|---|---|
| | 67 | 68 | 69 | 70 | 71 | 72 | 73 |
| grams | 0.0 | 0.0 | 0.0 | 0.0 | 2.600 | 2.638 | 2.995 |
| Mole Li | 0.0639 | 0.0656 | 0.0655 | 0.0655 | 0.0660 | 0.0668 | 0.0789 |
| Moles Li/Promotor | NA | NA | NA | NA | 2.951 | 2.944 | 3.060 |
| Temp Catalyst Initially Formed | 40 | 40 | 40 | 40 | 40 | 40 | 40 |
| mole lithium/mole PA | 1.5416 | 1.5718 | 1.5774 | 1.5001 | 1.5116 | 1.5082 | 1.5399 |
| Moles BD/Catalyst | 411.6 | 393.5 | 414.0 | 461.3 | 434.3 | 479.1 | 384.4 |
| total Solvent vol, ml | 464 | 464 | 464 | 464 | 464 | 464 | 464 |
| EB wt. % | 10.2% | 10.2% | 21.8% | 21.8% | 21.8% | 21.8% | 45.2% |
| Temperature, ° C. | 75.7 | 75.7 | 75.7 | 75.7 to 77.6 | 75.7 to 77.6 | 75.7 to 77.6 | 76.7 |
| RPM | 1060 | 1060 | 1060 | 1060 | 1060 | 1060 | 1060 |
| BD Feed (min.) | 120 | 121.8 | 132.0 | 133.0 | 133.0 | 143.5 | 142.0 |
| BD feed rate (g/min) | 4.17 | 4.17 | 4.07 | 4.10 | 3.95 | 4.07 | 4.05 |
| Total Rxn Time | 160 | 160 | 170 | 180 | 180 | 180 | 180 |
| $H_2$ Charge (std. $cm^3$) | 500 | 500 | 500 | 500 | 500 | 500 | 700 |
| Time of $H_2$ co-feed | 120.0 | 121.8 | 127.0 | 128.0 | 123.7 | 141.8 | 138.0 |
| Reactor Pressure (PSIG) | 34-40 | 34-39 | 39-40 | 50-59 | 50-59 | 50-59 | 50-59 |
| $H_2$ Feed Rate (SCCM) | 114.23 | 124.06 | 144.95 | 149.58 | 149.58 | 148.05 | 166.67 |
| Std. $cm^3$ $H_2$ | 14208 | 15604 | 18909 | 19646 | 19005 | 21500 | 23700 |
| mole $H_2$ | 0.626 | 0.687 | 0.833 | 0.865 | 0.837 | 0.947 | 1.044 |
| mole BD/Hydrogen | 14.77 | 13.66 | 11.92 | 11.64 | 11.59 | 11.39 | 10.18 |
| Theoretical $M_n$ | 798 | 738 | 644 | 629 | 626 | 615 | 550 |
| $M_{n\ calc}$ | 22,228 | 21,253 | 22,358 | 24,914 | 23,453 | 25,872 | 20,760 |
| Efficiency | 2365% | 2346% | 2668% | 2867% | 2749% | 3296% | 2707% |
| $M_n$ Experimental | 940 | 906 | 838 | 869 | 853 | 785 | 767 |
| Theoretical yield | 500.0 | 508.0 | 537.0 | 548.0 | 525.0 | 583.5 | 575.0 |
| polymer yield, g | 472 | 472 | 505 | 512 | 482 | 545 | 536 |
| yield % on monomer | 94.4% | 92.9% | 94.0% | 93.4% | 91.8% | 93.4% | 93.2% |

TABLE XV

| | Example | | | |
|---|---|---|---|---|
| | 74 | 75 | 76 | 77 |
| Catalyst (PM) | AA-1 | AA-1 | AA-1 | AA-5 |
| PM (g) | 3.468 | 3.702 | 2.000 | 4.294 |
| moles | 0.038907 | 0.041532 | 0.022438 | 0.033237 |
| Catalyst (PM) | EA-1 | none | EA-1 | none |
| PM (g) | 1.286 | 0.000 | 0.820 | 0.000 |
| moles | 0.01690 | 0.00000 | 0.01078 | 0.00000 |
| mole % Aminoalcohol | 69.7% | 100.0% | 67.6% | 100.0% |
| Promotor | TMEDA | none | none | TMEDA |
| moles | 0.0293 | 0.0000 | 0.0000 | 0.0166 |
| grams | 3.400 | 0.0 | 0.0 | 1.931 |
| Mole Li | 0.0839 | 0.0623 | 0.0500 | 0.0508 |
| Moles Li/Promotor | 2.868 | NA | NA | 3.057 |
| mole Li/mole PM | 1.5035 | 1.5000 | 1.5048 | 1.5283 |
| Moles BD/Catalyst | 387.5 | 510.6 | 606.5 | 602.8 |
| total Solvent vol, ml | 464 | 464 | 464 | 564 |
| EB wt. % | 45.2% | 45.2% | 45.2% | 42.8% |
| Initial LiH Equivalent Molarity | 0.0572 | 0.0429 | 0.0349 | 0.0303 |
| Temperature, ° C. | 76.7 | 72.5 | 69.7 | 76.7 |
| RPM | 1060 | 1060 | 1060 | 1060 |
| BD Feed (min.) | 147.0 | 137.8 | 137.0 | 143.1 |
| Average monomer feed rate (g/min) | 4.01 | 4.16 | 4.01 | 4.00 |
| Total Rxn Time | 180 | 180 | 180 | 180 |
| $H_2$ Charge (std. $cm^3$) | 700 | 300 | 250 | 250 |
| $H_2$ co-feed (min.) | 142.1 | 138.0 | 134.0 | 141.0 |
| Reactor Pressure (PSIG) | 50-59 | 50-59 | 50-59 | 50-59 |
| $H_2$ n Feed Rate (SCCM) | 190.00 | 67.50 | 55.60 | 44.00 |
| Std. $cm^3$ $H_2$ | 27700 | 9615 | 7700 | 6454 |
| mole $H_2$ | 1.220 | 0.424 | 0.339 | 0.284 |
| mole BD/$H_2$ | 8.92 | 25.03 | 29.98 | 37.23 |
| Theoretical $M_n$ | 482 | 1,352 | 1,619 | 2,010 |
| $M_{n\ calc}$ | 20,930 | 27,573 | 32,754 | 32,552 |
| $M_n$ Experimenta; | 728 | 1364 | 1536 | 2204 |
| Efficiency | 2875% | 2022% | 2132% | 1477% |
| Theoretical yield | 589.0 | 573.5 | 550.0 | 572.5 |

TABLE XV-continued

| | | | | |
|---|---|---|---|---|
| polymer yield, g | 540.00 | 551.13 | 510.00 | 547.45 |
| yield % on monomer | 91.7% | 96.1% | 92.7% | 95.6% |

| | Example | | | |
|---|---|---|---|---|
| | 78 | 79 | 80 | 81 |
| Catalyst (PM) | AA-2 | AA-2 | AA-2 | AA-1 |
| PM (g) | 6.510 | 6.510 | 6.510 | 1.730 |
| moles | 0.063100 | 0.063100 | 0.063100 | 0.019408 |
| Catalyst (PM) | none | none | none | EA-1 |
| PM (g) | 0.000 | 0.000 | 0.000 | 0.779 |
| moles | 0.00000 | 0.00000 | 0.00000 | 0.01024 |
| mole % Aminoalcohol | 100.0% | 100.0% | 100.0% | 65.5% |
| Promotor | none | none | none | none |
| moles | 0.0000 | 0.0000 | 0.0000 | 0.0000 |
| grams | 0.0 | 0.0 | 0.0 | 0.0 |
| Mole Li | 9.5000E−02 | 9.5000E−02 | 9.5000E−02 | 0.0458 |
| Moles Li/Promotor | NA | NA | NA | NA |
| mole Li/mole PM | 1.5055 | 1.5055 | 1.5055 | 1.5461 |
| Moles BD/Catalyst | 304.3 | 327.4 | 337.3 | 656.6 |
| total Solvent vol, ml | 464 | 464 | 464 | 464 |
| EB wt. % | 70.5% | 70.5% | 70.5% | 40.7% |
| Initial LiH Equivalent Molarity | 0.0444 | 0.0444 | 0.0444 | 0.0338 |
| Temperature, ° C. | 89.6 | 90.8 | 92.8 | 85.8 |
| RPM | 1060 | 1060 | 1060 | 1060 |
| BD Feed (min.) | 130 | 141 | 146 | 143.1 |
| Average monomer feed rate (g/min) | 4.03 | 4.01 | 4.00 | 4.02 |
| Total Rxn Time | 160 | 160 | 160 | 180 |
| $H_2$ Charge (std. $cm^3$) | 250 | 500 | 500 | 328 |
| $H_2$ co-feed (min.) | 126.0 | 138.0 | 144.0 | 141.0 |
| Reactor Pressure (PSIG) | 12.0 | 20.0 | 30.0 | 50-59 |
| $H_2$ n Feed Rate (SCCM) | 66.67 | 111.00 | 185.00 | 38.28 |
| Std. $cm^3$ $H_2$ | 8650 | 15818 | 27140 | 5725 |
| mole $H_2$ | 0.381 | 0.697 | 1.196 | 0.252 |
| mole $BD/H_2$ | 25.47 | 14.99 | 9.00 | 42.15 |
| Theoretical $M_n$ | 1,375 | 809 | 486 | 2,276 |
| $M_{n\ calc}$ | 16,432 | 17,684 | 18,216 | 35,459 |
| $M_n$ Experimenta; | 1329 | 909 | 669 | 1952 |
| Efficiency | 1236% | 1945% | 2723% | 1817% |
| Theoretical yield | 525.0 | 565.0 | 582.0 | 575.0 |
| polymer yield, g | 495.00 | 529.00 | 517.00 | 520.00 |
| yield % on monomer | 94.3% | 93.6% | 88.8% | 90.4% |

TABLE XVI

| Analytical Results all HMPBD Examples. | | | | | | | | | |
|---|---|---|---|---|---|---|---|---|---|
| Example | Vinyl FT-IR | Total Vinyl wt. % ($^1$HNMR) | Total Vinyl wt. % (C13-NMR) | 1,2-Vinyl/VCP HNMR | Viscosity cP | $T_g$, ° C. | 1,4-BD cis/trans | $M_n$ | PDI |
| 26 | 50.7 | 51.5% | 61.6% | 10.49 | 725 | −83.19 | 0.493 | 1144 | 2.007 |
| 27 | 48.7 | 49.7% | 59.5% | 10.33 | 608 | −84.69 | 0.577 | 1172 | 2.022 |
| 28 | 45.9 | 46.7% | 57.1% | 11.80 | 733 | −84.55 | 0.549 | 1268 | 1.979 |
| 29 | 66.2 | 68.9% | 75.6% | 9.79 | 1317 | −65.64 | 0.633 | 1202 | 1.574 |
| 30 | 33.8 | 34.9% | 40.0% | 6.64 | 333 | −95.69 | 0.509 | 1204 | 1.574 |
| 31 | 38.4 | 40.6% | 46.1% | 4.86 | 133 | −99.42 | 0.660 | 881 | 1.402 |
| 32 | 71.8 | 73.5% | 79.4% | 12.09 | 3408 | −56.97 | 0.644 | 1393 | 1.778 |
| 33 | 64.4 | 66.4% | 74.4% | 14.09 | 1400 | −66.80 | 0.543 | 1251 | 1.636 |
| 34 | 72.3% | 74.1% | 79.9% | 7.66 | 673 | −67.09 | 0.514 | 942 | 1.459 |
| 35 | 73.1% | 74.5% | 80.2% | 9.54 | 1050 | −63.35 | 0.507 | 1050 | 1.511 |
| 36 | 73.1% | 74.2% | 80.3% | 9.34 | 1383 | −62.97 | 0.496 | 1114 | 1.629 |
| 37 | 72.9% | 74.6% | 80.0% | 9.40 | 1508 | −61.00 | 0.464 | 1142 | 1.534 |
| 38 | 71.5% | 73.5% | 80.8% | 9.39 | 1000 | −64.30 | 0.528 | 1052 | 1.526 |
| 39 | 71.7% | 74.1% | 79.3% | 9.18 | 760 | −65.65 | 0.536 | 988 | 1.500 |
| 40 | 72.5% | 74.4% | 79.9% | 9.37 | 773 | −65.39 | 0.509 | 1000 | 1.464 |
| 41 | 70.5% | 71.7% | 76.5% | 8.14 | 875 | −67.44 | 0.477 | 1072 | 1.500 |
| 42 | 69.1% | 70.3% | 78.5% | 10.83 | 1017 | −67.01 | 0.493 | 1123 | 1.586 |
| 43 | 68.9% | 71.9% | 78.6% | 9.78 | 958 | −65.12 | 0.598 | 1081 | 1.540 |
| 44 | 72.4% | 75.0% | 80.4% | 9.93 | 1125 | −62.36 | 0.538 | 1087 | 1.512 |
| 45 | 71.3% | 73.8% | 79.2% | 8.99 | 1250 | −62.77 | 0.509 | 1105 | 1.562 |
| 46 | 67.0% | 69.8% | 76.6% | 9.27 | 939 | −66.80 | 0.485 | 1096 | 1.535 |
| 47 | 65.6% | 69.4% | 76.5% | 9.23 | 822 | −67.75 | 0.485 | 1060 | 1.521 |
| 48 | 66.5% | 70.1% | 77.2% | 9.83 | 805 | −67.62 | 0.485 | 1028 | 1.513 |

TABLE XVI-continued

Analytical Results all HMPBD Examples.

| Example | Vinyl FT-IR | Total Vinyl wt. % ($^1$HNMR) | Total Vinyl wt. % (C13-NMR) | 1,2-Vinyl/VCP HNMR | Viscosity cP | $T_g$, ° C. | 1,4-BD cis/trans | $M_n$ | PDI |
|---|---|---|---|---|---|---|---|---|---|
| 49 | 68.3% | 70.4% | 77.1% | 9.87 | 820 | −67.40 | 0.494 | 1010 | 1.499 |
| 50 | 69.2% | 71.4% | 77.4% | 8.38 | 809 | −66.70 | 0.528 | 1009 | 1.506 |
| 51 | 67.9% | 69.5% | 76.1% | 9.23 | 705 | −69.27 | 0.503 | 998 | 1.498 |
| 52 | 68.9% | 69.6% | 77.0% | 9.92 | 743 | −68.29 | 0.506 | 1000 | 1.500 |
| 53 | 70.3% | 72.0% | 77.7% | 9.62 | 1102 | −65.08 | 0.580 | 1112 | 1.546 |
| 54 | 69.6% | 70.3% | 76.4% | 9.21 | 896 | −67.01 | 0.534 | 1082 | 1.536 |
| 55 | 68.7% | 69.8% | 76.9% | 10.13 | 674 | −69.05 | 0.531 | 1038 | 1.531 |
| 56 | 67.5% | 69.5% | 76.2% | 9.23 | 617 | −69.51 | 0.530 | 1022 | 1.523 |
| 57 | 68.9 | 70.6% | 76.2% | 8.66 | 897 | −71.84 | 0.559 | 1019 | 1.515 |
| 58 | 67.2 | 69.1% | 77.8% | 13.06 | 801 | −71.18 | 0.584 | 1024 | 1.596 |
| 59 | 69.3 | 71.9% | 77.7% | 9.95 | 947 | −68.34 | 0.573 | 1060 | 1.553 |
| 60 | 55.2% | 57.5% | 64.1% | 8.15 | 405 | −82.23 | 0.664 | 1050 | 1.532 |
| 61 | 48.5% | 50.0% | 57.3% | 9.60 | 850 | −78.66 | 0.65 | 1387 | 1.597 |
| 62 | 56.3% | 59.1% | 66.2% | 5.16 | 97.6 | −91.99 | 0.63 | 701 | 1.324 |
| 63 | 32.3% | 34.4% | 38.8% | 5.10 | 274 | −98.49 | 0.659 | 1139 | 1.574 |
| 64 | 31.4% | 32.4% | 37.5% | 6.43 | 488.2 | −95.61 | 0.67 | 1378 | 1.628 |
| 65 | 34.6% | 37.7% | 34.6% | 3.27 | 84.1 | 105.08 | 0.65 | 799 | 1.378 |
| 66 | 32.4% | 35.4% | 31.8% | 3.34 | 81.9 | −105.67 | 0.66 | 749 | 1.366 |
| 67 | 67.8% | 70.6% | 76.2% | 10.64 | 505 | −72.15 | 0.546 | 940 | 1.500 |
| 68 | 70.3% | 69.8% | 77.2% | 8.96 | 431 | −71.97 | 0.519 | 906 | 1.500 |
| 69 | 70.2% | 70.2% | 77.4% | 8.19 | 317 | −74.12 | 0.535 | 838 | 1.400 |
| 70 | 73.3% | 74.8% | 79.7% | 8.58 | 449.9 | −69.81 | 0.61 | 869 | 1.540 |
| 71 | 72.2% | 72.6% | 79.0% | 8.28 | 369.5 | −72.50 | 0.53 | 853 | 1.450 |
| 72 | 70.6% | 71.4% | 77.4% | 6.74 | 264.8 | −76.10 | 0.55 | 785 | 1.403 |
| 73 | 69.4% | 71.8% | 77.5% | 6.27 | 209.3 | −77.02 | 0.56 | 767 | 1.373 |
| 74 | 70.6% | 74.0% | 77.6% | 6.73 | 167.2 | −79.27 | 0.55 | 728 | 1.348 |
| 75 | 67.4% | 70.8% | 77.7% | 12.86 | 2593 | −63.04 | 0.56 | 1364 | 1.735 |
| 76 | 67.4% | 70.0% | 76.7% | 12.43 | 4015 | −59.22 | 0.53 | 1536 | 1.700 |
| 77 | 70.9% | 73.3% | 79.5% | 14.02 | 10873 | −49.30 | 0.60 | 2204 | 1.876 |
| 78 | 69.3% | 72.9% | 76.4% | 9.55 | 2386 | −61.24 | 0.76 | 1329 | 1.597 |
| 79 | 69.6% | 62.6% | 75.7% | 6.54 | 487.4 | −71.23 | 0.74 | 909 | 1.437 |
| 80 | 68.1% | 70.4% | 76.7% | 6.52 | 112.6 | −83.72 | 0.66 | 669 | 1.294 |
| 81 | 66.1% | 67.2% | 74.5% | 16.81 | 10513 | −56.72 | 0.56 | 1952 | 1.894 |

TABLE XVII

| Comp. Ex. | Polymer Type | Vinyl FT-IR | total Vinyl wt. % ($^1$HNMR) | total Vinyl wt. % (C13-NMR) | 1,2-Vinyl/VCP $^1$HNMR | Viscosity cP (25° C.) | $T_g$, ° C. | 1,4-BD cis/trans | $M_n$ | PDI |
|---|---|---|---|---|---|---|---|---|---|---|
| 1 | Telomer | 41.0% | 41.8% | 49.0% | 36.45 | 8292 | −74.38 | 0.57 | 2441* | 2.32 |
| 2 | Telomer | 54.1% | 72.8% | 67.1% | 1.76 | 5333 | −52.68 | 0.44 | 750* | 1.75 |
| 3 | Telomer | 65.1% | 77.8% | 75.7% | 2.89 | 5450 | −48.06 | 0.33 | 913* | 1.62 |
| 4 | Telomer | 21.0% | 19.9% | 25.1% | 38.00 | 2850 | −91.59 | 0.68 | 2359* | 2.08 |
| 5 | Living Anionic | 28.0% | NA | 23.7% | <0.5% VCP | 1,292 | −89.31 | 0.79 | 6206** | 1.10 |
| 6 | ZN | 0.0% | 0.0% | 0.0% | NA | 633 | −101.99 | 3.38 | 2854** | 2.60 |
| 7 | ZN | 0.0% | 0.0% | 0.0% | NA | 2417 | −102.37 | 3.86 | 4600** | 3.60 |

*GPC with 50% 1,4-BD standards.
**GPC vs. polystyrene standards.

EMBODIMENTS

Additionally or alternately, the disclosure can include one or more of the following embodiments.

Embodiment 1. A process for polymerizing conjugated dienes in a hydrocarbon reaction medium, including chemically adding a lithium alkoxide complexed saline hydride LOXSH catalyst to a low boiling conjugated diene to form a polymerization initiating species, co-feeding at least two gaseous and/or volatile compounds to the reaction medium, wherein the at least two gaseous and/or volatile compounds comprise hydrogen and the low boiling conjugated diene, and polymerizing at least a portion of the conjugated diene, wherein the LOXSH reagent comprises one or more σ-μ polar modifiers.

Embodiment 2. A process for hydrogen mediated polymerization of conjugated dienes in a hydrocarbon reaction medium, including chemically adding lithium alkoxide complexed saline hydride (LOXSH) catalyst to a low boiling conjugated diene to form a polymerization initiating species, and co-feeding at least two gaseous and/or volatile compounds to the reaction medium, wherein the at least two gaseous and/or volatile compounds comprise hydrogen and the low boiling conjugated diene, wherein the LOXSH catalyst comprises one or more σ-μ polar modifiers.

Embodiment 3. An LOXSH catalyst or reagent composition, wherein the composition is selective for 1,4-CD monomer microstructure enchainment, and the composition comprises 1) at least one tertiary amino alcohol σ-μ polar modifiers having a 2° or a 3° alcohol functional group; 2) an organolithium compound; and 3) optionally elemental hydrogen and/or an organo silicon hydride.

Embodiment 4. An LOXSH catalyst or reagent composition, wherein the composition is selective for 3,4-CD and/or 1,2-CD-vinyl monomer microstructure enchainment, and the composition comprises: a) at least one tertiary amino alcohol σ-μ or amino-ether-alcohol polar modifiers; b) optionally at least one separate ether-alcohol σ-μ polar modifiers; c) an organo lithium compound; and d) optionally elemental hydrogen and/or an organo silicon hydride.

Embodiment 5. A hydrogen mediated anionic poly(conjugated diene) composition that is characterized as having: 1) number average molecular weight distribution $M_n$ from about 500 to about 2600 Daltons; 2) a Brookfield viscosity (25° C.) from about 20 to about 200,000 cP; 3) 1,4-CD microstructure content from about 20% to about 85%; and 4) glass transition temperature $T_g$ from about −120° C. to about −20° C.

Embodiment 6. The processes, catalysts or compositions of one of the previous embodiments, including co-feeding the low boiling conjugated diene and the hydrogen in a pre-set molar ratio to the polymerization reaction mixture over the course of at least a portion of the entire co-feed wherein the reactor pressure adjusts autogenously to the condensed phase activity of hydrogen and of the conjugated diene at a relative steady state pressure and temperature. The reactor pressure over the course of the process (the autogenously generated reaction pressure) can the result or product of some combination of the following: a) the relative feed rate of hydrogen to monomer; b) the feed rate of reactants relative to catalyst concentration; c) the reaction temperature; d) the activity of a particular LOXSH catalyst; and e) the vapor pressure of the reaction medium or solvent(s).

Embodiment 7. The processes, catalysts or compositions of one of the previous embodiments, wherein the relative feed of the conjugated diene (CD) monomer to hydrogen can be from about 5 mole to about 42 mole CD/mole $H_2$; or wherein the relative feed rate of CD/$H_2$/unit time is from about 0.0333 mole CD/mole $H_2$/min to about 0.6667 mole CD/mole $H_2$/min; or wherein the relative feed of mole CD monomer to mole of saline hydride (SH) is from about 70 mole to about 1000 mole CD per mole SH in the LOXSH catalyst; wherein the saline hydride (SH) is one or more of LiH, and/or NaH, and/or KH, and/or $MgH_2$ and/or CsH; or wherein the conjugated diene comprises one or more of the following: butadiene, isoprene, 2-methyl-1,3-pentadienes (E and Z isomers); piperylene; 2,3-dimethylbutadiene; 2-phenyl-1,3-butadiene; cyclohexadiene; β-myrcene; β-farnesene; and hexatriene; or wherein the conjugated diene comprises one or more of the butadiene and/or isoprene.

Embodiment 8. The processes, catalysts or compositions of one of the previous embodiments, wherein one or more σ-μ polar modifiers can be selected from one or more of the structures:

I $R—Σ—R^2—OH$

II $HO—R^2—Σ—R^2—OH$

III

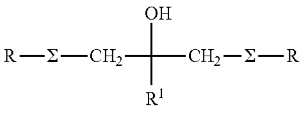

IV

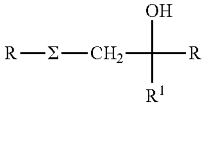

-continued

V

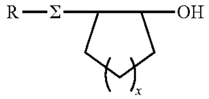

VI

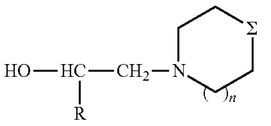

VII

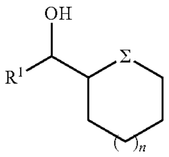

VIII

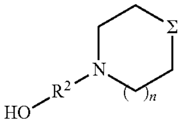

IX

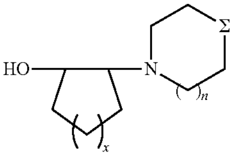

wherein R is independently an alkyl group which may also be further substituted by other tertiary amines or ethers, $R^1$ is independently a hydrogen atom or an alkyl group which may also be further substituted by other tertiary amines or ethers, $R^2$ is $—(CH_2)_y—$, wherein y=2, 3, or 4, Σ can include: i) O or NR for I, II, III, IV, and V; ii) and for VI, VII, VIII and IX can include O or NR or $CH_2$, n is independently a whole number equal to or greater than 0, and x is independently a whole number equal to or greater than 1.

Embodiment 9. The processes, catalysts or compositions of one of the previous embodiments, wherein the hydrocarbon reaction medium can be a hydrocarbon solvent with a $pK_a$ greater than that of $H_2$; or wherein the hydrocarbon reaction medium can include molecular hydrogen and the partial pressure of molecular hydrogen can be maintained at pressures between about 0.01 Bar to about 19.0 Bar; or wherein the autogenous reaction pressure can be between about 0.01 Bar to about 19.0 Bar; or wherein the process can include a temperature and the temperature is maintained between about 20° C. to about 130° C.; or wherein the molar ratio of the total charge of monomer to saline hydride catalyst can be about 10:1 to about 1000:1.

Embodiment 10. The processes, catalysts or compositions of one of the previous embodiments, wherein the σ-μ polar modifier can be one more of N,N-dimethylethanolamine, 1-(dimethylamino)-2-propanol, 1-(dimethylamino)-2-butanol, trans-2-(dimethylamino)cyclohexanol; 2-piperidinoethanol; 1-piperidino-2-propanol; 1-piperidino-2-butanol, trans-2-piperidinocyclohexan-1-ol, 1-pyrrolidinoethanol, pyrrolidinylpropan-2-ol, 1-(1-pyrolidinyl)-2-butanol, 2-pyrolidinocyclohexanol, 4-methyl-1-piperazineethanol, 1-(4-methyl-1-piperazinyl)-2-propanol; 1-(4-methyl-1-piperazinyl)-2-butanol; trans-2-(4-methyl-1-piperazinyl)-cyclohexanol, 2-morpholinoethanol, 1-(4-morpholinyl)-2-propanol, 1-(4-morpholinyl)-2-butanol, trans-2-morpholin- 4-ylcyclohexanol, 1-methyl-2-piperidinemethanol, 1-methyl-2-pyrrolidinemethanol, dimethylaminoethanol, N-methyl-diethanolamine, 3-dimethylamino-1-propanol, 1,3-bis(dimethylamino)-2-propanol, 2-{[2-dimethylamino) ethyl]methylamino}ethanol, 2-[2-(dimethylamino)ethoxy] ethanol, 2-(2-(piperidyl)ethoxy)ethanol, 2-[2-(4-morpholinyl)ethoxy]ethanol, 2-[2-(1-pyrrolidinyl)ethoxy]ethanol, 2-[2-(4-methyl-1-piperazinyl)ethoxy]ethanol. The processes, catalysts or compositions can further include one or more 2-methoxyethanol, 1-methoxypropan-2-ol, 1-methoxybutan-2-ol, 2-methoxycyclohexan-1-ol, tetrahydrofurfuryl alcohol, tetrahydropyran-2-methanol, diethylene glycol monomethyl ether Embodiment 11. The processes, catalysts or compositions of one of the previous embodiments, wherein the LOXSH catalyst includes between about 50 mole % to less than 100 mole % of an tertiary amino-alcohol or a tertiary amino-ether-alcohol σ-μ polar modifier selected from one or more of N,N-dimethylethanolamine, 1-(dimethylamino)-2-propanol, 1-(dimethylamino)-2-butanol, trans-2-(dimethylamino) cyclohexanol; 2-piperidinoethanol; 1-piperidino-2-propanol; 1-piperidino-2-butanol, trans-2-piperidinocyclohexan-1-ol, 1-pyrrolidinoethanol, pyrrolidinylpropan-2-ol, 1-(1-pyrolidinyl)-2-butanol, 2-pyrolidinocyclohexanol, 4-methyl-1-piperazineethanol, 1-(4-methyl-1-piperazinyl)-2-propanol; 1-(4-methyl-1-piperazinyl)-2-butanol; trans-2-(4-methyl-1-piperazinyl)-cyclohexanol, 2-morpholinoethanol, 1-(4-morpholinyl)-2-propanol, 1-(4-morpholinyl)-2-butanol, trans-2-morpholin-4-ylcyclohexanol, 1-methyl-2-piperidinemethanol, 1-methyl-2-pyrrolidinemethanol, dimethylaminoethanol, N-methyl-diethanolamine, 3-dimethylamino-1-propanol, 1,3-bis(dimethylamino)-2-propanol, 2-{[2-dimethylamino)ethyl]methylamino}ethanol, 2-[2-(dimethylamino)ethoxy]ethanol, 2-(2-(piperidyl) ethoxy)ethanol, 2-[2-(4-morpholinyl)ethoxy]ethanol, 2-[2-(1-pyrrolidinyl)ethoxy]ethanol, 2-[2-(4-methyl-1-piperazinyl)ethoxy]ethanol; and from about 50 mole % to greater than 0 mole % of an ether-alcohol σ-μ polar modifier selected from one or more of 2-methoxyethanol, 1-methoxypropan-2-ol, 1-methoxybutan-2-ol, 2-methoxycyclohexan-1-ol, tetrahydrofurfuryl alcohol, tetrahydropyran-2-methanol, diethylene glycol monomethyl ether.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus, the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Each and every patent or publication referred to in any portion of this specification is incorporated in toto into this disclosure by reference, as if fully set forth herein.

This disclosure is susceptible to considerable variation in its practice. Therefore the foregoing description is not intended to limit, and should not be construed as limiting, the disclosure to the particular exemplifications presented hereinabove.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

I claim:

1. A process for polymerizing conjugated dienes in a hydrocarbon reaction medium within a reactor, comprising a) chemically adding a lithium alkoxide complexed saline hydride (LOXSH) catalyst to a low boiling conjugated diene (CD) to form a polymerization initiating species in the reaction medium, b) co-feeding at least two gaseous and/or volatile compounds to the reaction medium forming a polymerization reaction mixture, wherein the at least two gaseous and/or volatile compounds comprise hydrogen and the low boiling CD, and wherein the at least two gaseous and/or volatile compounds are co-fed at a pre-set molar ratio to the polymerization reaction mixture over the course of at least a portion of the entire co-feed wherein the reactor pressure adjusts autogenously to the condensed phase activity of hydrogen and of the CD at a relative steady state pressure and temperature, and c) polymerizing at least a portion of the CD, wherein the LOXSH catalyst comprises one or more σ-μ polar modifiers.

2. The process of claim 1, wherein the reactor pressure over the course of the process (the autogenously generated reaction pressure) is the result or product of some combination of the following: a) the relative feed rate of hydrogen to monomer; b) the feed rate of reactants relative to catalyst concentration; c) the reaction temperature; d) the activity of a particular LOXSH catalyst; and e) the vapor pressure of the reaction medium or solvent(s).

3. The process of claim 1, wherein the relative feed of the CD monomer to hydrogen is from about 5 mole to about 42 mole CD/mole $H_2$.

4. The process of claim 3, wherein the relative feed rate of CD/$H_2$/unit time is from about 0.0333 mole CD/mole $H_2$/min to about 0.6667 mole CD/mole $H_2$/min.

5. The process of claim 1, wherein the relative feed of mole CD monomer to mole of saline hydride (SH) is from about 70 mole to about 1000 mole CD per mole SH in the LOXSH catalyst; wherein the SH is one or more of LiH, and/or NaH, and/or KH, and/or $MgH_2$ and/or CsH.

6. The process of claim 1, wherein the CD comprises one or more of the following: butadiene, isoprene, 2-methyl-1,3-pentadienes (E and Z isomers); piperylene; 2,3-dimethylbutadiene; 2-phenyl-1,3-butadiene; cyclohexadiene; B-myrcene; B-farnesene; and hexatriene.

7. The process of claim 1, wherein the CD comprises one or more of the butadiene and/or isoprene.

8. The process of claim 1, further comprising copolymerizing anionically polymerizable hydrocarbon vinylaromatic monomer with the CD.

9. The process of claim 1, wherein the one or more σ-μ polar modifiers is selected from one or more of the structures:

I

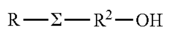

II

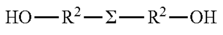

III

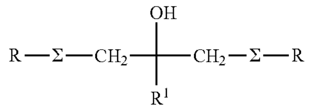

IV

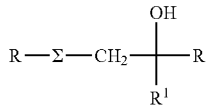

V

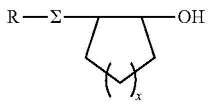

VI

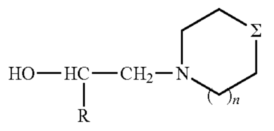

VII

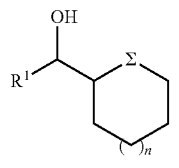

VIII

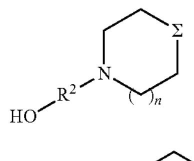

IX

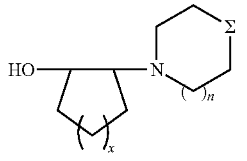

wherein R is independently an alkyl group which may also be further substituted by other tertiary amines or ethers, $R^1$ is independently a hydrogen atom or an alkyl group which may also be further substituted by other tertiary amines or ethers, $R^2$ is $-(CH_2)_y-$, wherein y=2, 3, or 4, Σ can include: i) O or NR for I, II, III, IV, and V; ii) and for VI, VII, VIII and IX can include O or NR or $CH_2$; n is independently a whole number equal to or greater than 0, and x is independently a whole number equal to or greater than 1.

10. The process of claim 1, wherein the hydrocarbon reaction medium is a hydrocarbon solvent with a $pK_a$ greater than that of $H_2$.

11. The process of claim 1, wherein the hydrocarbon reaction medium includes molecular hydrogen and the partial pressure of molecular hydrogen is maintained at pressures between about 0.01 Bar to about 19.0 Bar.

12. The process of claim 2, wherein the autogenous reaction pressure is between about 0.01 Bar to about 19.0 Bar.

13. The process of claim 1, wherein the process includes a temperature and the temperature is maintained between about 20° C. to about 130° C.

14. The process of claim 1, wherein the molar ratio of the total charge of monomer to LOXSH catalyst is about 10:1 to about 1000:1.

15. The process of claim 1, wherein the LOXSH catalyst is a one or more of 1) a LOXLiH reagent; 2) a LOXNaH reagent; 3) $LOXMgH_2$; and/or 4) a LOXKH reagent.

16. The process of claim 1, wherein the σ-μ polar modifier is one more of N,N-dimethylethanolamine, 1-(dimethylamino)-2-propanol, 1-(dimethylamino)-2-butanol, trans-2-(dimethylamino) cyclohexanol; 2-piperidinoethanol; 1-piperidino-2-propanol; 1-piperidino-2-butanol, trans-2-piperidinocyclohexan-1-ol, 1-pyrrolidinoethanol, pyrrolidinylpropan-2-ol, 1-(1-pyrolidinyl)-2-butanol, 2-pyrolidinocyclohexanol, 4-methyl-1-piperazineethanol, 1-(4-methyl-1-piperazinyl)-2-propanol; 1-(4-methyl-1-piperazinyl)-2-butanol; trans-2-(4-methyl-1-piperazinyl)-cyclohexanol, 2-morpholinoethanol, 1-(4-morpholinyl)-2-propanol, 1-(4-morpholinyl)-2-butanol, trans-2-morpholin-4-ylcyclohexanol, 1-methyl-2-piperidinemethanol, 1-methyl-2-pyrrolidinemethanol, N-methyl-diethanolamine, 3-dimethylamino-1-propanol, 1,3-bis(dimethylamino)-2-propanol, 2-{[2-dimethylamino)ethyl] methylamino}ethanol, 2-[2-(dimethylamino)ethoxy]ethanol, 2-(2-(piperidyl)ethoxy) ethanol, 2-[2-(4-morpholinyl) ethoxy]ethanol, 2-[2-(1-pyrrolidinyl)ethoxy]ethanol, and 2-[2-(4-methyl-1-piperazinyl)ethoxy]ethanol.

17. The process of claim 16, wherein the reaction medium further comprises one or more of 2-methoxyethanol, 1-methoxypropan-2-ol, 1-methoxybutan-2-ol, 2-methoxycyclohexan-1-ol, tetrahydrofurfuryl alcohol, tetrahydropyran-2-methanol, and diethylene glycol monomethyl ether.

18. The process of claim 1, wherein the LOXSH catalyst comprises about 50 mole % or more, but less than 100 mole %, of an tertiary amino-alcohol or a tertiary amino-ether-alcohol σ-μ polar modifier selected from one or more of N,N-dimethylethanolamine, 1-(dimethylamino)-2-propanol, 1-(dimethylamino)-2-butanol, trans-2-(dimethylamino) cyclohexanol; 2-piperidinoethanol; 1-piperidino-2-propanol; 1-piperidino-2-butanol, trans-2-piperidinocyclohexan-1-ol, 1-pyrrolidinoethanol, pyrrolidinylpropan-2-ol, 1-(1-pyrolidinyl)-2-butanol, 2-pyrolidinocyclohexanol, 4-methyl-1-piperazineethanol, 1-(4-methyl-1-piperazinyl)-2-propanol; 1-(4-methyl-1-piperazinyl)-2-butanol; trans-2-(4-methyl-1-piperazinyl)-cyclohexanol, 2-morpholinoethanol, 1-(4-morpholinyl)-2-propanol, 1-(4-morpholinyl)-2-butanol, trans-2-morpholin-4-ylcyclohexanol, 1-methyl-2-piperidinemethanol, 1-methyl-2-pyrrolidinemethanol, dimethylaminoethanol, N-methyl-diethanolamine, 3-dimethylamino-1-propanol, 1,3-bis(dimethylamino)-2-propanol, 2-{[2-dimethylamino)ethyl]methylamino}ethanol, 2-[2-(dimethylamino)ethoxy]ethanol, 2-(2-(piperidyl) ethoxy) ethanol, 2-[2-(4-morpholinyl)ethoxy]ethanol, 2-[2-(1-pyrrolidinyl)ethoxy]ethanol, and 2-[2-(4-methyl-1-piperazinyl)ethoxy]ethanol; and from about 50 mole % to greater than 0 mole % of an ether-alcohol σ-μ polar modifier selected from one or more of 2-methoxyethanol, 1-methoxypropan-2-ol, 1-methoxybutan-2-ol, 2-methoxycyclohexan-1-ol, tetrahydrofurfuryl alcohol, tetrahydropyran-2-methanol, and diethylene glycol monomethyl ether.

19. The process of claim 1, further comprising either or both of a σ type polar modifier and/or a μ type polar modifier.

20. A LOXSH catalyst or reagent composition comprising: a) at least one tertiary amino alcohol σ-μ or amino-ether-alcohol polar modifier; b) at least one separate ether-alcohol σ-μ polar modifier; c) an organo lithium compound; and d) elemental hydrogen and/or an organo silicon hydride, wherein the σ-μ polar modifiers of the composition comprise about 50 mole % or more, but less than 100 mole %, of a tertiary amino-alcohol or a tertiary amine-ether-alcohol σ-μ polar modifier selected from one or more of: N,N-dimethylethanolamine, 1-(dimethylamino)-2-propanol, 1-(dimethylamino)-2-butanol, trans-2-(dimethylamino) cyclohexanol; 2-piperidinoethanol; 1-piperidino-2-propanol; 1-piperidino-2-butanol, trans-2-piperidinocyclohexan-1-ol, 1-pyrrolidinoethanol, pyrrolidinylpropan-2-ol, 1-(1-pyrolidinyl)-2-butanol, 2-pyrolidinocyclohexanol, 4-methyl-1-piperazineethanol, 1-(4-methyl-1-piperazinyl)-2-propanol; 1-(4-methyl-1-piperazinyl)-2-butanol; trans-2-(4-methyl-1-piperazinyl)-cyclohexanol, 2-morpholinoethanol, 1-(4-morpholinyl)-2-propanol, 1-(4-morpholinyl)-2-butanol, trans-2-morpholin-4-ylcyclohexanol, 1-methyl-2-piperidinemethanol, 1-methyl-2-pyrrolidinemethanol, N-methyl-diethanolamine, 3-dimethylamino-1-propanol, 1,3-bis(dimethylamino)-2-propanol, 2-{[2-dimethylamino) ethyl]methylamino}ethanol, 2-[2-(dimethylamino)ethoxy] ethanol, 2-(2-(piperidyl)ethoxy) ethanol, 2-[2-(4-morpholinyl)ethoxy]ethanol, 2-[2-(1-pyrrolidinyl)ethoxy]ethanol, and 2-[2-(4-methyl-1-piperazinyl)ethoxy]ethanol; and from about 50 mole % to greater than 0 mole % of an ether-alcohol σ-μ polar modifier selected from one or more of 2-methoxyethanol, 1-methoxypropan-2-ol, 1-methoxybutan-2-ol, 2-methoxycyclohexan-1-ol, tetrahydrofurfuryl alcohol, tetrahydropyran-2-methanol, and diethylene glycol monomethyl ether.

21. The LOXSH composition of claim 20, wherein the ratio of total amino-alcohol (AA) and/or amino-ether-alcohol (AEA) to the total separate ether-alcohol (EA) σ-μ polar modifier ([AA+AEA]:EA) is from about 9:1 to about 1:1.

22. The LOXSH composition of claim 20, wherein the ratio of total amino-alcohol (AA) and/or amino-ether-alcohol (AEA) to the total separate ether-alcohol (EA) σ-μ polar modifier ([AA+AEA]:EA) is from about 4:1 to about 2:1.

23. A composition comprising a hydrogen mediated polyisoprene (HMPIP) distribution, wherein the HMPIP is characterized as having a number average ($M_n$,) molecular weight from about 500 to about 2600 Daltons and having one of the following: 1) from about 73 wt. % to about 80 wt. % 1,4-IP contents with a Brookfield viscosity (@ 25° C.) that varies as a function of $M_n$ from about 30 cP at about 500 Daltons to about 5000 cP at about 2600 Daltons; or 2) from about 40 wt. % to about 73 wt. % 1,4-IP contents content with a Brookfield viscosity (@ 25° C.) that varies as a function of $M_n$ over the range of about 200 cP at about 500 Daltons to about 40,000 cP at about 2600 Daltons; or 3) from about 30 wt. % to about 54 wt. % 1,4-IP contents and a Brookfield viscosity (@ 25° C.) that varies as a function of $M_n$ over the range of about 100 cP at about 500 Daltons to about 200,000 cP at about 2600 Daltons; wherein the 1,4-IP contents is determined by 1HNMR analyses.

24. The composition of claim 23, further characterized as having glass transition temperatures that varies as one of the following: 1) from about 73 wt. % to about 80 wt. % 1,4-IP contents having a $T_g$ that varies as a function of $M_n$ from about −106° C. at about 500 Daltons to about −57° C. at about 2600 Daltons; or 2) from about 40 wt. % to about 73 wt. % 1,4-IP contents having a $T_g$ that varies as a function of $M_n$ from about −88° C. at about 500 Daltons to about −35° C. at about 2600 Daltons; or 3) from about 30 wt. % to about 54 wt. % 1,4-IP having a $T_g$ that varies as a function of $M_n$ over from about −85° C. at about 500 Daltons to about −20° C. at about 2600 Daltons.

25. A composition comprising a hydrogen mediated polybutadiene (HMPBD) distribution having a number average ($M_n$,) molecular weight from about 500 to about 2600 Daltons and having one of the following: 1) from about 74 wt. % to about 84 wt. % total vinyl content with a Brookfield viscosity (@ 25° C.) that varies as a function of $M_n$ over the range of about 45 cP at about 500 Daltons to about 30,000 cP at about 2600 Daltons; or 2) from about 55 wt. % to about 73 wt. % total vinyl content with a Brookfield viscosity (@ 25° C.) that varies as a function of $M_n$ over the range of about 50 cP at about 500 Daltons to about 8000 cP at about 2600 Daltons; or 3) from about 30 wt. % to about 54 wt. % total vinyl content and a Brookfield viscosity (@ 25° C.) that varies as a function of $M_n$ over the range of about 20 cP at about 500 Daltons to about 3000 cP at about 2600 Daltons; wherein the total vinyl content is determined by C-13 NMR analyses having glass transition temperatures $T_g$ from less than −120° C. to about −45° C. over the range of $M_n$=500 to $M_n$=2600.

26. A hydrogen mediated anionic poly (conjugated diene) composition characterized by high vinyl content from about 74 wt. % to about 82 wt. % (as determined by C-13 NMR analyses) wherein the: 1) number average molecular weight distribution ($M_n$) is from about 500 to about 2600 Daltons; 2) Brookfield viscosity (@ 25° C.) is from about 50 to about 32,000 cP; 3) glass transition temperature $T_g$ is from about −95° C. to about −45° C.; and 4) molar ratio of vinyl-1,2-BD:VCP is from about 7:1 to about 15:1 (based on $^1$HNMR analysis).

27. The composition of claim 25, wherein the composition is a HMPBD distribution having a high vinyl content from about 75 wt. % to about 82 wt. % (total vinyl content as determined by C-13 NMR analyses) wherein the: 1) number average molecular weight distribution ($M_n$) is from about 650 to about 2200 Daltons; 2) Brookfield viscosity (@ 25° C.) is from about 300 to about 11,000 cP; 3) glass transition temperature $T_g$ is from about −84° C. to about −50° C.; and 4) molar ratio of vinyl-1,2-BD:VCP is from about 6.5:1 to about 14.5:1 (based on $^1$HNMR analysis).

28. The composition of claim 25, wherein the composition is a HMPBD distribution having an intermediate vinyl content from about 55 wt. % to about 70 wt. % (total vinyl content as determined by C-13 NMR analyses) wherein the: 1) number average molecular weight distribution ($M_n$) is from about 700 to about 1600 Daltons; 2) Brookfield viscosity (@ 25° C.) is from about 95 to about 2000 cP; 3) glass transition temperature $T_g$ is from about −92° C. to about −75° C.; and 4) molar ratio of vinyl-1,2-BD:VCP is from about 4.5:1 to about 12:1 (based on $^1$HNMR analysis).

29. The composition of claim 25, wherein the composition is a HMPBD distribution having a reduced vinyl content from about 30 wt. % to about 54 wt. % (total vinyl content as determined by C-13 NMR analyses) wherein the: 1) number average molecular weight distribution ($M_n$) is from about 750 to about 1600 Daltons; 2) Brookfield viscosity (@ 25° C.) is from about 80 to about 1000 cP; 3) glass transition temperature $T_g$ is from about −106° C. to about −70° C.; and 4) molar ratio of vinyl-1,2-BD:VCP is from about 3.3:1 to about 7:1 (based on $^1$HNMR analysis).

* * * * *